United States Patent
Li et al.

(10) Patent No.: US 9,372,943 B2
(45) Date of Patent: Jun. 21, 2016

(54) MODELING DYNAMIC SYSTEMS BY VISUALIZING AND NARROWING A PARAMETER SPACE

(75) Inventors: Dachang Li, Katy, TX (US); Tao Sun, Missouri City, TX (US); Xiao-Hui Wu, Sugarland, TX (US); Timothy A. Chartrand, Spring, TX (US); Stephen L. Lyons, Spring, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 888 days.

(21) Appl. No.: 12/920,266

(22) PCT Filed: Mar. 25, 2009

(86) PCT No.: PCT/US2009/038279
§ 371 (c)(1),
(2), (4) Date: Aug. 30, 2010

(87) PCT Pub. No.: WO2009/137181
PCT Pub. Date: Nov. 12, 2009

(65) Prior Publication Data
US 2011/0054869 A1    Mar. 3, 2011

Related U.S. Application Data

(60) Provisional application No. 61/126,438, filed on May 5, 2008.

(51) Int. Cl.
*G06F 17/50* (2006.01)
*G01V 99/00* (2009.01)
*G06T 17/05* (2011.01)

(52) U.S. Cl.
CPC .......... *G06F 17/5009* (2013.01); *G01V 99/005* (2013.01); *G06F 2217/06* (2013.01); *G06T 17/05* (2013.01)

(58) Field of Classification Search
CPC .................................................. G01V 99/005
See application file for complete search history.

(56) References Cited

U.S. PATENT DOCUMENTS 5,706,194 A    1/1998   Neff et al.
5,835,883 A *  11/1998  Neff ........................ G01V 11/00
                                                          702/12

(Continued)

FOREIGN PATENT DOCUMENTS

EP    0742923    4/2000    .............. G06F 19/00
EP    0745870    11/2002   ............... G01V 1/28

(Continued)

OTHER PUBLICATIONS

Feraille et al. "Application of Advanced History Matching Techniques on an Integrated Field Case Study", 2003.*

(Continued)

*Primary Examiner* — Akash Saxena
(74) *Attorney, Agent, or Firm* — ExxonMobil Upstream Research Company, Law Dept.

(57) ABSTRACT

A method for modeling a dynamic system (e.g., geological system) comprises: constructing an input parameter space for a model of the geological system, the input parameter space including more than three dimensions, and the model associated with response data, representing the input parameter space visually with three or fewer dimensions, reducing the input parameter space by conditioning the parameter space using at least a subset of the response data, and updating the representation of the input parameter space to visually represent the reduction of the parameter space.

43 Claims, 25 Drawing Sheets

(56) References Cited

U.S. PATENT DOCUMENTS

| | | | |
|---|---|---|---|
| 5,838,634 A | 11/1998 | Jones et al. | 367/73 |
| 5,844,799 A | 12/1998 | Joseph et al. | 364/420 |
| 5,953,680 A | 9/1999 | Divies et al. | 702/5 |
| 6,018,498 A | 1/2000 | Neff et al. | 367/72 |
| 6,106,561 A | 8/2000 | Farmer | |
| 6,128,577 A | 10/2000 | Assa et al. | 702/2 |
| 6,138,076 A | 10/2000 | Graf et al. | 702/14 |
| 6,205,402 B1 | 3/2001 | Lazaar et al. | |
| 6,246,963 B1 | 6/2001 | Cross et al. | |
| 6,374,185 B1 | 4/2002 | Taner et al. | 702/6 |
| 6,480,790 B1 | 11/2002 | Calvert et al. | 702/14 |
| 6,549,854 B1 | 4/2003 | Malinverno et al. | 702/16 |
| 6,597,995 B1 | 7/2003 | Cornu et al. | 702/17 |
| 6,754,558 B2 | 6/2004 | Preston et al. | |
| 6,980,940 B1 | 12/2005 | Gurpinar et al. | |
| 7,043,367 B2 | 5/2006 | Granjeon | |
| 7,069,149 B2 | 6/2006 | Goff et al. | 702/16 |
| 7,089,166 B2 | 8/2006 | Malthe-Sorenssen et al. | 703/10 |
| 7,254,091 B1 | 8/2007 | Gunning et al. | |
| 7,277,831 B1* | 10/2007 | Pawelzik | G05B 13/027 703/11 |
| 7,363,163 B2 | 4/2008 | Le Ra Valec-Dupin et al. | |
| 7,379,854 B2 | 5/2008 | Calvert et al. | 703/10 |
| 7,424,415 B2 | 9/2008 | Vassilev | 703/10 |
| 7,433,786 B2 | 10/2008 | Adams | 702/11 |
| 7,451,066 B2 | 11/2008 | Edwards et al. | |
| 7,478,024 B2 | 1/2009 | Gurpinar et al. | |
| 7,480,205 B2 | 1/2009 | Wei | 367/37 |
| 7,523,024 B2 | 4/2009 | Endres et al. | 703/6 |
| 7,542,037 B2 | 6/2009 | Fremming | 345/420 |
| 7,596,481 B2 | 9/2009 | Zamora et al. | |
| 7,606,691 B2 | 10/2009 | Calvert et al. | 703/10 |
| 7,706,981 B2 | 4/2010 | Wilkinson et al. | 702/14 |
| 7,711,532 B2 | 5/2010 | Dulac et al. | 703/10 |
| 7,739,089 B2 | 6/2010 | Gurpinar et al. | |
| 7,756,694 B2 | 7/2010 | Graf et al. | 703/10 |
| 7,844,430 B2 | 11/2010 | Landis et al. | 703/10 |
| 7,925,481 B2 | 4/2011 | Van Wagoner et al. | 703/10 |
| 7,932,904 B2 | 4/2011 | Branets et al. | 345/423 |
| 7,933,750 B2 | 4/2011 | Morton et al. | 703/2 |
| 7,953,585 B2 | 5/2011 | Gurpinar et al. | 703/10 |
| 7,986,319 B2 | 7/2011 | Dommisse et al. | 345/419 |
| 8,078,437 B2 | 12/2011 | Wu et al. | 703/2 |
| 8,212,814 B2 | 7/2012 | Branets et al. | 345/423 |
| 8,255,195 B2 | 8/2012 | Yogeswaren | |
| 8,355,898 B2 | 1/2013 | Pyrcz et al. | |
| 8,374,836 B2 | 2/2013 | Yogeswaren | |
| 8,447,522 B2 | 5/2013 | Brooks | |
| 8,494,828 B2 | 7/2013 | Wu et al. | 703/10 |
| 8,577,660 B2 | 11/2013 | Wendt et al. | |
| 8,594,986 B2 | 11/2013 | Lunati | |
| 2002/0120429 A1 | 8/2002 | Ortoleva | |
| 2003/0038634 A1* | 2/2003 | Strack | G01V 11/00 324/323 |
| 2003/0182093 A1 | 9/2003 | Jones et al. | 703/11 |
| 2004/0267454 A1* | 12/2004 | Granjeon | G01V 99/005 702/2 |
| 2006/0122780 A1 | 6/2006 | Cohen et al. | 702/14 |
| 2007/0046686 A1 | 3/2007 | Keller | |
| 2007/0219725 A1 | 9/2007 | Sun et al. | |
| 2008/0021677 A1 | 1/2008 | Buxton et al. | |
| 2008/0079723 A1* | 4/2008 | Hanson | G06K 9/0063 345/427 |
| 2008/0162098 A1* | 7/2008 | Suarez-Rivera | E21B 49/00 703/10 |
| 2009/0187391 A1 | 7/2009 | Wendt et al. | 703/10 |
| 2011/0015910 A1 | 1/2011 | Ran et al. | 703/2 |
| 2011/0054857 A1 | 3/2011 | Moguchaya | 703/2 |
| 2011/0054869 A1 | 3/2011 | Li et al. | 703/10 |
| 2011/0115787 A1 | 5/2011 | Kadlec | 345/419 |
| 2011/0246154 A1 | 10/2011 | Koutsabeloulis et al. | 703/6 |
| 2011/0251830 A1 | 10/2011 | Hilliard et al. | 703/1 |
| 2011/0257949 A1* | 10/2011 | Vasudevan | G06F 17/18 703/2 |
| 2011/0310101 A1 | 12/2011 | Prange et al. | 345/420 |
| 2012/0006560 A1 | 1/2012 | Calvert et al. | 166/369 |
| 2012/0010865 A1 | 1/2012 | Benson | 703/10 |
| 2012/0026167 A1 | 2/2012 | Ran et al. | 345/420 |
| 2012/0029828 A1 | 2/2012 | Pepper et al. | 702/16 |
| 2012/0143575 A1* | 6/2012 | Imhof | G01V 11/00 703/2 |
| 2012/0232865 A1* | 9/2012 | Maucec | G01V 1/30 703/2 |
| 2012/0253770 A1* | 10/2012 | Stern | G01V 11/00 703/10 |
| 2013/0028234 A1 | 1/2013 | DiGirolamo et al. | |
| 2013/0030782 A1 | 1/2013 | Yogeswaren | 703/10 |
| 2013/0046524 A1 | 2/2013 | Gathogo et al. | 703/6 |
| 2013/0054201 A1 | 2/2013 | Posamentier et al. | 703/2 |
| 2013/0185032 A1* | 7/2013 | Archer | G06F 17/5009 703/2 |
| 2013/0246031 A1 | 9/2013 | Wu et al. | 703/10 |
| 2013/0289962 A1 | 10/2013 | Wendt et al. | |

FOREIGN PATENT DOCUMENTS

| | | | |
|---|---|---|---|
| EP | 1865343 | 12/2007 | G01V 11/00 |
| EP | 1653411 | 7/2008 | G06T 17/40 |
| EP | 1707993 | 8/2009 | G01V 1/30 |
| WO | 2011/106135 | 9/2011 | G06F 19/00 |
| WO | 2013/028234 | 2/2013 | G01V 1/28 |

OTHER PUBLICATIONS

Greiss et al. "Application of Global Optimization Techniques for Model Validation and Prediction Scenarios for a North African Oil Field", 2006.*

Virine et al. "Decision and Risk Analysis Tools for the Oil and Gas Industry", 2003.*

Scheidt et al. "Adaptive Experimental Design for Non-Linear Modeling—Application to Quantification of Risk for Real Field Production", 10th European Conference on the Mathematics of Oil Recovery—Amsterdam, The Netherlands Sep. 4-7, 2006.*

Bitzer, K. et al. (1989), "DEPO3D: a three-dimensional model for simulating clastic sedimentation and isostatic compensation in sedimentary basins," *Quantitative Dynamic Stratigraphy*, pp. 335-348.

Borg, I. (1997), "Modem Multidimensional Scaling Theory and Applications", Springer, New York, pp. 1-14, 38.

Bornholdt, S. et al. (1999), "Inverse Stratigraphic Modeling Using Genetic Algorithms," *Numerical Experiments in Stratigraphy: Recent Advances in Stratigraphic and Sedimentologic Computer Simulation, SEPM Special Publications* No. 62, 6 pgs.

Burton, R. et al. (1987), Out of Our Depth: on the Impossibility of Fathoming Eustasy from the Stratigraphic Record, *Earth-Science Review* 24, pp. 237-277.

Chavent, G. (1975), "History Matching by Use of Optimal Control Theory", *SPE Journal*, pp. 74-86.

Chen, W.H. et al. (19740, "A New Algorithm for Automatic History Matching", *SPE Journal*, pp. 593-608.

Conover, W.J. et al. (1981), "Rank Transformations as a Bridge between Parametric and Non-parametric Statistics", *American Statistician* 35(3), pp. 124-129.

Cross, T.A. et al. (1999), "Construction and Application of a Stratigraphic Inverse Model," *Numerical Experiments in Stratigraphy: Recent Advances in Stratigraphic and Sedimentologic Computer Simulation, SEPM*, Special Publications No. 62, pp. 69-83.

DeLeeuw, J. "Applications of convex analysis to multidimensional scaling," Recent developments in statistics, Nort-Holland, Amsterdam, The Netherlands.

Evensen, G. (2003), "The ensemble Kalman filter: Theoretical formulation and practical implementation," *Ocean Dynamics* 53(4), pp. 343-367.

Floris, F.J.T. et al. (2001),"Methods for quantifying the uncertainty of production forecasts: a comparative study," *Petroleum Geoscience*,7, pp. S87-S96.

Gentry, R.W. (2003), "Efficiency of Genetic Algorithm to Investigate Small Scale Aquitard Leakage," *J. of Hydraulic Eng.* 129(7), pp. 527-535.

(56) References Cited

OTHER PUBLICATIONS

Golden, B.L. et al. (2002), "3.6 Metaheuristics, Handbook of Applied Optimization," Oxford University Press, pp. 123-130.
Gavalas, G.R., et al. (1976), "Reservoir History Matching by Bayesian Estimation", *SPE J*, pp. 337-350.
Gu, Y. et al. (2005),"History Matching of the PUNQ-S3 Reservoir Model Using the Ensemble Kalman Filter," *SPE J.*, pp. 217-224.
Helton, J.C., et al. (2003), "Latin hypercube sampling and the propagation of uncertainty in analysis of complex systems," *Reliability Engineering & System Safety* 81, pp. 23-69.
Houtekamar, P.L. et al. (1998), "Data assimilation using an ensemble Kalman filter technique," *Monthly Weather Review* 126(3), pp. 796-811.
Iman, R. L. (1979), "The Use of Rank Transform in Regression," *Technometrics* 21(4), pp. 499-509.
Iman, R. L. et al. (1982), "A Distribution-Free Approach to Inducing Rank Correlation Among Input Variables," *Communications in Statistics: Simulation and Computation* B11(3), pp. 311-334.
Imhof, M.G. et al. (2006), "Quantitative seismostratigraphic inversion of a prograding delta from seismic data", *Marine and Petorleum Geology* 23(7), pp. 735-744.
Imhof, M.G. et al. (2007), "Seismostratigraphic inversion: Appraisal, ambiguity, and uncertainty," *Geophysics* 72(4), pp. R51-R66.
Johnson, M. A. (1964), "Turbidity Currents," *Oceanogr. Mar. Biol. Ann. Rev.* 2, pp. 31-43.
Kalnay, E. (2003), "Atmospheric Modeling, Data Assimilation and Predictability", *Cambridge University Press*, pp. 150-157, 177-181.
Karssenberg, D. et al. (2001), Conditioning a Process-Based Model of Sedimentary Architecture to Well Data, *J. of Sedimentary Research* 71(6), pp. 868-879.
Kruskal, J.B. (1964), "Multidimensional Scaling by Optimizing Goodness of Fit to a Nonmetric Hypothesis," *Psychometrika* 29(1), pp. 1-26.
Lambert, A. et al. (1988), "Records of riverborne turbidity currents and indications of slope failures in the Rhone delta of Lake Geneva," *Limnol. Oceanogr.* 33(3), pp. 458-468.
Lerche, I. (1996), "An inverse method for determining parameters for folded structures," *Quarterly of Applied Mathematics* 54, pp. 625-636.
Li, R. et al. ( 2003), "history Matching of Three-Phase Flow Production Data", *SPE J.* 8(4), pp. 328-340.
Lorentzen, R.J. et al. (2005), "Analysis of the Ensemble Kalman filter for Estimation of Permeability and Porosity in Reservoir Models," SPE 96375, 2005 SPE Annual Tech. Conf. and Exh., Dallas, Texas, Oct. 9-12, 2005, 10 pgs.
Marsily, G. de et al. (2000), "Four Decades of Inverse Problems in Hydrogeology," Special Paper 348: Theory, modeling, and field investigation in hydrogeology, *Geological Society of America* 348(0), pp. 1-17.
Mathar, R. (1989), "Algorithms in multidimensional scaling," Conceptual and numerical analysis of data, Springer, Berlin, pp. 159-177.
McKay, MD. Et al. (1979), A Comparison of Three Methods for Selecting Values of Input Variables in the Analysis of Output from a Computer Code, *Technometrics* 21(2), pp. 239-245.
Nicklow, J. et al. (2003), "Control of Channel Bed Morphology in Large-Scale River Networks Using a Genetic Algorithm," *Water Resources Management* 17, pp. 113-132.
Noevdal, G. et al. (2005), "Reservoir Monitoring and Continuous Model Updating Using Ensemble Kalman Filter," *SPE J.*, pp. 66-74.
Nordlund, U. (1999), "FUZZIM: Forward stratigraphic modeling made simple," *Computers & SGeoscience* 25, pp. 449-456.
Nueman, S.P. et al. (1985), "Maximum-likelihood adjoint-state finite-element estimation of groundwater parameters under steady- and nonsteady-state conditions," *Appl. Mathematics and Computation* 17, pp. 405-432.
Piasecki, M. et al. (1999), "Identification of Stream Dispersion Coefficients by Adjoint Sensitivity Method," *J. of Hydraulic Eng.*, pp. 714-724.
Saltelli, A. et al. (1995), "About the Use of Rank Transformation in Sensitivity Analysis of Model Output," *Reliability Engineering and System Safety* 50(3), pp. 225-239.
Sambridge, M. (1999), "Geophysical inversion with a neighbourhood algorithm—I," *Geophysical J. Int'l.* 138, pp. 479-494.
Sambridge, M. (1999), "Geophysical inversion with a neighbourhood algorithm—II," *Geophysical J. Int'l.* 138, pp. 727-746.
Sambridge, M.S. et al. (1992), "Genetic algorithms in seismic waveform inversion,", *Geophysical J. Int'l.* 109, pp. 323-342.
Sanders, B. et al. (2000), "Adjoint Sensitivity Analysis for Shallow-Water Wave Control," *J. of Eng. Mechanics*, pp. 909-919.
Sarma, P., et al. (2005) "Implementation of Adjoint Solution for Optimal Control of Smart Wells," SPE 92864, SPE Reservoir Simulation Symposium, Jan. 31-Feb. 2, 2005, The Woodlands, TX, 17 pgs.
Schulze-Riegert, R.W et al. (2002), "Evolutionary Algorithms Applied to history Matching of Complex Reservoirs," *SPE Reservoir Evaluation & Eng.*, pp. 163-173.
Schulze-Riegert, R.W. (2003), "Combined Global and Local Optimization Techniques Applied to History Matching," SPE 79668, SPE Reservoir Simulation Symposium, Feb. 3-5, 2003, Houston, TX, 10 pgs.
Steward, J. S. et al. (2002), "3D-SEDFLUX: Coupling fluvial and stratigraphic simulation models," Presented at the Geological Society of America Annual Meeting, 1 pg.
Stoffa, P.L. et al. (1991), "Nonlinear multiparameter optimization using genetic algorithms: inversion of plane-wave seismograms," *Geophysics* 56, pp. 1794-1810.
Strobel, J., et al. (1989), "Interactive (SEDPAK) simulation of clastic and carbonate sediments in shelf to basin settings," *Computers and Geoscience* 15, 1279-1290.
Syvitski, J.P.M.(2001), "2D SEDFLUX 1.0C, an advanced process-response numerical model for the fill of marine sedimentary basins," *Computers and Geoscience* 27, 713-753.
Tavassoli, Z. et al. (2004), "Errors in History Matching," *SPE J.*, pp. 352-361.

\* cited by examiner

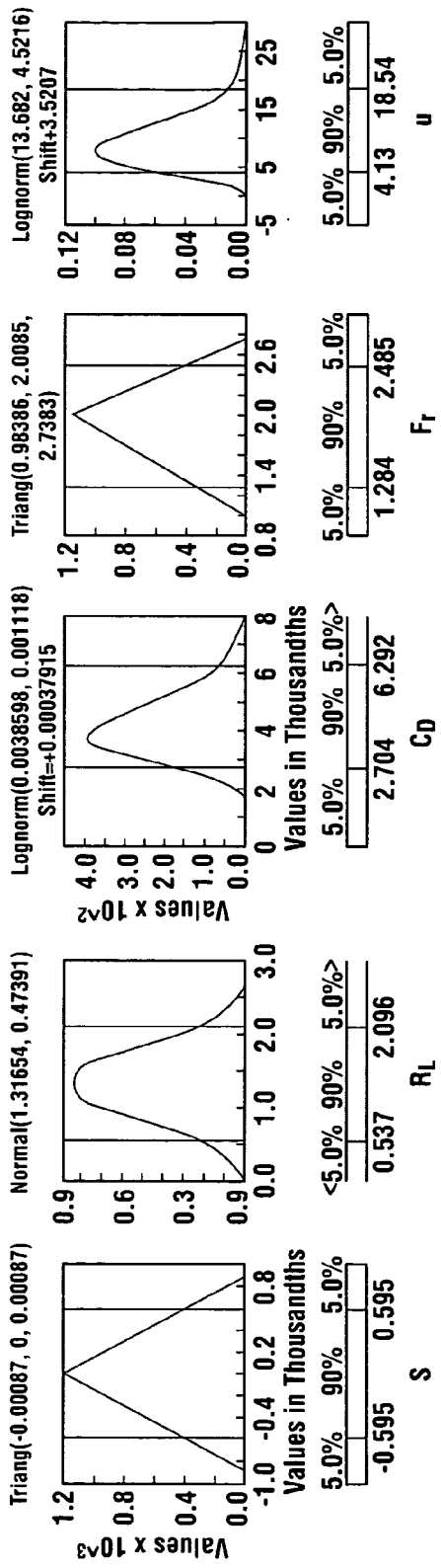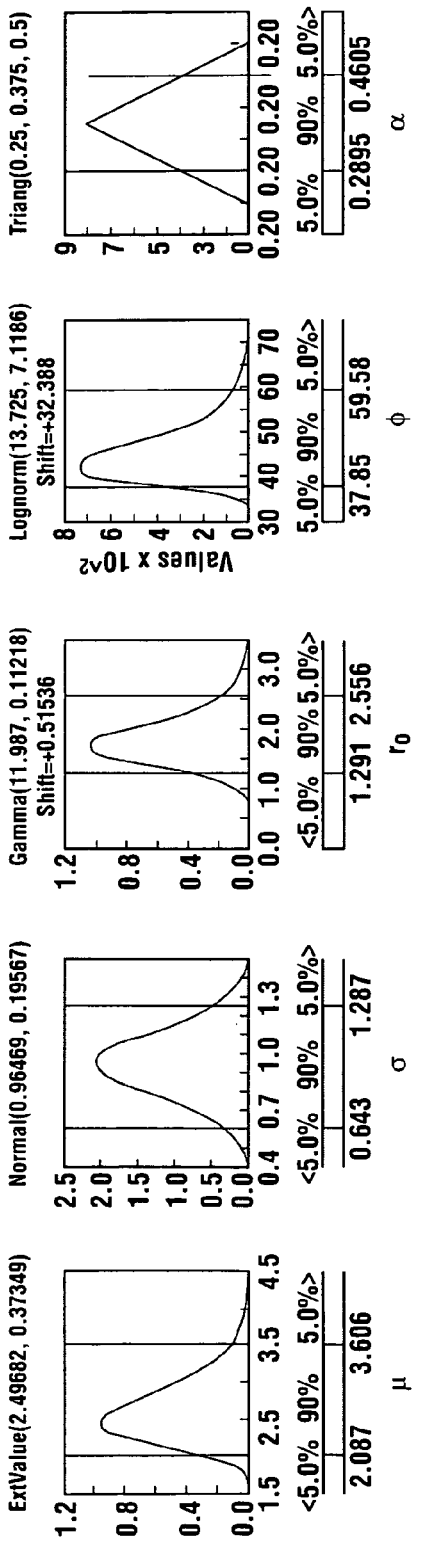

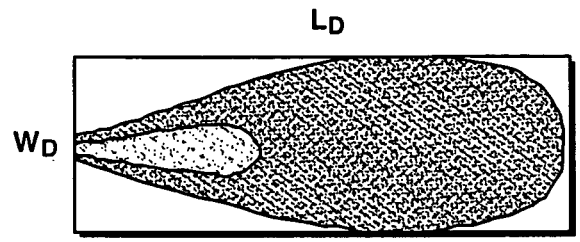
DAR
Measures (Responses) of the
Shape of a Deposit
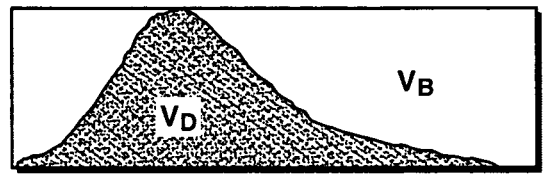
DVF
Measures (Responses) of the
Shape of a Deposit
FIG. 5
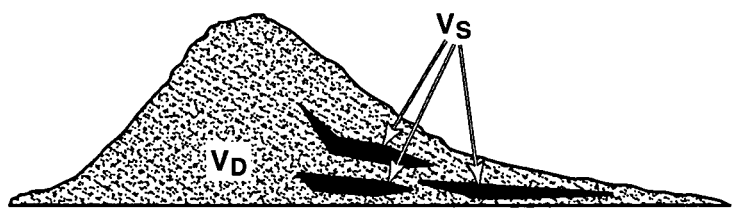
Illustration of Net-To-Gross (NTG)
FIG. 6

Example 2D Response Map for NTG

Deposit Thickness Map (Thickness Increases as the Scale Goes from Blue to Red)

Tornado Charts for the Conditioning Wells
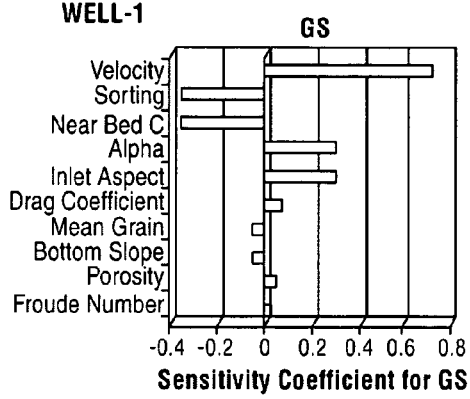
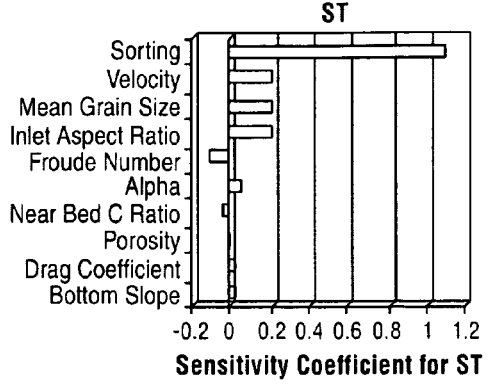
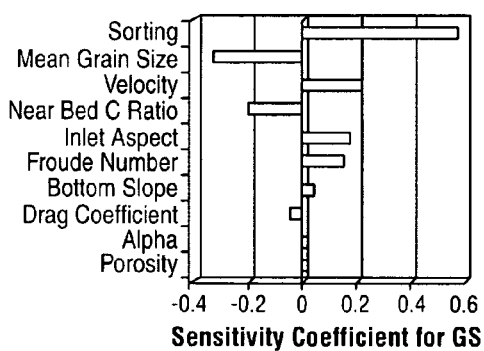
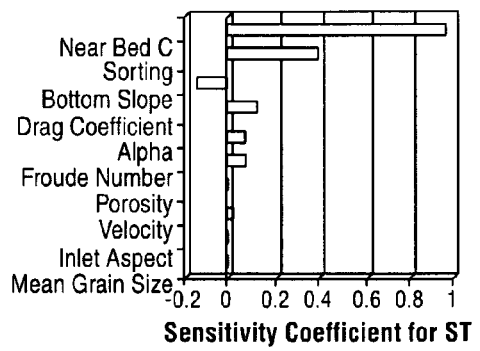
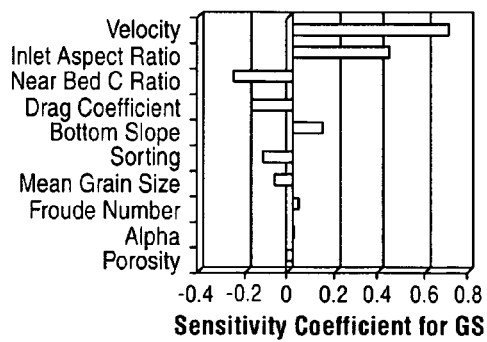
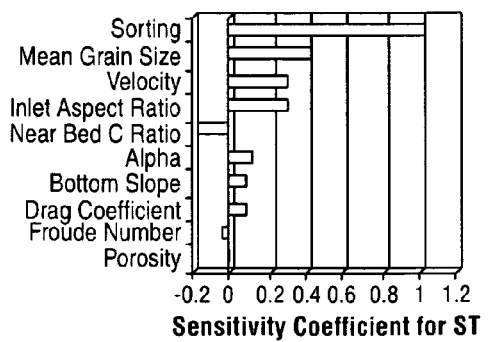
*FIG. 22B*

Projection of the Final Solution Space and the Truth on the Response Maps

MODELING DYNAMIC SYSTEMS BY VISUALIZING AND NARROWING A PARAMETER SPACE

CROSS-REFERENCE TO RELATED APPLICATION

This application is the National Stage of International Application No. PCT/US2009/038279, that published as WO 2009/137181, filed 25 Mar. 2009, which claims the benefit of U.S. Provisional Application No. 61/126,438, filed 5 May 2008, each of which is incorporated herein by reference, in its entirety, for all purposes.

TECHNICAL FIELD

The present description relates generally to modeling and simulation of dynamic systems through inversion. Specifically, the description relates to techniques for visualizing a parameter space, performing sensitivity analysis on the parameter space, and conditioning the parameter space.

NOMENCLATURE

The following nomenclature is used throughout the present document.
$c_D$—Drag coefficient
$C_{kl}$—Concentration of grain size l at layer k
CDF—Cumulative distribution function
$D_l$—Diameter of grain size l (mm or µm or phi)
$D_t$—Grain size threshold (mm or µm or phi)
DAR—Deposit aspect ratio
DAT—Dimensionless avulsion time
DVF—Deposit volume fraction
E—Relative prediction error
$f_k$—Fraction of sand for layer k
$F_r$—Froude number
GS—Grain size in the deposit
GSA—Global sensitivity analysis
GSG—Grain size gradient
h—Fault throw (m or ft)
H—Average thickness of a deposit (m)
J—Objective function
$k_g$—Good permeability (Darcy)
$k_p$—Poor permeability (Darcy)
$f_1, f_2$—Given functions
L—Length of a deposit (m)
LHS—Latin hypercube sampling
MDS—Multidimensional scaling
$n_s$—Number of grain sizes
NTG—Net-to-gross
P—Probability of success
Prob—Probability
$r_o$—Near bed sediment concentration ratio
$R_L$—Inlet aspect ratio
$R^2$—Coefficient of determination
S—Bottom slope
ST—Grain size sorting in the deposit
STG—Sorting gradient
THK—Deposit total thickness
V—Inlet velocity (m/s)
$V_D$—Deposit volume (m3)
$V_k$—Volume of a deposit cell at layer k (m3)
V—Shale volume (m3)
x—Response
$x_i$—Response at well i
$\bar{x}$—Prediction (the center of an ensemble)
y—Response
$y^o$—Observation of a response
α—Gravitational center for turbidity currents
µ—A measure of the model parameters? or mean grain size (phi or mm)
$µ^o$—Observation of the measure of the model parameters
φ—Depositional porosity
σ—Grain size sorting in the flow (phi)

Further, the present document references many papers throughout and gives abbreviated citations in the text. Full citations can be found at the end of the descriptions in the section "REFERENCES."

BACKGROUND OF THE INVENTION

Accurate characterization and simulation of hydrocarbon reservoirs can assist in maximizing the success of finding, developing, and producing hydrocarbons. Sedimentary process simulation which is based on physics and hydrodynamics is an advanced tool used to simulate reservoir deposits. One of the most challenging tasks for sedimentary process simulation is to find the appropriate input parameters, including the initial and boundary conditions, that allow the simulation model to generate simulated reservoir deposits that are consistent with the measured/observed reservoir data. Unfortunately, these input parameters are generally not measurable, not collectable, and even not retrievable because they disappeared millions of years ago during reservoir formation. Typically, the only media where data can be measured and collected for the simulation model are the reservoir deposits, the product of the sedimentary processes. Deposit data are generally collected through seismic surveys, (exploration, development, and production) well logs, and other means. Because seismic and well data are the measures of model output (response) and cannot be used directly as model input, they are used to infer a set of appropriate input parameters for sedimentary process simulation. The inference process is called conditioning.

Conditioning sedimentary process simulation to seismic and well data is a type of inverse problem. Inverse problems have been studied in science and engineering for decades. They are generally difficult to solve because they are commonly ill-posed (i.e., (1) the solution may not exist, (2) the solution may not be unique, and (3) the solution may not depend continuously on the data). Solving an inverse problem in the earth sciences, especially in sedimentary process simulation, is even more difficult because the data required to constrain the problem is extremely scarce. Conditioning sedimentary process simulation to seismic and well data is considered by some researchers to be very difficult, unsolved, and even impossible (Burton et al., 1987).

There are no effective or robust methods for conditioning sedimentary process simulation to seismic and well data today. Traditionally, an inverse problem in science and engineering is formulated as an optimization problem and then solved using a variety of optimization methods, e.g., a gradient-based or direct search method. Some of these optimization methods have been applied to conditioning sedimentary process models. However, they have not yet demonstrated much success. One of the reasons that hinder the success of conditioning is that optimization-based methods do not directly address the ill-posed nature of conditioning sedimentary process simulation.

Because it is very difficult to directly solve a nonlinear numerical model inversely, a conditioning (inverse) problem is traditionally formulated in the form of an objective (fitness) function and the problem is solved by using algorithms developed in the field of optimization. The objective function measures the misfit between the model responses and observations, and the disagreement between known knowledge and the model. It is formulated as follows $$J(y,y^o,\mu(x),\mu^o,x)=f_1(\|y-y^o\|)+f_2(\|\mu(x)-\mu^o\|) \quad (1)$$

where J is the objective function that is a function of y, $y^o$, $\mu(x)$, $\mu^o$, and x; y is a response(s) of the model; $y^o$ is an observation(s) of the response(s) of the physical systems to be modeled; $\mu(x)$ is a measure(s) of the model parameters; $\mu^o$ is a known measure(s) of the model parameters for the physical systems; x represents an input parameter(s); $\| \|$ is a norm that measures the length, size, or extent of an object; $f_1$, $f_2$ are some given functions. Most conditioning (inverse) problems use the misfit between the model responses and observations (the first term of the right hand side of Equation (1)) only. However, to honor the known knowledge about the physical systems to be modeled, e.g. in the Bayesian approach, the second term of the right hand side of Equation 1 is needed. Under the Bayesian approach, known knowledge about physical systems is called the a priori information about the systems. Equation 1 is solved by using an optimization algorithm to find the solution where the value of the objective function is the smallest. Most of the current conditioning methods in geology are optimization-based.

Conditioning numerical models in geology is considered to be difficult, unsolved, and even impossible. An extensive review on four decades of inverse problems in hydrogeology can be found in Marsily et al.'s article (2000). After analysis of the inversion of eustasy from the stratigraphic record, Burton et al. (1987) concluded that conditioning (inversion) of stratigraphic data is impossible. The major reasons that prevent the successful application of inversion are non-uniqueness and non-distinguishableness. Marsily and Burton studied the effect of subsidence, sediment accumulation, and eustasy on sequence stratigraphy and found that different combinations of the three parameters result in the same stratigraphic record, i.e., the non-uniqueness of the inverse problem. They also found that it is difficult to distinguish the effect of one parameter on the stratigraphy from the others. At best, all they could deduce is the sum of the three parameters rather than the individual parameters.

Some researchers (e.g., Cross et al., 1999 and Karssenberg et al., 2001) believed that conditioning numerical models to stratigraphic data is possible. Cross et al. developed an inverse method using a combination of linear and nonlinear solutions developed by Lerche (1996) to solve the conditioning problem of stratigraphic simulation. They demonstrated their method and some of their results with two dimensional deposits in 2001 in U.S. Pat. No. 6,246,963 B1. They later in 2004 extended their method from 2D (two dimensions) to 3D (three dimensions) in U.S. Pat. No. 6,754,558 B2. Even though Cross et al.'s method can avoid being trapped at local minima which is the common problem of gradient-based optimization methods, the method cannot address the non-uniqueness problem of conditioning process-based models.

Lazaar and Guerillot's United States Patent (2001), U.S. Pat. No. 6,205,402 B1, presented a method for conditioning the stratigraphic structure of an underground zone with observed or measured data. They used a quasi-Newtonian algorithm (a gradient-based method) to adjust the model parameters until the difference between model results and observed/measured data is minimized. Unfortunately, like most gradient-based methods, Lazaar and Guerillot's method suffers the problem of convergence at local minima. Similar to Cross et al.'s method, Lazaar and Guerillot's method cannot address the common non-uniqueness issue in conditioning of process-based models.

Karssenberg et al. (2001) proposed a trial-and-error method for conditioning three dimensional process-based models (simplified mathematic models without full physics) to well data. Because their goal was to show the possibility of conditioning process-based models to observational data in principle rather than to demonstrate the effectiveness and efficiency of the method for real-world problems, their method, as they stated, was computationally intensive and not ready for real-world problems.

Bornholdt et al. (1999) demonstrated a method to solve inverse stratigraphic problems using genetic algorithms for two simple (two-dimensional cross section) models. Although their method is very time-consuming (exploring 1021 different stratigraphic models), the authors claimed that the method will eventually be attractive considering the exponential decay of computing costs and the constant increase of manpower costs. Their method is not ready for real world applications due to problems of efficiency and effectiveness using current computing technology.

Genetic algorithm (GA) is a powerful direct search based optimization method originally inspired by biological evolution involving selection, reproduction, mutation, and crossover (Golden and Edward, 2002). Because it searches for global minima and does not require calculation of the derivatives of the objective function (Equation 1), the method has attracted a broad attention from many different industry and academic fields, such as geology (Wijns et al., 2003), geophysics (Stoffa and Sen, 1991; Sambridge and Drijkoningen, 1992), hydrology (Gentry et al., 2003; Nicklow et al., 2003), and reservoir engineering (Floris et al., 2001; Schulze-Riegert et al., 2002; and Schulze-Riegert et al., 2003). GA is the primary conditioning tool used in sequence stratigraphic modeling. The main advantage of GA is that it finds the global minima while addressing the non-uniqueness property of the solutions with some degree of uncertainty. The major complaints of GA are its time-consuming nature and its convergence problems.

Another direct search based optimization method is the neighborhood algorithm (NA). Unlike GA, NA makes use of geometrical constructs (Voronoi cells) to derive the search in the parameter space (Sambridge, 1999a and 1999b). Recently, Imhof and Sharma (2006 and 2007) applied NA to seismostratigraphic inversion. They demonstrated their method using a small and simple diffusion model.

An attractive gradient-based method for conditioning is the adjoint method (Schlitzer, 2000) that solves the forward equations and the backward adjoint equations for the inverse problem. The major advantage of adjoint method over other methods is that it is independent of the number of input parameters to be inverted. As a result, the method can be used for very large parameter identification problems. Adjoint methods originally from optimal control theory have been used in reservoir engineering in the last thirty years (Chen et al., 1974; Chavent, 1975; Li et al., 2003; Sarma et al., 2005; and Vakili et al., 2005). Adjoint methods have also been applied in hydrogeology (Neuman and Carrera, 1985; Yeh and Sun, 1990) and hydraulic engineering (Piasecki and Katopades, 1999; Sanders and Katopodes, 2000). However, adjoint methods have not been used in conditioning of sedimentary process simulation. Like other gradient-based methods, adjoint methods have the danger of being trapped at local minima.

The ensemble Kalman filter (EnKF) is a data assimilation method that has been applied in atmospheric modeling (Houtekamar and Mitchell, 1998; Kalnay, 2003, pp. 180-

181), oceanography (Evensen, 2003), and reservoir engineering (Gu and Oliver, 2005; Nœvdal et al., 2005; Zafari and Reynolds, 2005; Lorentzen et al., 2005; and Zhang et al., 2005). The major advantages of EnKF are the dynamic update of models and the estimation of model uncertainties. There are some limitations for EnKF (Kalnay, 2003, page 156): if the observation and/or forecast error covariances are poorly known, if there are biases, or if the observation and forecast errors are correlated, the analysis precision of EnKF can be poor. Other complaints include sensitivity to the initial ensemble, destroying geologic relationships, non-physical results, and the lack of global optimization etc. Vrugt et al. (2005) proposed a hybrid method that combines the strengths of EnKF for data assimilation and Markov Chain Monte Carlo (MCMC) for global optimization. Because EnKF requires dense observations, both in space and in time, which may be generally unavailable in geological processes, its application in sedimentary process simulation is still an open question.

Although optimization-based conditioning methods have been successfully applied in many fields of science and engineering, their success in the conditioning of the sedimentary process simulation is limited. One of the reasons is that the conditioning problem in the sedimentary process simulation is ill-posed and the success of a conditioning method depends on its ability to address the ill-posed problem. Some of optimization-based conditioning methods, e.g., GA and NA, have attacked the problem of non-uniqueness (one of the issues of ill-posedness) but the other issues (the existence of solution and the continuity of the parameter space) of the ill-posed problem are not addressed. If the three ill-posedness issues are not fully addressed, conditioning may not give a meaningful solution. As a result, the solution obtained may have no predictive power. An example of this issue was reported by Tavassoli et al. (2004).

Tavassoli et al. (2004) used a very simple reservoir model to demonstrate a fundamental problem in history matching (conditioning reservoir models to historical production data). The reservoir model used is a layer-cake 2D cross-section model with six alternating layers of good- and poor-permeabilities and a vertical fault cutting through the middle of the model. Three model parameters (fault throw h, good permeability $k_g$, and poor permeability $k_p$) are chosen to test the history matching problem. The parameter space is a cube with $0 \leq h \leq 60$, $100 \leq k_g \leq 200$, and $0 \leq k_p \leq 50$. The "truth" model is (h, $k_g$, $k_p$)=(10.4, 131.6, 1.3). Through their search, they found that the best history-matched model (i.e., the model with the smallest value of the objective function) is (h, $k_g$, $k_p$)=(33.1, 135.9, 2.62). It is apparent that the best history-matched model has a poor estimation for the "truth" model. As confirmed by their simulation, the best history-matched model gives a poor prediction. They conclude that the best match of a model to observation data does not necessarily result in the best model for prediction.

BRIEF SUMMARY OF THE INVENTION

Various embodiments of the present invention are directed to systems methods, and computer program products that offer advanced techniques to simulate dynamic systems (e.g., hydrocarbon reservoirs) by using one or more of the following methodologies: visualizing a multi-dimensional parameter space with a smaller number of dimensions (e.g., two or three dimensions) and conditioning a parameter space with response data to narrow the parameter space to a plurality of possibilities.

As discussed above, existing conditioning (inverse) techniques are optimization-based, and they do not fully address the ill-posed nature of the inverse problem. The optimization-based approach is a black box approach in which the input parameter space of a model is treated as a black box and a mathematical algorithm is used to search for a solution(s) within the box by minimizing the misfit (objective function) between model responses and measured/observed data. Because the black-box process is typically wholly automatic and the input parameter space is seldom visualized or analyzed, the characteristics of the input parameter space are ignored in the course of conditioning.

In contrast to the optimization-based approach, a Solution Space Method (SSM) described in this disclosure includes a white box approach in which the input parameter space is visualized, explored, and examined during the process of conditioning. Instead of using an objective function, various embodiments of the present invention open the input parameter space and directly search for the solution within the input parameter space that satisfies the constraints of the measured/observed data. Embodiments also use techniques to reduce the dimensionality of the parameter space, thereby providing intuitive visualization of the parameter space and the conditioning process.

If there is no solution within the given input parameter space, the problem can be quickly identified by a user in a visual depiction of the narrowing of the parameter space. The user can then construct a new input parameter space that may contain the solution. When the solution is non-unique, various embodiments find a space of solutions from which uncertainty in the solution can be captured. The space of solutions can be comprehended by a user through use of the visualization techniques, and viewing the conditioning can often give users an insight into the amount of uncertainty, because increased narrowing tends to indicate less uncertainty. When the input parameter space is not well behaved (e.g., non-smoothness), the problem can be studied and any potential flaws/issues inside the model can be investigated using the visualization techniques. Thus, the three ill-posed issues of conditioning can be fully addressed using various embodiments of the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 is an illustration of exemplary distribution functions for use with a variety of input parameters in one embodiment of the invention;

FIG. 5 includes illustrations of the concepts of Deposit Aspect Ratio (DAR) and Deposit Volume Fraction (DVF), which are example responses that may be used with embodiments of the invention;

FIG. 6 is an illustration of the concept of Net-to-Gross (NTG), which is an example response that may be used with embodiments of the present invention;

DETAILED DESCRIPTION OF THE INVENTION

One example of the invention includes defining model parameters and responses and constructing the input parameter space. Responses may include, among other things, observed or experimental data, such as seismic data or well bore data. The parameter space includes a range of the various parameters (e.g., inputs to the system that control the models). The number of parameters can be as high as desired. In an embodiment with N different parameters, the parameter space can be referred to as N-dimensional.

Figure 1:
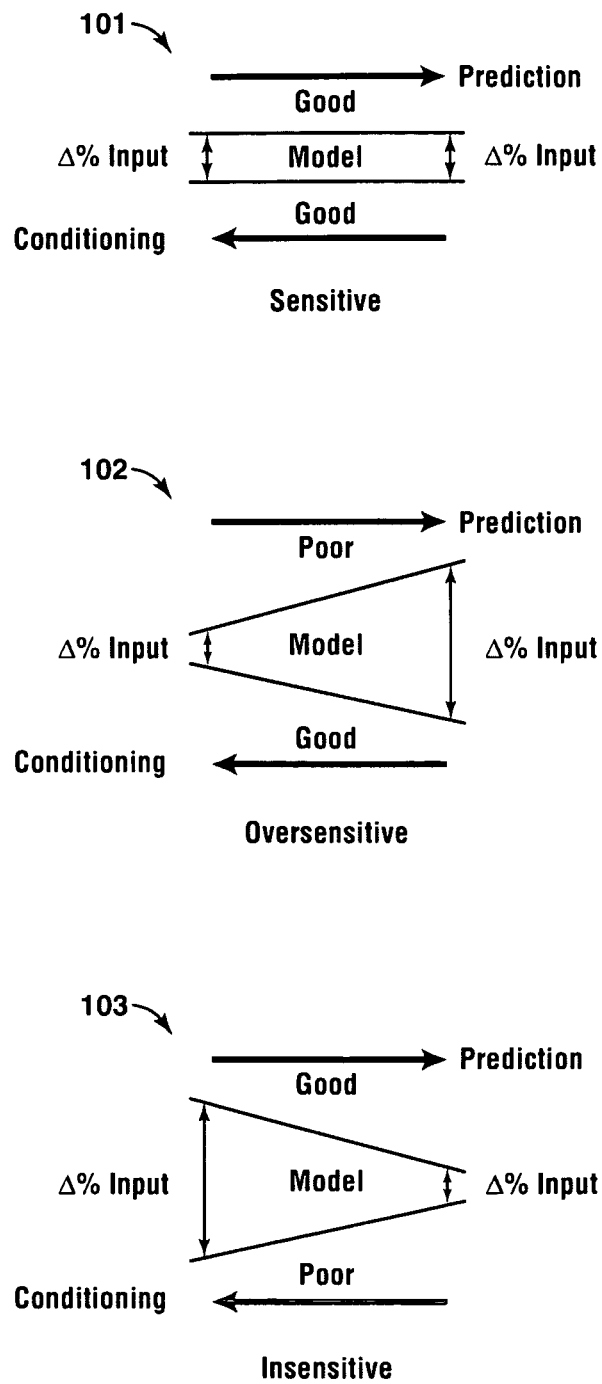
FIG. 1 is a simplified conceptual illustration of sensitivity.

After the input parameter space is defined, embodiments perform a sensitivity analysis on the parameters. Sensitivity includes global and local sensitivity. Rather than work with an infinite data set, an embodiment samples the parameter space using a well-constructed and random sampling. In a very high dimensional space, it may be desirable to sample relatively few points of the space. There are a variety of sampling techniques that can be used, such as, e.g., Latin Hypercube Sampling (LHS). The LHS method introduced by McKay et al. (1979) and extended by Iman and Conover (1982) can be used to select a manageable number of representative points to numerically represent the input parameter space in a very efficient and effective way. Once the parameter space is sampled adequately, responses are calculated based on the samples. Some changes in parameters produce large changes in response, while other changes in parameters produce very little response. FIG. 1 illustrates sensitive 101, insensitive 103, and oversensitive 102 relationships in an exemplary intuitive format. Most useful, in this example embodiment, are parameters that have a more or less linear relationship to the response and are neither insensitive nor over sensitive. Some embodiments include ranking which parameters are possibly more important or more appropriate for conditioning based on the results of sensitivity analysis. Once sensitivities are known, they can be used to sample the parameter space more carefully or to redesign the sample process to capture more sensitive responses. If there is an oversensitive parameter, it may indicate that the physical/mathematical model used for conditioning and prediction should be fixed because it contains an unstable factor that may make the model unpredictable. Further, if there is an insensitive parameter in the model, the parameter may be removed, because it has little or no effect on the model performance. The parameter space can be culled of parameters that are too sensitive, not sensitive enough, or related to other parameters to the point of near redundancy.

Embodiments visualize the input parameter space, which usually includes more than three dimensions. However, all of the currently available visualization tools are limited to visualizing in three dimensions. One technique that has been used in psychology, political science, and marketing to visualize high dimension number sets is Multi-Dimensional Scaling (MDS) (Borg and Groenen, 1997, pp. 1-14). MDS provides a way to scale the original multidimensional parameter space to a two- or three-dimensional space that maintains the relationship between data points. By scaling the parameter space, embodiments of the invention can make use of existing visualization tools to visualize, explore, and examine the multidimensional input parameter space.

Effective visualization can help a user to find trends in the response, for example, a user may desire to find where model responses substantially match observed data. MDS uses mathematic operations to condense the parameter space into, for example, a two-dimensional space. In one embodiment, a two dimensional space is created for a given response, and the parameter space is reduced in dimensions to fit the 2-D space. Colors within the 2-D space indicate changes in the value of the given response. When the parameter space is conditioned to the response, one technique draws an area that delineates portions of the parameter space that are eliminates versus those that are not eliminated. When the parameter space is conditioned for another response, there is another area, and the overlapping portion of the areas indicates where the parameter space is conditioned for both responses. The process can be performed sequentially for each response or at the same time for each response. Typically, adding more responses narrows the parameter space. The area of the parameter space that is left represents a group of models controlled by the remaining parameter samples.

In some cases, there is an area for a response that does not overlap any other areas. Such a scenario may indicate to the user that the parameter space is incorrect. The user may go back and redefine to the parameter space and/or start the process over. However, in other cases, the conditioning for a variety of responses results in a very narrowed field of parameter samples.

Further, some embodiments include conditioning the narrowed parameter space according to a second set of responses. In one example, the first set of responses are from a type of measured data that does not necessarily require the use of high sample densities in the parameter space. Those responses can then be used in a first round of conditioning. Once the parameter space has been narrowed, it can then be resampled for a higher density and analyzed for sensitivity according to the second set of responses. Then, visualization and conditioning are performed as described above. In fact, as many response set iterations as desired can be performed.

In many instances, the narrowed field of parameter samples is used to generate models to simulate, measure, and predict other aspects of a dynamic system. In one example, measured data includes a ten year history of production from an oil well. Models using the narrowed field of the parameter space may match the ten year history very well. A user may also desire to predict what the hydrocarbon production will be like in 20 years or 30 years to plan for investment. Each model can be used to make a prediction, and the various models may show some divergence. However, the divergence is not necessarily undesirable, as it gives an indication of uncertainty, and the uncertainty can be taken into account in planning for future use/investment of the hydrocarbon reserve. As time passes and more data is observed from the well, the new data can be used to further narrow the parameter space, thereby reducing the uncertainty.

Figure 2:
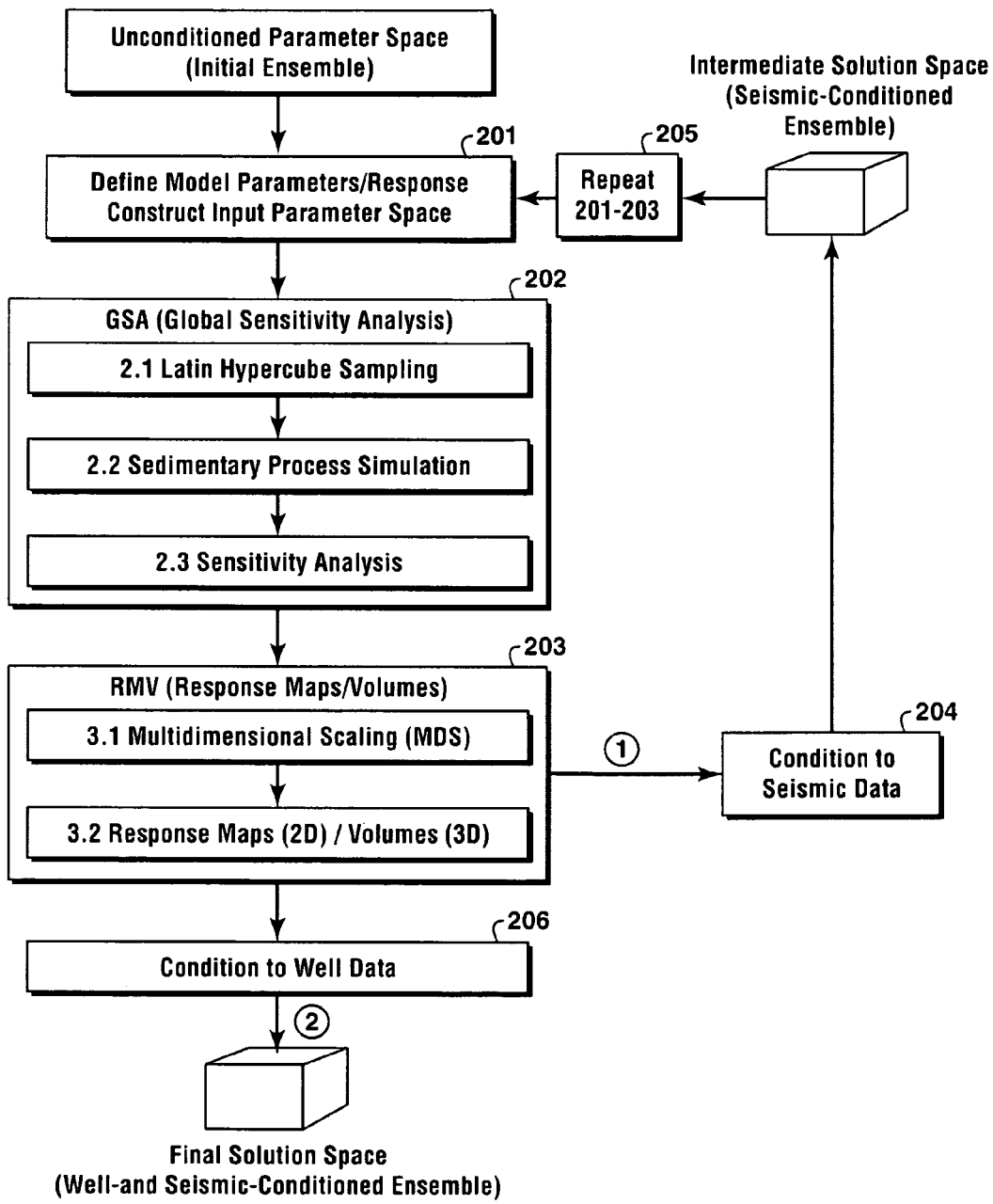
FIG. 2 is an illustration of an exemplary method adapted according to one embodiment of the invention.

FIG. 2 is an illustration of exemplary process 200 according to one embodiment of the present invention. Exemplary process 200 can be described as an SSM, and it includes sensitivity analysis of the parameter space, visualization of the parameter space, and, in some instances, produces a plurality of models based on a narrowed space of parameters. Exemplary process 200 is adapted for sedimentary process simulation and uses seismic data and well data as observed results. However, it should be noted that the invention is not so limited, as methodologies using other observed data and in different fields are within the scope of some embodiments.

Process 200 of the illustrated embodiment includes the following steps:

201. Define model parameters/responses and construct the input parameter space;

202. Conduct the global sensitivity analysis (GSA) which is composed of Latin hypercube sampling (LHS), sedimentary process simulation, and sensitivity analysis;

203. Construct response maps/volumes (RMV) which consists of multidimensional scaling (MDS) and 2D/3D response maps/volumes;

204. Condition the initial ensemble to seismic data to create a seismic-conditioned ensemble (intermediate solution space);

205. Repeat Steps 201 to 203 using well responses; and

206. Condition the seismic-conditioned ensemble to well data to create the final well- and seismic-conditioned ensemble (final solution space).

In step 201, model parameters/responses are defined and the input parameter space is constructed. Before defining model parameters/responses, many embodiments include choosing a mathematical model for sedimentary process simulation. There are several mathematical/numerical models available commercially or from academia, e.g., SEDPAK™ (Strobel et al., 1989), DEPO3D™ (Bitzer and Pflug, 1989), SEDFLUX™ (Syvitski and Hutton, 2001; Steward and Overeem, 2002), SEDSIM™ (Tetzlaff and Harbaugh, 1989, pp. 1-10), and FUZZIM™ (Nordlund, 1999), which are suitable for use according to embodiments of the invention. The present example uses a mathematical model described in United States Patent Application Publication No. US20070219725 A1 (incorporated herein by reference) to demonstrate SSM. In other words, the present example uses the technique discussed in United States Patent Application Publication No. US20070219725 A1 as a forward model to solve the inverse problem of sedimentary process simulation. However, the invention is not so limited, as use with other mathematical models (whether mentioned herein or otherwise) are within the scope of the embodiments.

In many instances it is preferable to use dimensionless input parameters as much as possible rather than directly using physical input parameters to construct the input parameter space. There are at least two issues to be addressed when using Sun et al.'s model from United States Patent Application Publication No. US20070219725 A1. The first issue is that there are generally too many input parameters, and the parameters may not be independent of each other. The second issue is that sedimentary process simulations are scale (in time and space) dependent. It is very difficult to do sensitivity analysis when the spatial and temporal scales can span from less than a meter to more than hundreds of kilometers and from a couple of minutes to millions of years. Scaling helps to solve the problem and reduce the number of input parameters from more than thirty to ten (most of them are dimensionless numbers). The ten input parameters utilized according to one example are (1) bottom slope (S), (2) inlet aspect ratio ($R_L$, inlet width/inlet water depth), (3) drag coefficient ($c_D$), (4) Froude number ($F_r$, inlet inertial force/inlet gravity force), (5) inlet velocity (u, m/s), (6) mean grain size (μ, phi), (7) grain size sorting (σ, phi), (8) near bed sediment concentration ratio ($r_o$), (9) depositional porosity (ϕ), and (10) alpha (α). For ease of presentation, bed load and turbulence dispersion are not addressed herein. However, it is understood that various embodiments may use as few or as many input parameters as a user desires. The range and distribution function for each parameter which constitute the unconditioned parameter space are shown in FIG. 3 and Table 1. The unconditioned parameter space forms the input parameter space (initial ensemble) for SSM.

volume, and $V_B$ is deposit bounding box volume. FIG. 5 illustrates DAR and DVF definitions.

A response that can be used to measure the internal composition of a deposit is net-to-gross ratio (NTG), as shown in FIG. 6. NTG is defined as $$\text{NTG} = (V_D - V_S)/V_D \quad (4)$$

where $V_S$ is shale volume. NTG is a measure of the volume fraction of sand that is often considered important for reserve estimate and production performance. NTG has been widely used in the petroleum industry.

In addition to DAR, DVF, and NTG, deposit length (L) and average thickness (H) can be used as model responses as well. In this example, the foregoing responses can be measured and observed from seismic surveys to provide the global mea-

TABLE 1

| Order | Input parameters | Min | Max | Mean | STD | N of data | Model | Examples |
|---|---|---|---|---|---|---|---|---|
| 1 | Basin slope (S, degree) | −0.05 | 0.05 | 0 | | | Triangle | <0.04 (Bute Inlet, British Columbia |
| 2 | Orifice aspect ratio ($R_L$) | 1.67 | 333.43 | 20.73 | 0.474 (log) | 572 | Log normal | 20 (East Breaks) |
| 3 | Drag coefficient ($c_D$) | 0.002 | 0.008 | 0.0042 | 0.0011 | 386 | Log normal | 0.002~0.006 (Georges Bank) |
| 4 | Froude number ($F_r$) | 0.99 | 2.74 | 1.92 | 0.34 | 4000 | Triangle | 1.5 (Bute Inlet) |
| 5 | Velocity (u, m/s) | 1.7 | 27.9 | 10.2 | 4.4 | 4000 | Log normal | 4.35 (Bute Inlet), 25 (Grand Banks) |
| 6 | Mean grain size (μ, phi) | 1.72 | 3.8 | 2.69 | 0.41 | 47 | Extvalue | 1.9~3.26 (Bute Inlet) |
| 7 | Grain size sorting (σ, phi) | 0.35 | 1.35 | 0.96 | 0.2 | 47 | Normal | 0.31~1.23 (Bute Inlet) |
| 8 | Near bed C ratio ($r_o$) | 1.08 | 3.08 | 1.86 | 0.39 | 74 | Gamma | 2.0 (Garcia's experiments) |
| 9 | Depositional porosity (ϕ) | 36 | 86 | 49 | 4.74 | 172 | Log normal | 38-60 (Pacific and Arctic Oceans) |
| 10 | Alpha (α) | 0.25 | 0.5 | 0.375 | | | Triangle | 0.29 (Garcia's experiments) |

Figure 4:
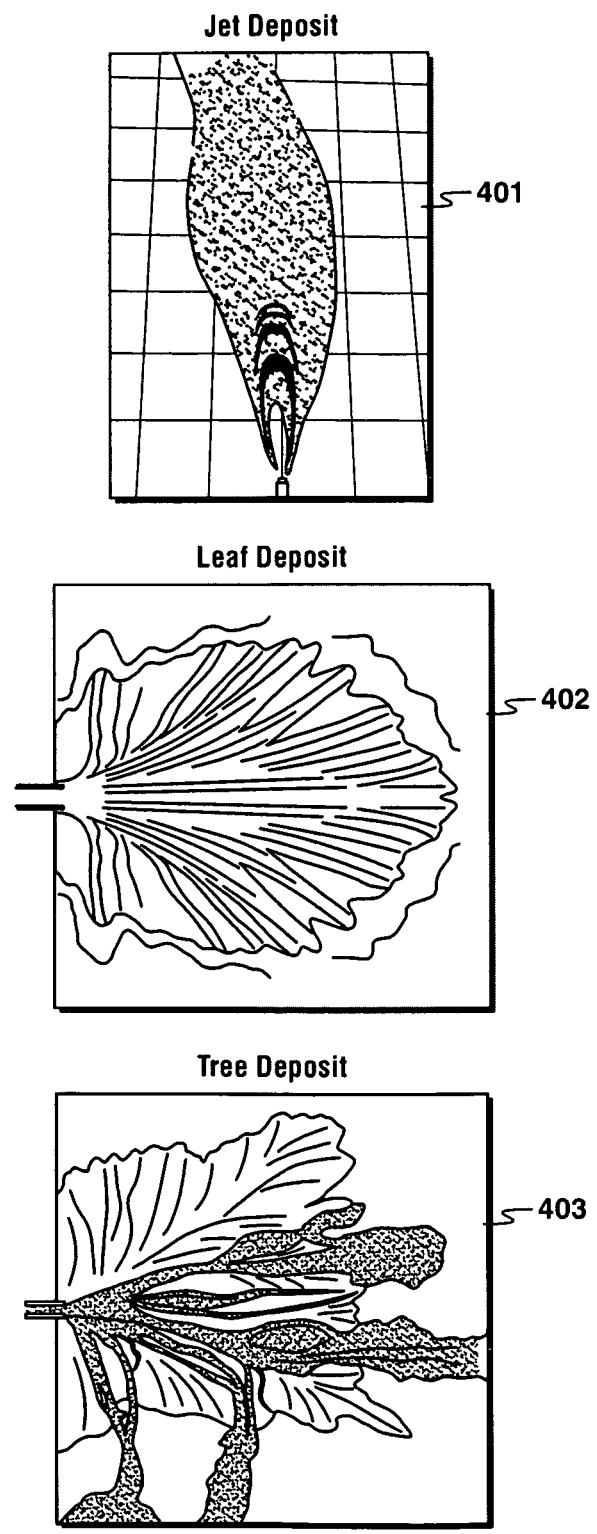
FIG. 4 is an illustration of exemplary deposit types that may be simulated and analyzed using embodiments of the present invention.

Defining model responses typically depends on which types of sedimentary bodies are studied. There are three major fundamental sedimentary bodies: jet, leaf, and tree deposits defined by Van Wagoner et al. (2003) for siliciclastic sedimentary systems. Examples of jet, leaf, and tree deposits are shown in FIG. 4. Jet 401 and leaf 402 deposits are composed of a single body while tree deposits 403 consist of composite sedimentary bodies and channels. Due to their simple body shapes and composition, jet 401 and leaf 402 deposits are chosen to illustrate this invention. However, various embodiments of the invention can be applied to other deposits as well. Additionally, various embodiments may be applied to systems other than sedimentary deposits.

The numerical model outputs two classes of variables: flow variables and deposit variables. Flow variables include turbidity current thickness, velocity, concentration, and grain sizes, while deposit variables include deposit layer top/base, grain sizes, porosity, and permeability. Both flow and deposit variables are functions of time and space. They are difficult to use for sensitivity analysis. Instead, the present example focuses on those model responses that have direct implications to reservoir modeling. The main objective for the numerical model is to simulate a sedimentary deposit that represents a particular reservoir of interest. There are several ways to measure the deposit that is being simulated. For jet and leaf deposits 401, and 402, in this example, the model responses of interest are shape and internal composition of the deposit.

Responses that can be defined to measure the shape of a deposit include: deposit aspect ratio (DAR) and deposit volume fraction (DVF)

$$\text{DAR} = L_D/W_D \quad (2)$$

$$\text{DVF} = V_D/V_B \quad (3)$$

where $L_D$ is the deposit length (in the flow direction), $W_D$ is the deposit width (in the cross-flow direction), $V_D$ is deposit sures for a deposit. They can be used as seismic-derived conditioning data for sedimentary process simulation if they are available. Responses that can be measured/observed from well data (cores and logs) are, for example, deposit thickness (THK), net-to-gross (NTG), grain size (GS), sorting (ST), grain size gradient (GSG), and sorting gradient (STG). Well data responses provide the local measures of a deposit along well bores in the deposit. They can be used as well-derived conditioning data for sedimentary process simulation if they are available.

Referring again to the process of FIG. 2, step 202 includes performing Global Sensitivity Analysis (GSA) on the various parameters. GSA, as shown in the illustrated embodiment, includes three sub-steps: 2.1 Latin hypercube sampling, 2.2 sedimentary process simulation, and 2.3 sensitivity analysis.

Once the input parameter space has been constructed, various embodiments represent the space with a finite number of representative points. There are a number of different sampling procedures, e.g., Monte Carlo sampling, importance sampling, orthogonal sampling, and Latin hypercube sampling (LHS) etc., in which LHS is the most efficient and effective (Helton and Davis, 2003) for this example.

McKay et al. (1979) introduced LHS to overcome the slow convergence of the Monte Carlo sampling method. Use of LHS accelerates the convergence of the sampling processes, and as a result, reduces the number of points needed to represent the input parameter space. The basic idea of LHS is to divide the CDF (cumulative distribution function) interval [0, 1] into equal-spaced subintervals and then to use Monte Carlo sampling in each subinterval. Because random sampling is only in smaller intervals rather than in the entire interval, LHS substantially guarantees that every segment of the entire domain of a given input variable can be sampled with equal probability. The use of LHS can reduce unwanted or repeated sampling points.

A correlation structure or correlation matrix is used to generate meaningful results for sensitivity analysis. Iman and Conover (1982) proposed a method for controlling the correlation structure in LHS based on rank correlation and this method can be used in one or more embodiments. The correlation structure within the input parameters is preserved in the sample points. Table 2 shows an example correlation matrix between input parameters.

TABLE 2

| Correlation Matrix (10 × 10) | S | Log ($R_L$) | $C_D$ | $F_r$ | u (m/s) | μ | σ | $r_o$ | φ | α |
|---|---|---|---|---|---|---|---|---|---|---|
| S | 1 | | | | | | | | | |
| Log ($R_L$) | 0 | 1 | | | | | | | | |
| $C_D$ | 0 | 0 | 1 | | | | | | | |
| $F_r$ | 0 | 0.1442 | 0 | 1 | | | | | | |
| u (m/s) | 0 | 0 | 0 | 0.4242 | 1 | | | | | |
| μ | 0 | 0 | 0 | 0 | 0 | 1 | | | | |
| σ | 0 | 0 | 0 | 0 | 0 | −0.6458 | 1 | | | |
| $r_o$ | 0 | 0 | 0 | 0 | 0 | 0 | 0 | 1 | | |
| φ | 0 | 0 | 0 | 0 | 0 | 0 | 0 | 0 | 1 | |
| α | 0 | 0 | 0 | 0 | 0 | 0 | 0 | 0 | 0 | 1 |

There is no universal recommendation on the number of sample points needed for a given embodiment. For Sun et al.'s model in United States Patent Application Publication No. US20070219725 A1, a study by the present inventors shows that one hundred sample points may be good enough for convergence. A test performed by the present inventors shows that seventy-five sample points give almost the same result as that of one-hundred fifty sample points. LHS is available in several commercial software packages, e.g., @RISK™ (a product of Palisade Corporation) which can be used in various embodiments.

As mentioned above, Sun et al.'s numerical model from United States Patent Application Publication No. US20070219725 A1 is chosen to demonstrate one example of this invention. To run the numerical model, embodiments transform the input parameters from the dimensionless space to a dimensional space that has temporal and spatial scales because the numerical model works in a dimensional form. A fifty-two meter thickness of turbidity currents at the inlets is assumed for the transformation. The choice of thickness is arbitrary. The major reason for selecting this thickness is to generate the simulation domain sizes in a range of ten km to four thousand km such that the variation of simulation domain sizes is wide enough to simulate most turbidity currents. Observations of modern turbidity currents show that the size of a turbidity current can be as small as a couple of kilometers (e.g., about nine km for the Rhone delta of Lake Geneva (Lambert and Giovanoli, 1988)) and as large as a thousand kilometers (e.g., about one thousand km for the Grand Banks (Johnson, 1964)). This example simulation domain design is consistent with these observations.

Continuing with the discussion of step 202 of method 200 (FIG. 2), a fixed number of uniformly rectangular cells (100× 150) are chosen for all simulation runs. The inlet (orifice) is placed at the center of the first row of the simulation grid, i.e., cell (75, 1). Length (dy) of each cell is set to be twice of the width (dx) of the cell. The turbidity current at the inlet (orifice) flows toward the y direction into the simulation domain. The width (dx) of the simulation cell for a simulation run is equal to the width of the inlet (orifice) calculated using the given inlet aspect ratio. Because the inlet aspect ratios for the simulation runs are different, the sizes of the simulation cells for different simulation runs are also different.

To make the results for different simulation runs comparable, this example uses an output scheme by which simulation runs are reported at the same dimensionless times. A fixed value of dimensionless time interval (i.e., one thousand) for the simulation result report is used to back calculate the physical time reporting interval for each simulation run. Therefore, simulation results are reported equally spaced in the dimensionless time rather than in the dimensional (physical) time. As a result, the reporting time index can be used as a dimensionless time to estimate dimensionless avulsion time (DAT).

Simulation runs for the sample points generated in the LHS operation can be conducted using either a batch process on a computer or a parallel process on a cluster of computers. Post processing is then used to calculate the model responses (e.g., NTG, DAR, and DVF) from the simulation results as a function of time after the simulation runs are finished. This example focuses on jet/leaf deposits, so that only response values at avulsion time are needed for sensitivity analysis and conditioning. Once all responses have been obtained, a table can be made. Table 3 shows an example table for ten input parameters and four responses in columns and sample points in rows. The discussion now transitions to studying the sensitivity relationships between the input parameters and the responses.

TABLE 3

| Input Parameters | | | | | | | | | | Responses | | | |
|---|---|---|---|---|---|---|---|---|---|---|---|---|---|
| Slope | $R_L$ | $C_D$ | $F_r$ | u | μ | σ | $r_o$ | φ | α | DAT | DAR | NTG | DVF |
| 0.0003 | 21.7909 | 0.0035 | 1.8258 | 11.0000 | 2.5605 | 0.7674 | 1.3915 | 56.6123 | 0.4044 | 17.0 | 0.8505 | 0.9792 | 0.6049 |
| −0.0002 | 9.4809 | 0.0030 | 1.7027 | 12.3992 | 2.5203 | 1.0338 | 1.7254 | 38.2078 | 0.3131 | 13.0 | 0.6104 | 0.9517 | 0.6076 |
| −0.0001 | 38.0455 | 0.0032 | 1.7700 | 2.3675 | 3.1497 | 0.8176 | 1.8648 | 36.6814 | 0.3484 | 17.00 | 0.7423 | 0.8556 | 0.5746 |
| −0.0005 | 65.7192 | 0.0029 | 2.2246 | 20.9759 | 2.6812 | 0.8383 | 2.0209 | 48.3773 | 0.3277 | 5.00 | 0.2731 | 0.9640 | 0.5446 |
| 0.0003 | 19.2778 | 0.0035 | 2.1223 | 4.4762 | 2.4584 | 1.3084 | 1.4964 | 42.7168 | 0.4287 | 52.00 | 0.8249 | 0.8844 | 0.5295 |
| 0.0000 | 21.0316 | 0.0044 | 1.8418 | 6.7690 | 2.0079 | 1.1405 | 2.0795 | 44.2212 | 0.3190 | 11.00 | 0.8685 | 0.9683 | 0.5533 |
| 0.0000 | 73.0922 | 0.0066 | 2.1115 | 15.3081 | 2.2960 | 1.0388 | 1.5544 | 63.5907 | 0.3423 | 6.00 | 0.6504 | 0.9751 | 0.5696 |
| −0.0002 | 153.0370 | 0.0065 | 1.9612 | 10.6964 | 2.5414 | 1.2017 | 1.4691 | 38.5297 | 0.3871 | 4.00 | 0.4892 | 0.9234 | 0.5361 |

TABLE 3-continued

| | Input Parameters | | | | | | | | | Responses | | | |
|---|---|---|---|---|---|---|---|---|---|---|---|---|---|
| Slope | $R_L$ | $C_D$ | $F_r$ | u | μ | σ | $r_o$ | φ | α | DAT | DAR | NTG | DVF |
| 0.0002 | 12.9801 | 0.0045 | 2.2909 | 10.1878 | 2.7863 | 0.9606 | 1.5239 | 44.9361 | 0.4341 | 30.00 | 0.7442 | 0.9315 | 0.6119 |
| −0.0001 | 23.3645 | 0.0044 | 2.3286 | 7.4035 | 2.5149 | 1.2616 | 1.6865 | 37.5204 | 0.4146 | 28.00 | 0.7357 | 0.9003 | 0.5567 |
| 0.0002 | 40.3065 | 0.0060 | 1.6530 | 5.6599 | 2.6973 | 0.7905 | 1.2863 | 40.1521 | 0.3535 | 12.00 | 0.8676 | 0.9605 | 0.5674 |
| −0.0004 | 124.3263 | 0.0038 | 1.4184 | 15.6027 | 3.0898 | 0.9101 | 1.8453 | 48.7710 | 0.3558 | 4.00 | 0.1484 | 0.8647 | 0.5338 |
| −0.0003 | 11.0225 | 0.0038 | 1.6091 | 8.6176 | 2.0909 | 1.2337 | 1.6342 | 46.1553 | 0.4122 | 21.00 | 0.7268 | 0.9583 | 0.5572 |
| 0.0001 | 31.7996 | 0.0057 | 1.6780 | 6.1773 | 2.7167 | 0.8082 | 1.5339 | 46.7739 | 0.4541 | 17.00 | 0.7424 | 0.9520 | 0.5705 |
| −0.0002 | 473.4264 | 0.0023 | 1.8534 | 7.6204 | 2.9237 | 0.9165 | 1.2114 | 47.9820 | 0.3291 | 12.00 | 0.6059 | 0.9012 | 0.4657 |
| −0.0002 | 4.9275 | 0.0052 | 1.7905 | 10.5077 | 2.3727 | 1.0685 | 2.6809 | 41.9106 | 0.2975 | 17.00 | .06910 | 0.9561 | 0.6240 |
| 0.0003 | 10.3724 | 0.0047 | 2.0213 | 9.7190 | 2.2032 | 0.9952 | 1.7962 | 43.4911 | 0.3726 | 29.00 | 0.8826 | 0.9793 | 0.5670 |
| 0.0003 | 9.7348 | 0.0059 | 2.2787 | 7.1816 | 2.5538 | 1.1670 | 1.9923 | 53.2625 | 0.4406 | 42.00 | 0.7971 | 0.9299 | 0.6119 |
| 0.0001 | 42.0061 | 0.0050 | 2.0907 | 5.7766 | 2.5706 | 0.8690 | 1.7607 | 41.1588 | 0.3337 | 18.00 | 0.8033 | 0.9520 | 0.5417 |
| −0.0006 | 25.4667 | 0.0032 | 2.5047 | 12.8676 | 2.5863 | 0.6718 | 2.0079 | 50.2870 | 0.3911 | 18.00 | 0.4494 | 0.9876 | 0.5631 |
| −0.0003 | 29.2261 | 0.0029 | 1.5675 | 5.9249 | 2.3103 | 1.0135 | 1.7103 | 43.8036 | 0.3147 | 11.0 | 0.8426 | 0.9556 | 0.5347 |
| −0.0007 | 15.3826 | 0.0056 | 1.5222 | 11.4041 | 2.0184 | 1.2911 | 1.4442 | 45.3951 | 0.3611 | 10.00 | 0.3074 | 0.9586 | 0.5646 |
| −0.0003 | 118.8778 | 0.0041 | 2.1466 | 12.0811 | 3.5083 | 0.8872 | 2.0439 | 64.1734 | 0.4547 | 7.00 | 0.4219 | 0.7473 | 0.5748 |
| 0.0001 | 33.4503 | 0.0039 | 2.2083 | 5.4978 | 3.0034 | 0.9529 | 1.7669 | 47.2502 | 0.3830 | 30.00 | 0.7683 | 0.8557 | 0.5763 |

The basic assumption for the sensitivity analysis used in this example is that the relationships between the model responses and input parameters are linear. If a linear relationship between an input and a response does not exist, at least one transformation may be used to create a linear relationship. There are two types of nonlinearities between an input parameter and a response: monotonic and non-monotonic. Various embodiments use a monotone transformation method to transform a non-monotonic relationship to a monotonic relationship. The second transformation method that can be used is the rank transformation method that transforms a monotonic nonlinear relationship to a normalized linear relationship. When relationships between responses and input parameters are monotonic, only rank transformation is typically needed because a monotonic relationship already exists. Otherwise, both the monotonic and rank transformations should be used.

Helton and Davis (2003) proposed a method to handle non-monotonic relationships between responses and input parameters and the method may be used in various embodiments. Their method first divides the values of an input parameter into a sequence of mutually exclusive and exhaustive subintervals containing equal numbers of sampled values, and then three statistical tests (F-test, $\chi^2$-test, and Kruskal-Wallis test) are performed. The three tests for non-monotonic relationships can identify input parameters that might otherwise be missed using standard regression-based sensitivity analysis.

The rank transformation is an effective transformation that transforms raw data from nonlinear to linear. The analysis with rank-transformed data is typically more effective than the analysis with raw data (Iman and Conover 1979, Conover and Iman 1981, Saltelli and Sobol 1995). Rank transformation standardizes input/response automatically, but it is generally only appropriate for monotonic relationships.

Once the rank transformed responses and input parameters have been obtained, sensitivity analysis is performed. Sensitivity analysis, in this example, is a process that determines the effects of individual input parameters on the individual responses. The effects can be ordered according to the magnitudes of their values to demonstrate the relative importance of each input parameter on a given response and the order can be shown in a tornado chart. FIG. 1 illustrates exemplary sensitive 101, insensitive 103, and oversensitive 102 relationships in an intuitive format.

The sensitivity analysis of this example is based on the following linear model between the rank transformed input parameters and a rank transformed response $$y_r = \sum_{k=1}^{N} s_k x_{rk} + \varepsilon \tag{5}$$

where $y_r$ is a rank transformed response, $s_k$ is the sensitivity coefficient of the $k^{th}$ input parameter to the given response, $x_{rk}$ is the $k^{th}$ rank transformed input parameter, N is the number of input parameters, $\varepsilon$ is a random error with zero mean. $s_k$ is also called SRRC (standard rank transformed regression coefficient). It is a measure of the sensitivity between an input parameter and a response.

Figure 7:
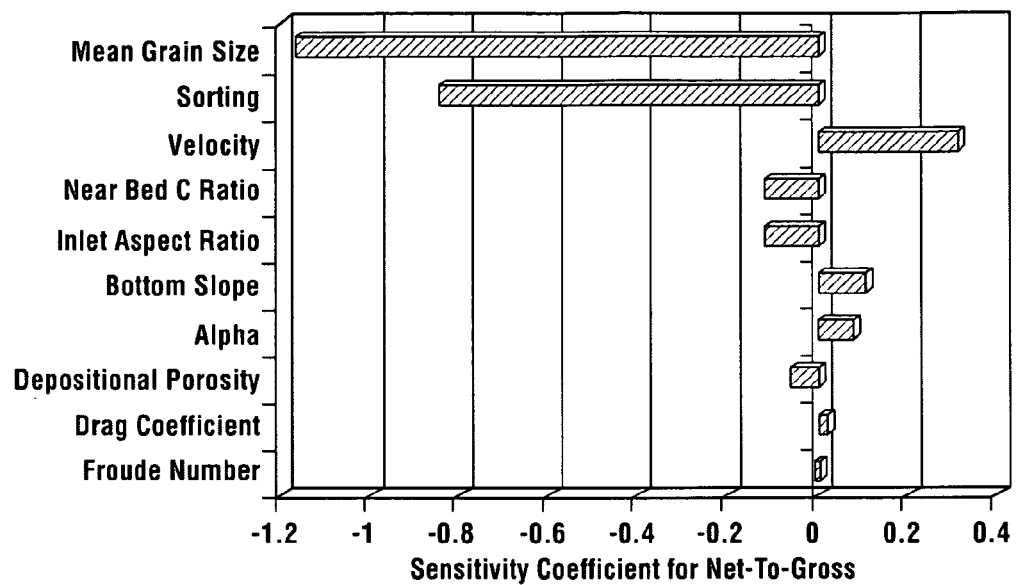
FIG. 7 is an example graph, according to one embodiment of the invention, ranking sensitivity for a variety of input parameters with respect to the NTG response.

A standard regression method may be used to estimate $s_k$. A positive $s_k$ means the given response is positively correlated with the $k^{th}$ input parameter, i.e., the response increases as the $k^{th}$ input parameter increases. By contrast, a negative $s_k$ means a negative correlation between the given response and the $k^{th}$ input parameter or the response decreases as the $k^{th}$ input parameter increases. A larger magnitude for $s_k$ ($|s_k|$) indicates that the $k^{th}$ input parameter is more sensitive to the response while a smaller $|s_k|$ means that the $k^{th}$ input parameter is less sensitive to the response. An example of the importance of the input parameters is shown in FIG. 7 as a tornado chart wherein parameters near the top are generally considered to be more important to the particular analysis. The p-value of the t-hypostasis test for $s_k$ is used to check if $s_k$ affects $y_r$. Generally, there is no effect of the $k^{th}$ input parameter on the given response if the p-value is smaller than 0.02. If the input parameters are correlated and the number of input parameters is large, a stepwise regression analysis may be used to detect interactions between variables and to protect against over fit.

Figure 8:
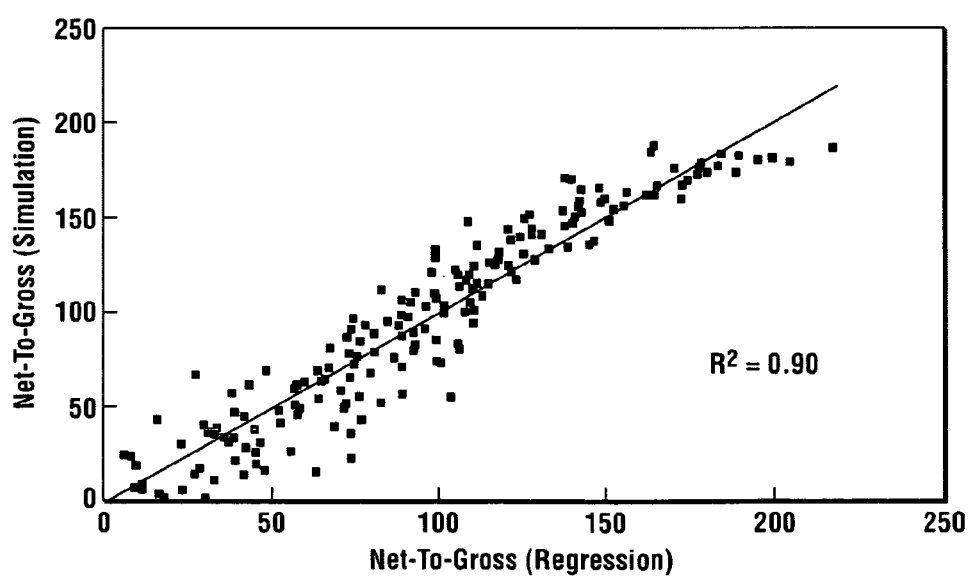
FIG. 8 is an example cross plot of NTG between simulation and sensitivity model, according to one embodiment of the invention.

It is also useful to check the cross plot of a response between simulation (results from numerical simulations) and sensitivity model (results calculated using Equation 5) and $R^2$ of the regression. $R^2$, the coefficient of determination, is the proportion of the variability of the response that is attributed to the estimated regression line. A larger $R^2$ (>0.7) indicates a good fit of Equation 5, i.e., a higher confidence of the sensitivity results. FIG. 8 shows an example cross plot of NTG between simulation and sensitivity model.

Referring again to FIG. 2, in step 203 response maps and volumes are created. RMV includes two sub-steps: (3.1) multidimensional scaling (MDS) and (3.2) response maps (2D)/volumes (3D).

The relationship between a numerical model response and its input parameters is typically defined in the multidimensional input parameter space that is difficult to visualize and explore due to its high dimensionality. MDS provides a useful tool to visualize the input parameter space in a two or three dimensional space. This discussion denotes the relationship for a response in the two-dimensional space a "response map" and in the three-dimensional space a "response volume."

MDS has been developed primary in psychology and has been applied successfully in psychology, political science, and marketing in the last several decades (Borg and Groenen, 1997, pp. 1-14). It is almost unknown in engineering and geology. MDS is a statistical technique used to analyze the structure of similarity/dissimilarity data in multidimensional space. There are four MDS roles (Borg and Groenen, 1997, pp. 1-14): (1) as a method that represents similarity/dissimilarity data as distances in a low-dimensional space to make these data accessible to visual inspection and exploration, (2) as a technique that allows testing of structural hypotheses, (3) as a psychological model for exploring psychological structures, and (4) as a data-analytic approach that allows discovery of the dimensions that underlie judgments of similarity/dissimilarity. The first role is quite useful in this example embodiment.

The MDS described in this example includes a method that represents a set of sampling points obtained in a higher multidimensional parameter space in a lower multidimensional space, usually a two- or three-dimensional space, while maintaining the proximity (e.g., distance) among the sampling points. There are several ways to describe the proximity among the sampling points. The proximity can be defined as a similarity or dissimilarity. Similarity can be described using, e.g., Pearson correlation coefficient while dissimilarity can be measured using, e.g., Euclidean distance. Therefore, the MDS method used in this example has the ability to preserve the Euclidean distances between the sampling points from the original high-dimensional space to a two- or three-dimensional space. The Euclidean distance between sample points i and j is defined as in the following formula $$d_{ij} = \sqrt{\sum_{k=1}^{N} (x_{ki} - x_{kj})^2} \quad (6)$$

where $d_{ij}$ is the Euclidean distance between sample points i and j, $x_{ki}$ and $x_{kj}$ are the $k^{th}$ input parameter of sample points i and j, respectively. There are several different MDS models: absolute, ratio, interval, and ordinal, which can be used in various embodiments of the invention. This example focuses on the absolute MDS model in which each dissimilarity $d_{ij}$ must match the distance between sample points i and j in the representation space.

As mentioned above, the MDS of this example preserves the distances between sampling points after the number of the dimensions of the multidimensional space has been reduced. However, no matter how well the points are transformed, there is always a change in the distances between sampling points when spatial dimension changes. The measure of the distance changes for sampling points in a lower dimensional space is called stress, a terminology from psychology. Stress measures the error caused by the deduction of spatial dimension. Several formulas can be used to define a stress. The most suitable definition for this example is Kruskal's stress-1 (Kruskal, 1964)

$$\text{Stress} = \sqrt{\frac{\Sigma(D_{ij} - d_{ij})^2}{\Sigma d_{ij}^2}} \quad (7)$$

where $D_{ij}$ is the dissimilarity between points i and j (the distance in the original multidimensional space), $d_{ij}$ is the distance between i and j in a lower dimensional space. Stress measures the quality of the scaling for a given number of dimensions. The lower the stress, the better the scaling. A majorization algorithm (De Leeuw, 1977; Mathar, 1989) is used to minimize Equation 7 for a given number of dimensions in this example.

Figure 9:
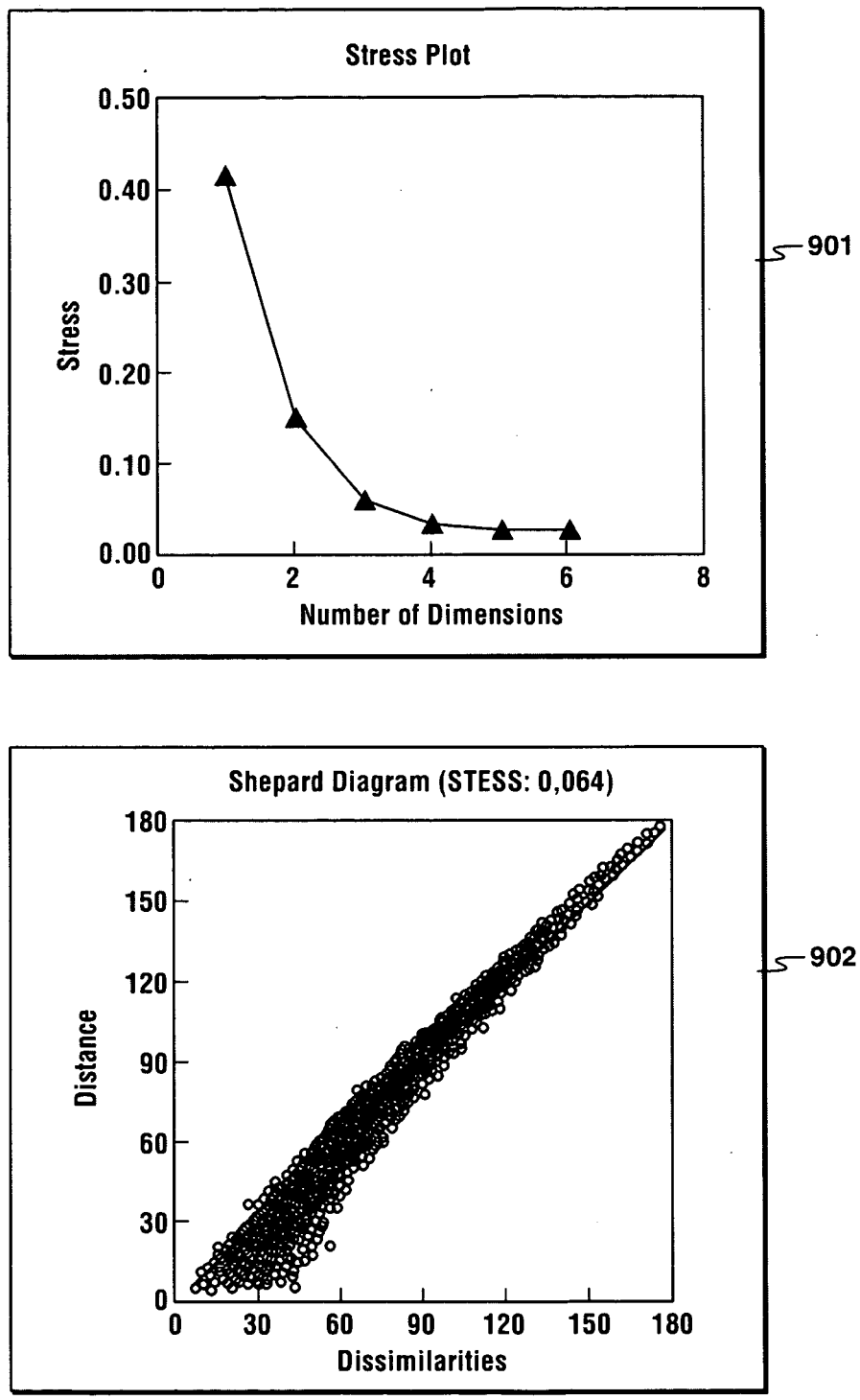
FIG. 9 includes example illustrations of stress that can be used in embodiments of the invention to determine the appropriateness of Multi Dimensional Scaling approaches.

There are at least two useful plots that can be used to check the quality of MDS and the minimum number of dimensions required to obtain an adequate quality of MDS. The first plot is the stress plot that shows the stress (the vertical axis) as a function of the number of dimensions (the horizontal axis). FIG. 9 shows example stress plot 901. Another plot is Shepard diagram 902 that is a cross plot between distance $d_{ij}$ (the vertical axis) and dissimilarity $D_{ij}$ (the horizontal axis) for a given dimension. FIG. 9 shows an example Shepard diagram 902 for a stress of 0.064. A Shepard plot gives an intuitive picture about the quality of MDS.

Based on experience with experimental and synthetic data, Kruskal (1964) suggested that the measure of the quality of MDS is (1) perfect if stress=0, (2) excellent if stress=0.025, (3) good if stress=0.05, (4) fair if stress=0.1, and (5) poor if stress=0.2. Kruskal's suggestion can be adapted in this example as well. The number of dimensions for visualization can be determined based on a given acceptance criteria. For example, if an acceptance criterion is at least a "fair", i.e., stress≤0.1, the case shown in stress plot 901 and FIG. 9 should have three dimensions to represent an acceptable response map. Borg and Groenen (1997, pp. 38) argued that Kruskal's above classification may not work because a need for more systematic insights into how stress depends on the number of points, the dimensionality of the MDS solution, the kind and amount of error in the proximities, and the type of the underlying true configuration. One intuitive technique is to look at an "elbow" in a stress curve, which is a point where the decrements in stress begin to be less pronounced. The elbow gives an indication of the dimensionality that should be chosen. In this example, Kruskal's classification and the "elbow" point concept are used to determine the number of dimensions that should be used.

Continuing with the discussion of step 203 of this embodiment, there are three aspects to using MDS for sedimentary process conditioning. The first aspect is creating the sensitivity-based input parameter space. The second aspect is calculating similarity/dissimilarity matrix. The third aspect is performing MDS analysis.

The first of the foregoing aspects of MDS is creating a sensitivity-based input parameter space. The original input parameter space may be very difficult to visualize because the magnitude of parameter values in each dimension can be very different, for example, slope is on the order of $10^{-4}$ while inlet aspect ratio is on the order of $10^2$. As mentioned above, the rank transformation can be used to normalize the input parameter space, thereby compensating for different magnitudes of parameter values. Furthermore, the sensitivity study has shown that the input parameters do not equally contribute to a given response. Therefore, it is possible to scale the rank transformed input parameters based on their contributions to the given response. Based on Equation 5, the rank transformed input parameters should be scaled by using the absolute value of the sensitivity coefficients. The sensitivity-based input parameter space is constructed using the following formula $$X_{kj}=|s_k|x_{rkj}, (k=1,2,\ldots,N, j=1,2,\ldots,n_s) \qquad (8)$$

where $X_{kj}$ is the new $k^{th}$ input parameter for the $j^{th}$ sampling point.

The second of the foregoing aspects of MDS is calculating the similarity/dissimilarity matrix, i.e., the Euclidean distance matrix. The Euclidean distance between any two sampling points in the sensitivity-based input parameter space is calculated using Equation 6.

The last of the foregoing aspects of MDS is performing MDS analysis. A tool that can be used in some embodiments is XLSTAT™, a commercial software package developed by Addinsoft. Using XLSTAT™, MDS is selected with the dissimilarity matrix, absolute model, and dimensions from one to six to construct the stress plot (e.g., 901 of FIG. 9) from which the number of dimensions needed can be determined. Once the number of dimension is chosen, a Shepard diagram (e.g., 902 of FIG. 9) can be created to check the quality of MDS. If a user is satisfied with the MDS results, the next step is to construct response maps/volumes in part 3.2 of step 203.

Figure 10:
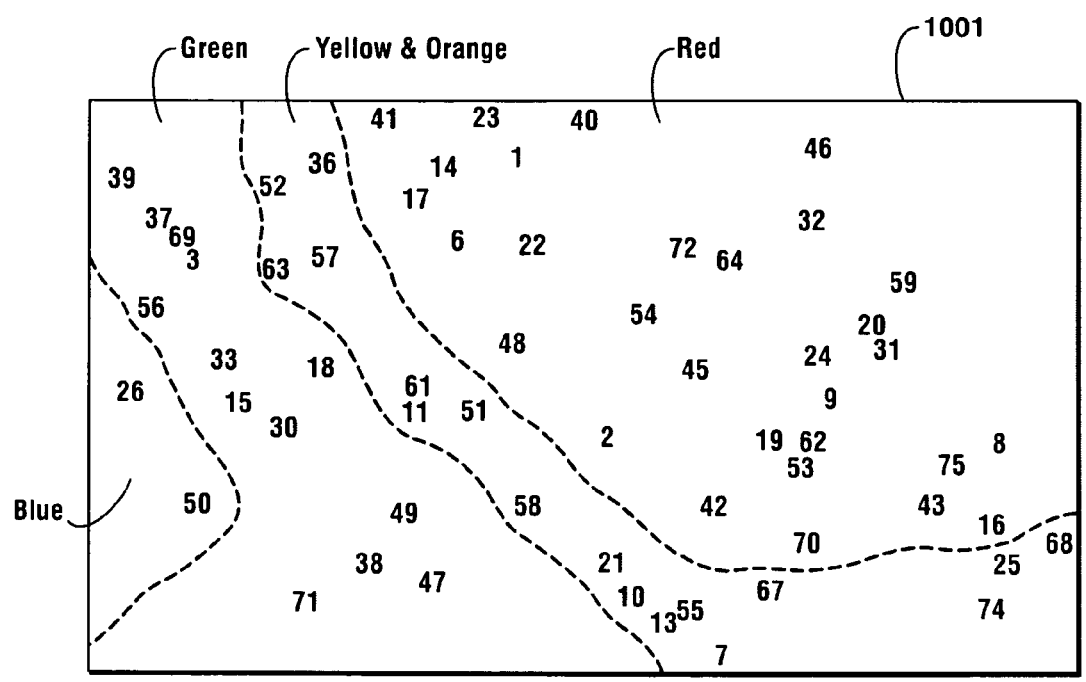
FIG. 10 is an example of a two-dimensional response map in which color indicates changes in value for NTG, according to one embodiment of the invention.

If the MDS analysis shows that a two-dimensional (2D) response map is adequate, the next step is to create a 2D map using one or more standard mapping algorithms, for example, Kriging. The Kriging technique includes a linear least squares estimate algorithm that interpolates the value of a field at an unknown location from observations of its value at nearby locations. The Kriging technique is used in many industries and scientific fields, e.g., mining, hydrology, petroleum, and environment science. FIG. 10 shows an example 2D response map 1001 in which the color represents NTG that changes from a large value in red color to a small value in blue color. Response map 1001 is in black and white but is adapted from a color map with a continual progression of color change from red to blue. For ease of illustration, areas are indicated in map 1001 where one or more colors dominate. The sampling points are represented with their sample point identifications (this is a seventy-five sample-point set with the sample identification changing from one to seventy-five). From response maps, the relationship between the given response and its input parameters can be visualized by a human user who is used to one-, two-, and three-dimensional concepts. Because 2D is typically easier to visualize than three-dimensional (3D), many embodiments use 2D when 2D is adequate.

Figure 11:
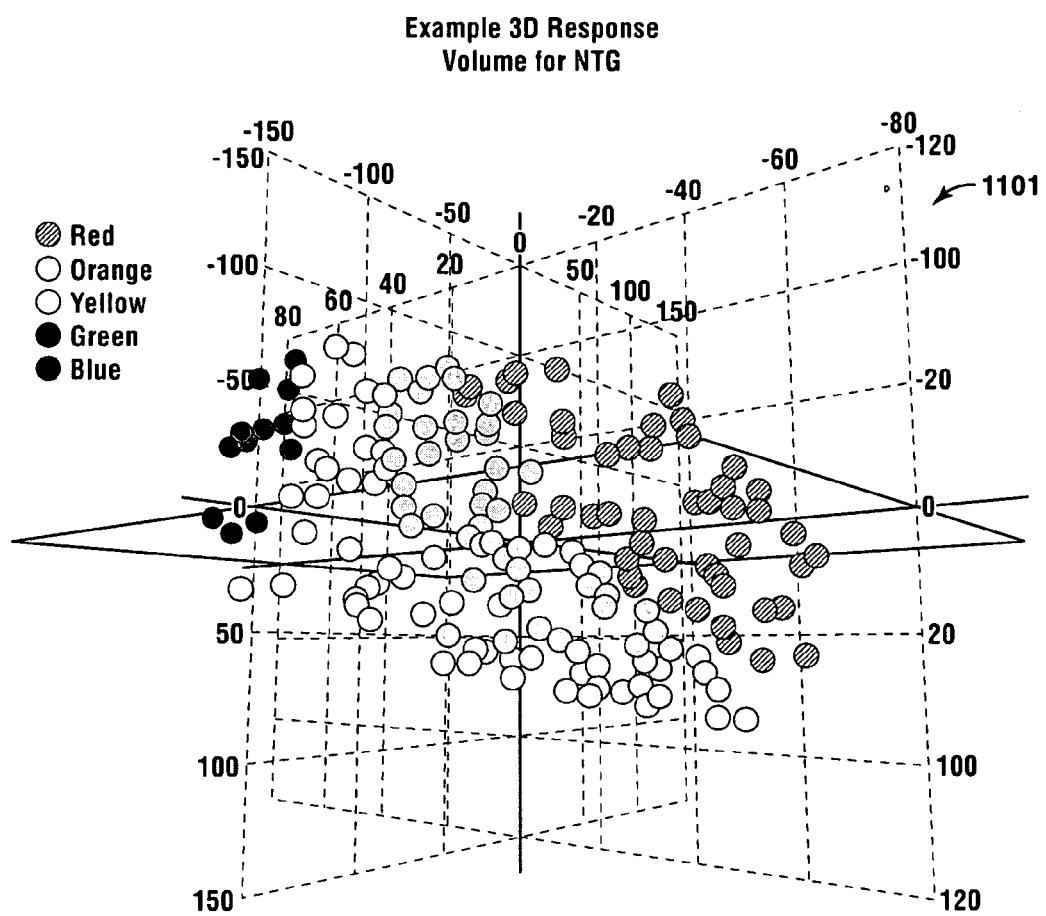
FIG. 11 is an example three-dimensional response volume in which the response is NTG and its value changes as color changes, according to one embodiment of the invention.

When the MDS analysis results show that a three-dimensional space is more favorable for a given space, many embodiments use 3D plot functionality in, e.g., XLSTAT™ to create a 3D response volume in which the value of a response is represented by the size and color of a point in the scaled three-dimensional space. There are many options in XLSTAT™ that can be used to represent the value of a response. FIG. 11 shows example 3D response volume 1101 in which the response is NTG and its value increases as the color (size) of a sampling point changes from blue (small) to red (large). Volume 1101 is in black and white but is adapted from a color volume in which the spheres include a color. For ease of illustration, areas of volume 1101 wherein one or more colors dominate are noted.

In step 204, sedimentary process simulations are conditioned to seismic data. The goal of this step is to find an intermediate solution space (i.e., seismic-conditioned ensemble) where model responses match the measured/observed seismic data.

Figure 12A:
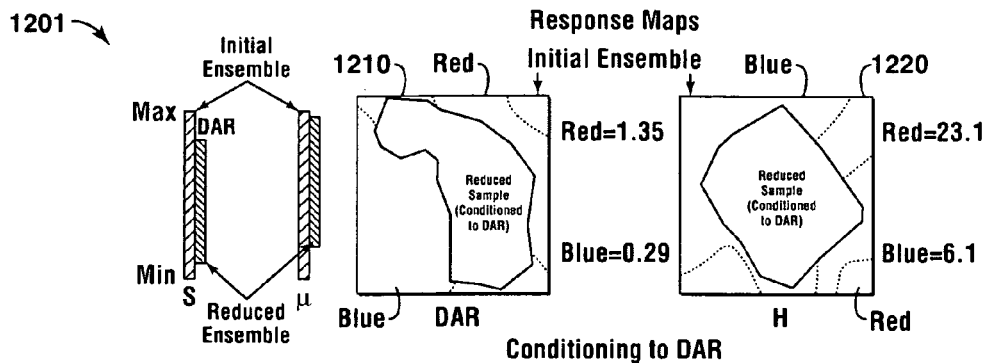
FIGS. 12a and 12b are illustrations of the conditioning procedures to DAR and to both DAR and H, respectively, according to one embodiment of the invention.
Figure 12B:
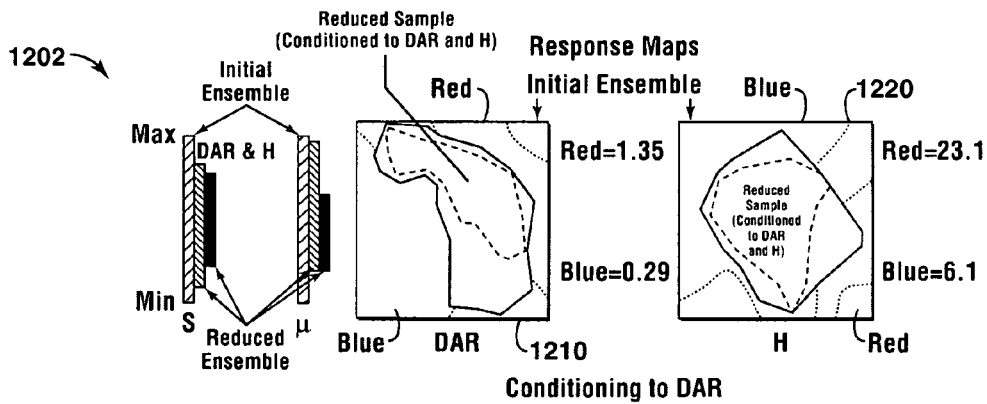

For ease of presentation, only two responses (DAR and H) that could be measured/observed from seismic surveys and two input parameters (S and μ) are chosen to demonstrate the conditioning process. However, it is noted that the use of other responses or more responses is within the scope of embodiments. FIG. 12*a* shows the conditioning procedures for DAR, and FIG. 12*b* shows the conditioning procedures for both DAR and H. Bars 1201 and 1202 show the ranges of the input parameters while 2D response maps 1210 and 1220 show the parameter space mapped to DAR and H values. Because the vertical and horizontal coordinates of maps 1210 and 1220 are nonlinear functions with the input parameters, the coordinates and their scales cannot be displayed meaningfully. In MDS, the coordinates are usually called dimensions one and two for a 2D map. As with FIG. 10, 2D response maps 1210 and 1220 are adapted from color but are in black and white. While not shown herein, the color in DAR maps 1210 gradually change from red to blue from the top right corner to the bottom left corner. In H maps 1220, the color changes from red in the lower right corner to blue in the top left corner.

The conditioning process starts with the initial ensemble (the unconditioned parameter space represented by bars and initial response maps) that is large enough to encompass the solutions to the given values of responses. For a given range of a response, e.g., a value±percent error (uncertainty) of DAR, a subspace of the initial ensemble can be defined using the constraint of the value range of the response. This leads to a reduced ensemble as shown in the reduced area on response map 1210 for DAR in FIG. 12*a*. The reduced ensemble can be represented on other response maps, e.g., response map 1220 for H. The reduced ensemble can also be illustrated using bars 1202 for the input parameters. Bars 1201 of FIG. 12*a* show that the ranges of the input parameters (S and μ) are shrunk to the reduced ensemble after being conditioned to the given values of DAR. The reduced ensemble further shrinks to contain the only values of given H on response map 1220 in FIG. 12*b*. The further reduced ensemble can also be shown on other maps, e.g., response map 1210 illustrated in FIG. 12*b*, and bars 1201 and 1202 of the input parameters. Any of bars 1201, 1202 and/or maps 1210, 1220 can be displayed to a user when using one or more embodiments of the present invention. The same process is repeated for all other responses until the constraints of the values of all given responses have been applied.

The process shows a continuous improvement in which the ensemble shrinks when new response data is added. The size of the ensemble can shrink to be very small compared to that of the initial ensemble, but the ensemble does not shrink to a single point unless perfect data and knowledge are available (and they are not in real world systems). The reduced ensemble is the seismic-conditioned ensemble (intermediate solution space) shown in FIG. 2.

In step 205, steps 201-203 are repeated to prepare for conditioning with one or more setup responses. Before conditioning sedimentary process simulation to wells, steps 201-203 are performed. Step 205 includes constructing the new range and distribution function for each input parameter based on the seismic-conditioned ensemble. This is typically straightforward because a range for each input parameter is known after the seismic-conditioned ensemble is generated in previous steps. In this example, the uniform distribution for each input parameter is assumed because the range for each parameter is an interval(s) of the original distribution function and a uniform distribution is the simplest form of distribution functions that can be used to fit the original distribution function in that interval(s). The assumption of using the uniform distribution function is good if the range (interval) for each input parameter is small, otherwise more complicated distribution functions may be more appropriate, e.g., using the truncated portion of the distribution functions shown in FIG. 3 with the new ranges of parameters.

Once the new range and distribution function for each input parameter are constructed, steps 201-203 are repeated. New LHS sample points are generated from the seismic-conditioned ensemble and GSA is carried out using the responses defined at each well: deposit total thickness (THK), net-to-gross (NTG), grain size (GS), sorting (ST), grain size gradient (GSG), and sorting gradient (STG). THK, NTG, GS, and ST are all defined for the entire interval of the intersection between a well and a deposit while GSG and STG are the average gradients of local (layer-based) GS and ST in the entire interval, respectively. After finishing GSA, the response maps/volumes for each well are created.

In step 206, sedimentary process simulations are conditioned to well data. The last step for exemplary SSM method 200 is to condition the reduced ensemble to well data (responses). The conditioning method for well data is similar to the seismic-conditioning method except different responses are used. The former applies the model responses measured at each well location and the latter utilizes the model responses measured for the entire deposit. Following a similar procedure described in step 204, the size of the seismic-conditioned ensemble is expected to be continuously reduced. If the process is successful, the final solution space, i.e. the well- and seismic-conditioned ensemble, is created, and then the entire conditioning process for sedimentary process simulation using SSM is finished.

An overview of one SSM embodiment is given above. The following discussion describes one synthetic case using synthetic data according to one embodiment of the invention. The test case conditions sedimentary process simulations to seismic data first and then conditions the simulations to well data. The test case also shows the use of sensitivity analysis and MDS.

A. Conditioning to Seismic Data

Figure 13:
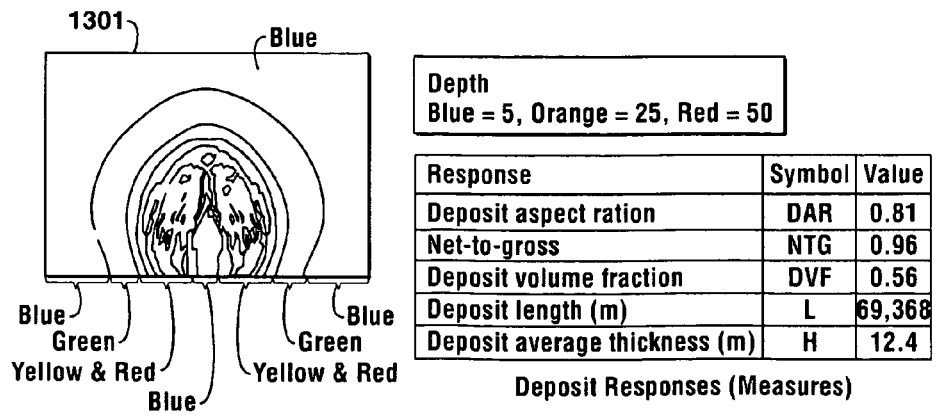
FIG. 13 is an illustration of conditioning sedimentary numerical models to seismic data, according to one embodiment of the invention. The thickness map for the deposit of this case (a jet/leaf deposit) is illustrated, as are the model responses that may be estimated from a seismic survey.

FIG. 13 shows a case to demonstrate a method of conditioning sedimentary numerical models to seismic data, according to an embodiment of the invention. Thickness map 1301 for the deposit of this case (a jet/leaf deposit) is illustrated, and the model responses that may be estimated from a seismic survey are shown in the table next to map 1301. Thickness map 1301 is a black and white illustration adapted from a color illustration where color indicates depth. For ease of illustration, the color has been removed from map 1301 but is indicated in text. The thickness of the deposit varies in a range from zero to fifty meters. The estimated responses for the deposit are DAR=0.81, NTG=0.96, DVF=0.56, L=69,368 (m), and H=12.4 (m). These responses are assumed to be known in this test case. Table 4 summarizes the true input parameters that are used to generate the deposit. These input parameters, called "truth" in the case study, are assumed to be unknown in the conditioning process and are almost always unknown in real world studies. In this case, truth parameters are used to validate the solution from conditioning. Because it is generally impossible to measure the deposit from a seismic survey precisely in reality, uncertainties are always associated with the estimated responses. Table 5 summarizes the uncertainty and range for each response that is applied in the conditioning case study. Notice that the 5% uncertainty assumption for NTG is too low for a complex deposit (tree deposit) because no currently available seismic survey is able to measure NTG with such accuracy. However, for jet/leaf deposits, the 5% uncertainty for NTG is a reasonable assumption. Seventy-five sample points are generated using LHS for the seismic conditioning study.

TABLE 4

| Input Parameters | Symbol | Value |
|---|---|---|
| Slope (degree) | S | 0.0128 |
| Inlet aspect ratio | $R_L$ | 31 |
| Drag coefficient | $C_D$ | 0.0038 |
| Froude number | $F_r$ | 2.06 |
| Velocity (m/s) | V | 8.09 |
| Inlet mean grain size (μm) | μ | 209 |
| Inlet sorting | σ | 1.05 |
| Near bed concentration ratio | $r_o$ | 2.02 |
| Depositional porosity | φ | 0.45 |
| Alpha | α | 0.5 |

TABLE 5

| Response | Symbol | Value | Δ % | Min | Max |
|---|---|---|---|---|---|
| Deposit aspect ratio | DAR | 0.81 | 10 | 0.729 | 0.891 |
| Net-to-gross | NTG | 0.96 | 5 | 0.912 | 1.008 |
| Deposit volume fraction | DVF | 0.56 | 10 | 0.504 | 0.616 |
| Deposit length (m) | L | 69,368 | 20 | 55494 | 83242 |
| Deposit average thickness (m) | H | 12.4 | 20 | 9.92 | 14.88 |

For ease of presentation, FIGS. 14-18 are organized in a uniform way to demonstrate this embodiment of the invention. There are three features for each of FIGS. 14-18. The first feature is the conditioning (measured/observed) data that includes the given response values and their uncertainties (Δ%, percent errors) shown on the upper right corner of each figure. The second feature is the parameter space that is illustrated with vertical bars 1410, 1510, 1610, 1710 and 1810. The legends for bars 1410, 1510, 1610, 1710, and 1810 can be found on the upper left corner of each figure. Vertical bars 1410, 1510, 1610, 1710, and 1810 show the range of each input parameter as a function of conditioning data where the left-most bars in each set represent the entire parameter space (initial ensemble). The changes of bars 1410, 1510, 1610, 1710, and 1810 from left to right in each grouping reflect the change of the ensemble due to the constraints of the given responses imposed on the parameter space. The third feature is response maps 1420, 1520, 1620, 1720 and 1820. Response maps 1420, 1520, 1620, 1720 and 1820 are labeled with their corresponding response names. The 2D maps (e.g., maps 1420a-d) are the responses that define the entire parameter space (initial ensemble) while the irregular polygons therein represent the reduced ensemble in which the values of response maps match the given responses and uncertainties. In FIGS. 14-18, response maps 1420, 1520, 1620, 1720 and 1820 are adapted from color maps, as with FIGS. 12a and 12b. In each of FIGS. 14-18, response maps 1420, 1520, 1620, 1720 and 1820 are the same, except that the polygons therein change as conditioning is performed. As more conditioning data is given, the polygons in each map 1420, 1520, 1620, 1720 and 1820 are expected to shrink if the new given conditioning data has an impact on the ensemble (i.e., is sensitive to the input parameters).

Figure 14:
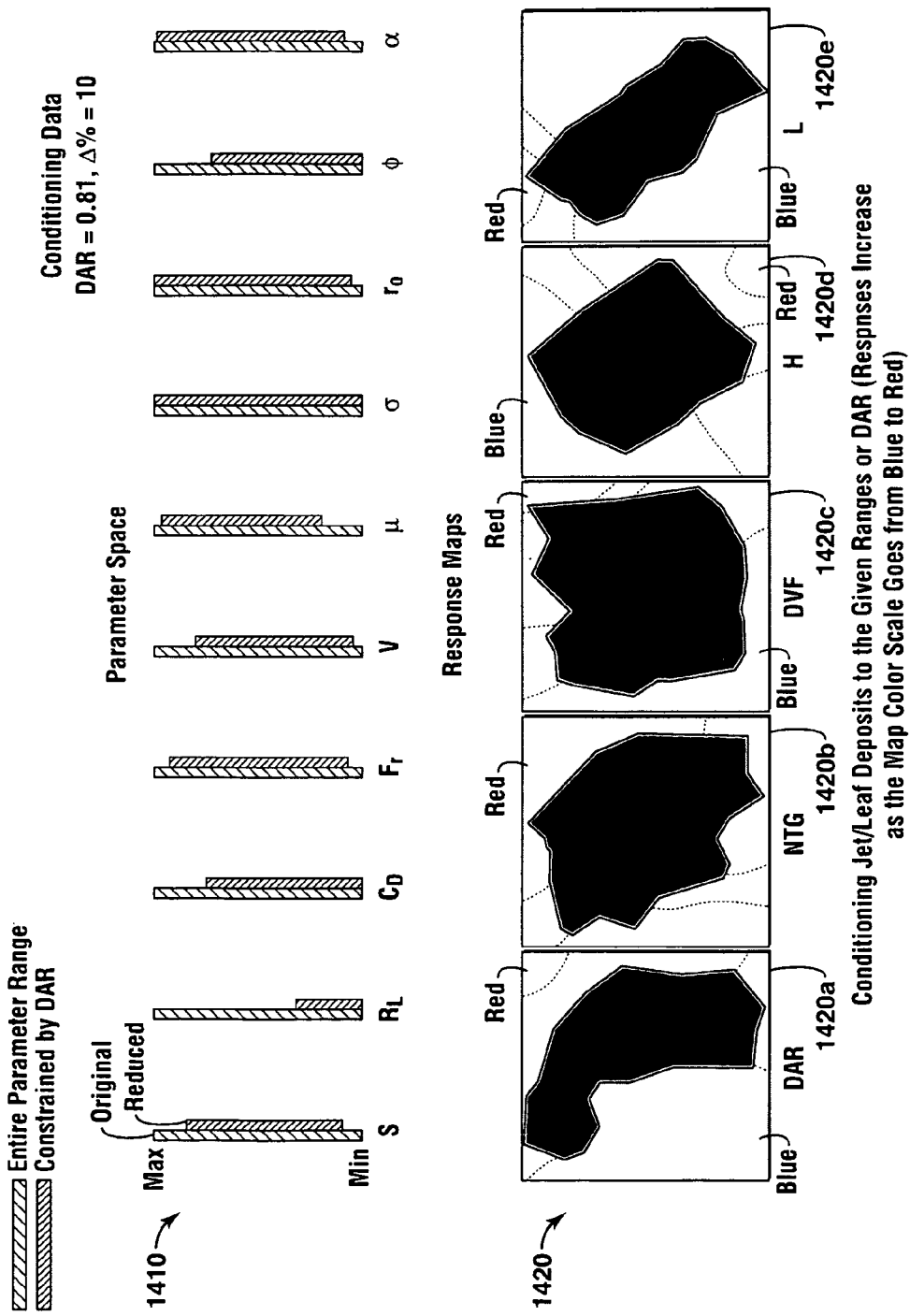
FIG. 14 is an illustration of a reduced ensemble after the parameter space is conditioned to a given DAR and its uncertainty.

FIG. 14 shows the reduced ensemble after the parameter space is conditioned to the given DAR (0.8) response and its uncertainty (10%). The conditioning process begins by digitizing a polygon on DAR response map 1420a. The values of DAR inside the polygon fall in the given range of DAR. Once the polygon is constructed, it can be displayed on other response maps, e.g., NTG, DVF, H, and L shown in FIG. 14. These polygons, the shapes of which can be very different on different response maps, are the representations of the reduced ensemble and serve as an intuitive illustration for human users. The reduced ensemble can also be shown in the parameter space as the vertical (right-hand) bars of each small grouping of bars 1410 in FIG. 14 that represent the reduced range of each parameter with new minimum and maximum. In other words, the reduced ensemble can be visualized using vertical bars 1410 in the parameter space and the polygons on response maps 1420. Both the polygons and vertical bars 1420, 1520, 1620, 1720, and 1820 in FIGS. 14-18 show that conditioning to the given DAR is successful because the size of the ensemble is reduced. The input parameters with the largest changes are slope (S), inlet aspect ratio ($R_L$), mean grain size ($\mu$), velocity (V), drag coefficient ($c_D$), Froude number ($F_r$), and depositional porosity ($\phi$).

Figure 15:
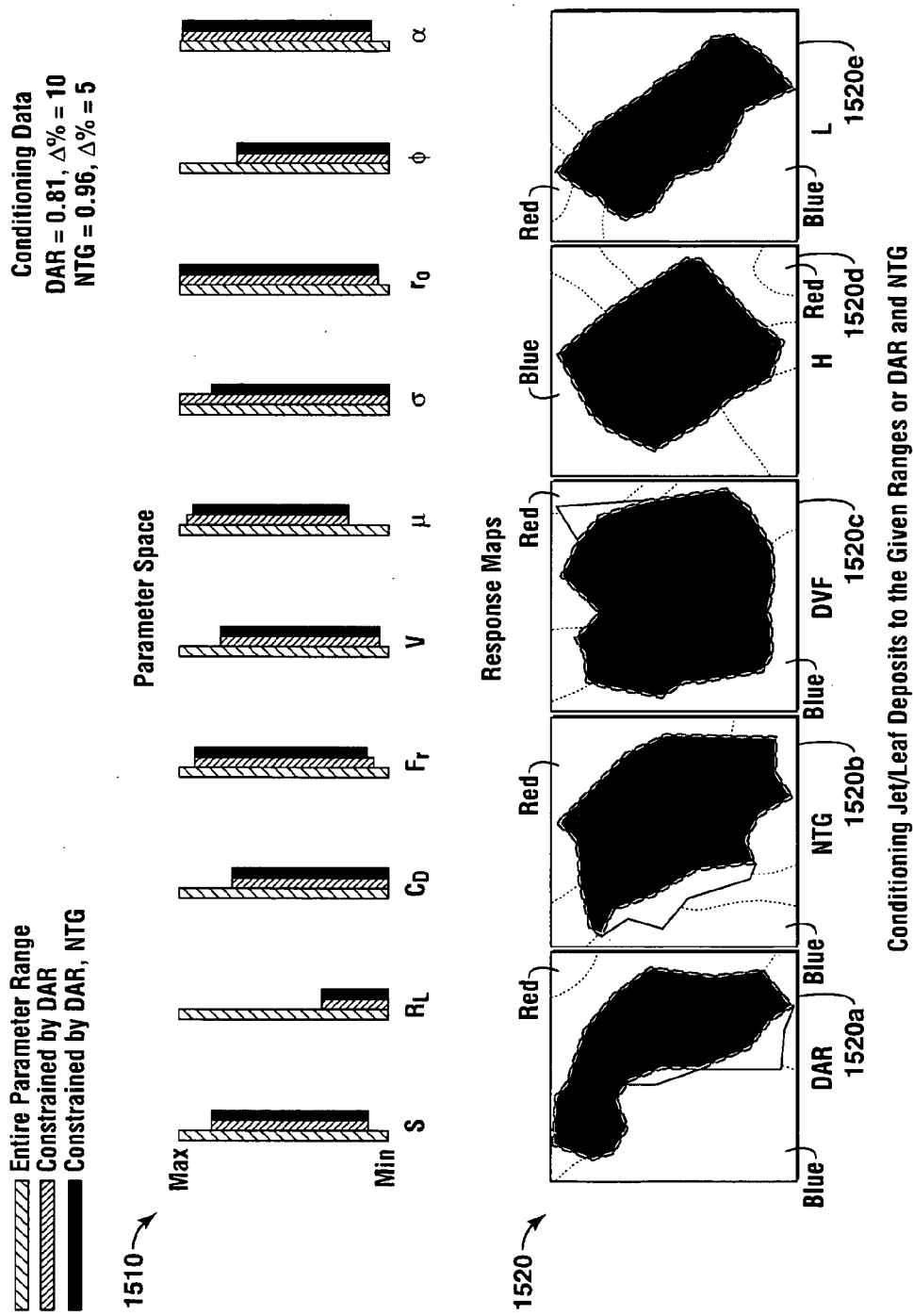
FIG. 15 is an illustration of a reduced ensemble that continuously shrinks after being conditioned to a given NTG and its uncertainty, according to one embodiment of the invention.

In addition to conditioning DAR, FIG. 15 shows that the reduced ensemble continuously shrinks after being conditioned to the given NTG (0.96) and its uncertainty (5%). A new polygon that encompasses the given NTG values is digitized inside the existing polygon on NTG response map 1520b to create a new ensemble. The new reduced ensemble is then displayed on the other response maps 1520a and 1520c-d and as the new vertical bars in the parameter space. It shows that the change of NTG results in the changes of the polygons on the DAR and DVF response maps (1520a and 1520c) rather than the H and L response maps 1520d and 1520e). Vertical bars 1520 show that conditioning to the given NTG ranges affects the ranges of mean grain size ($\mu$), sorting ($\sigma$), and Froude number ($F_r$).

Figure 16:
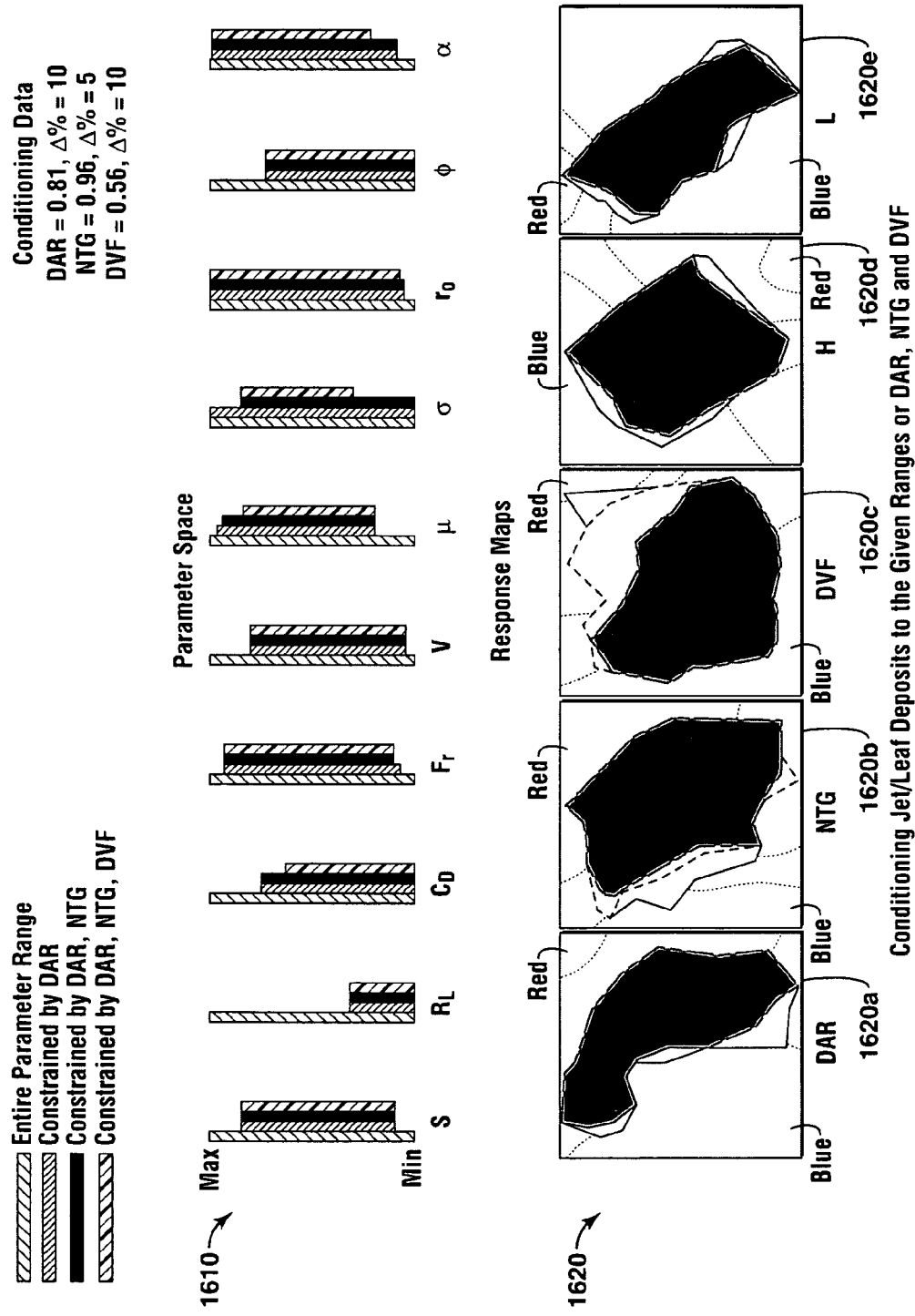
FIG. 16 is an illustration that shows that conditioning to DVF causes changes of the polygons on the NTG, H, and L response maps of FIGS. 14 and 15.

In a similar process, a polygon that encircles the given DVF (0.56±10%) is digitized inside the second polygon on DVF response map 1620c. The new polygon creates the new reduced ensemble that can be shown on other response maps and the ranges of the input parameters. FIG. 16 shows that conditioning to DVF causes changes of the polygons on the NTG, H, and L response maps (1620b, 1620d, and 1620e). The input parameters that have clear changes are mean grain size ($\mu$), sorting ($\sigma$), drag coefficient ($c_D$), and alpha ($\alpha$). As demonstrated, the ensemble size drops as new information is added.

Figure 17:
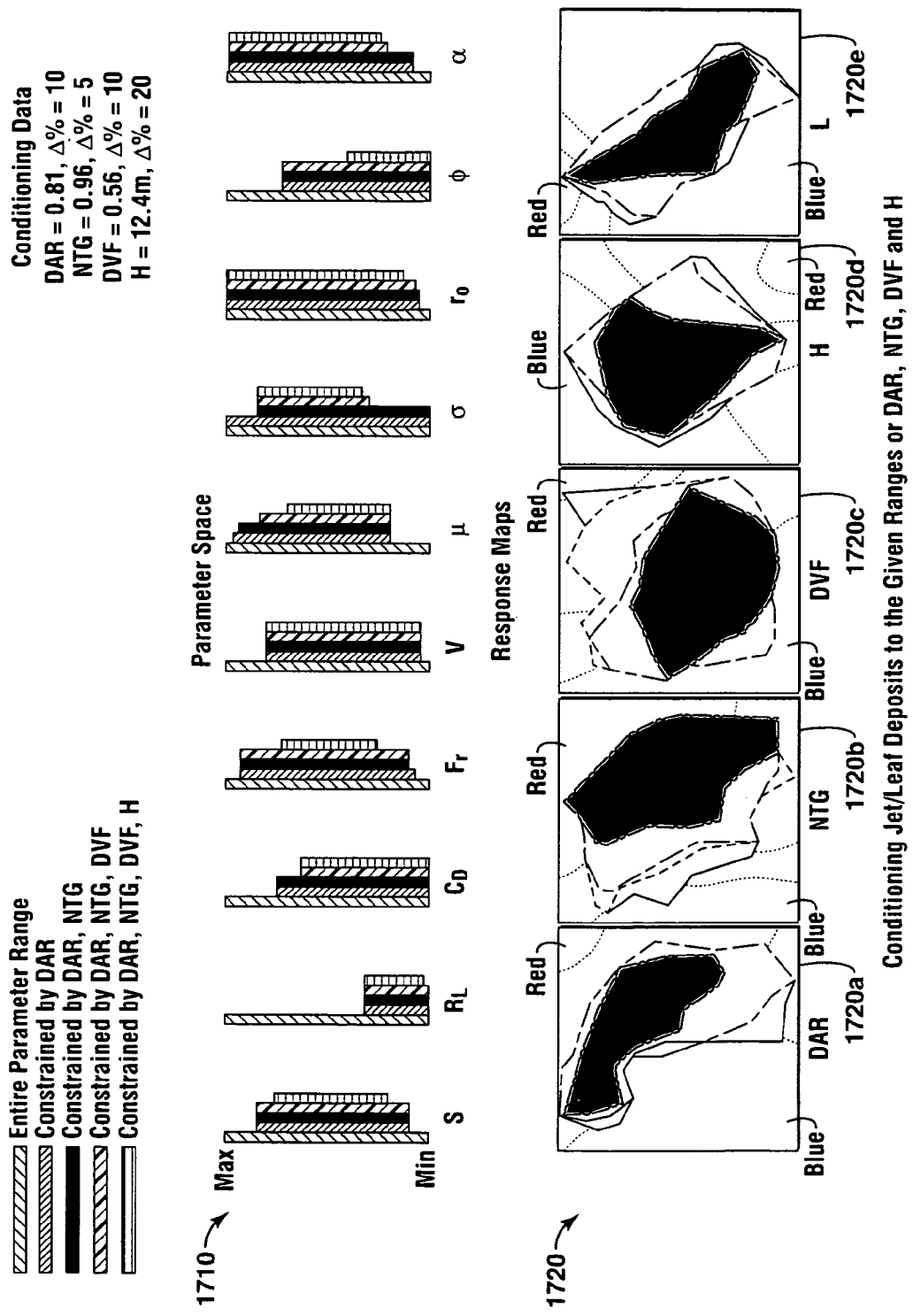
FIG. 17 is an illustration that shows that the polygons of a new ensemble shown on the response maps of FIGS. 14-16 shrink as the conditioning data for H is used.

Constraining the ensemble to the given H (12.4 m) and its uncertainty (20%) further reduces the size of the ensemble. FIG. 17 shows that the polygons of the new ensemble shown on all of the response maps shrink as the conditioning data for H is used. The input parameters with clear changes in their ranges are slope (S), drag coefficient ($c_D$), Froude number ($F_r$), mean grain size ($\mu$), and depositional porosity ($\phi$).

Figure 18:
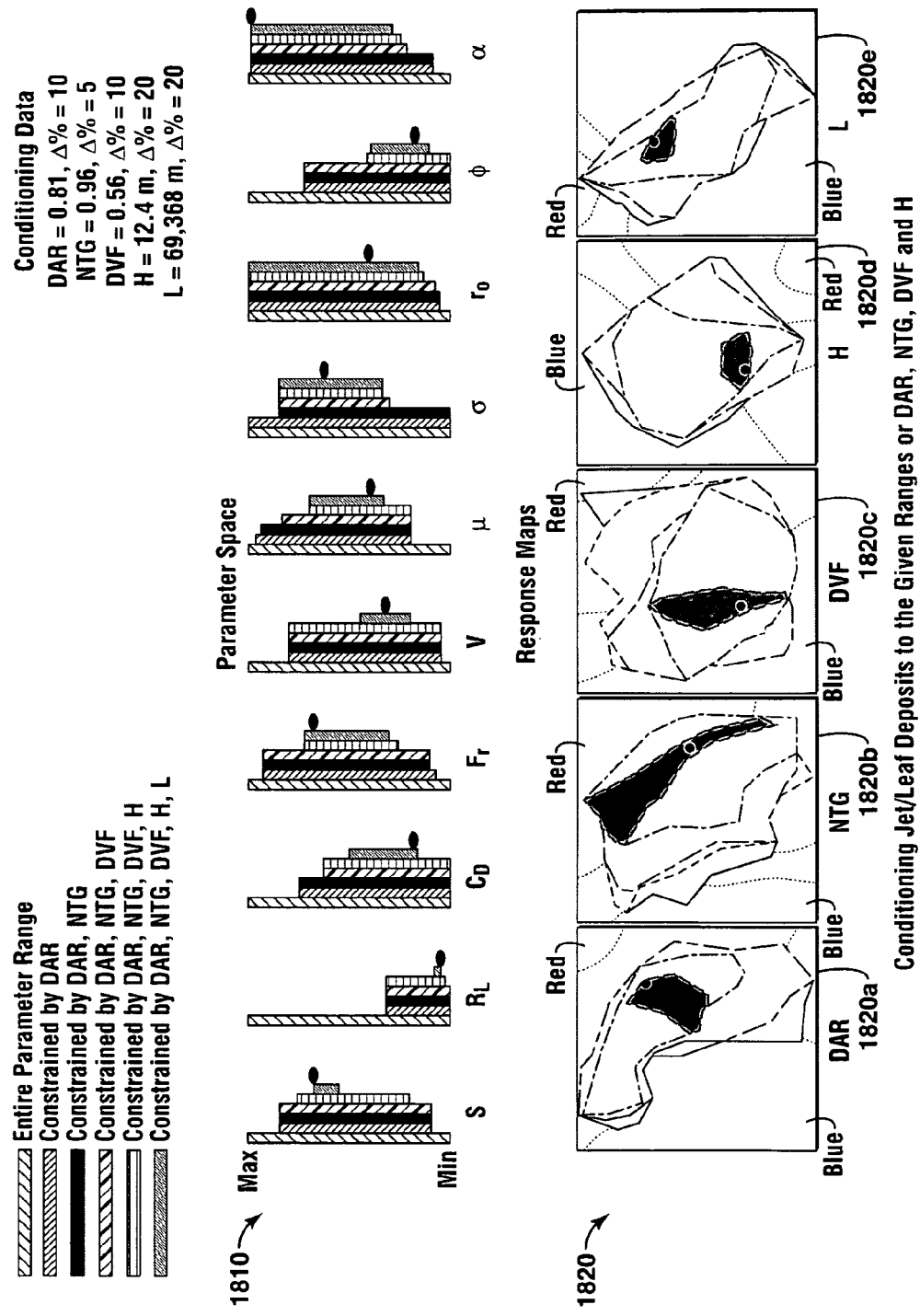
FIG. 18 is an illustration that shows that the size of the reduced ensemble shown as the polygons on the response maps of FIGS. 14-17 and the ranges of most input parameters drops as conditioning is performed with respect to responses DAR, NTG, DVF, H, and L.

The ensemble is further conditioned to the given ranges of L (69,368 m±20%). FIG. 18 shows that the size of the reduced ensemble shown as the polygons on all response maps 1820 and the ranges of most input parameters (vertical bars) dramatically drops. The input parameters that show a large impact are slope (S), inlet aspect ratio ($R_L$), drag coefficient ($c_D$), velocity (V), mean grain size ($\mu$), and depositional porosity ($\phi$). For validation purposes in this example, the true input parameters and responses are displayed on vertical bars 1810 and response maps 1820 as points. FIG. 18 shows that truth is inside the polygons and the parameter ranges, which validates the conditioning process.

Table 6 summarizes the changes of the ranges of the input parameters as a result of the above conditioning process. In the table, it is clear that most of the input parameters have changes in their ranges when an additional response is added in. The ranges of the input parameters in the ensemble that do not converge to a single point indicate that the available conditioning information is not sufficient enough to identify the truth. However, the process demonstrates that an ensemble that includes the truth may be identified. The estimation and understanding of the truth improve as more information is available.

TABLE 6

| Limit | S (Degree) | $R_L$ | $C_D$ | $F_r$ | V (m/s) | $\mu$ (µm) | $\sigma$ (phi) | $r_o$ | $\phi$ | $\alpha$ | Responses |
|---|---|---|---|---|---|---|---|---|---|---|---|
| Max | 0.0480 | 473 | 0.0098 | 2.69 | 22.30 | 298 | 1.51 | 3.37 | 85 | 0.50 | Original |
| Min | −0.0457 | 3 | 0.0022 | 1.03 | 2.05 | 75 | 0.39 | 1.12 | 36 | 0.25 | |
| Max | 0.0327 | 154 | 0.0078 | 2.57 | 18.40 | 255 | 1.51 | 3.37 | 71 | 0.50 | DAR |
| Min | −0.0372 | 3 | 0.0022 | 1.12 | 3.09 | 83 | 0.39 | 1.26 | 36 | 0.27 | |
| Max | 0.0327 | 154 | 0.0078 | 2.57 | 18.40 | 255 | 1.33 | 3.37 | 71 | 0.50 | DAR, NTG |
| Min | −0.0372 | 3 | 0.0022 | 1.19 | 3.09 | 91 | 0.39 | 1.26 | 36 | 0.27 | |
| Max | 0.0327 | 154 | 0.0068 | 2.57 | 18.40 | 255 | 1.33 | 3.37 | 71 | 0.50 | DAR, NTG, DVF |
| Min | −0.0372 | 3 | 0.0022 | 1.19 | 3.09 | 117 | 0.70 | 1.29 | 36 | 0.31 | |
| Max | 0.0248 | 154 | 0.0068 | 2.22 | 18.40 | 255 | 1.33 | 3.37 | 56 | 0.50 | DAR, NTG, DVF, H |
| Min | −0.0276 | 6 | 0.0022 | 1.44 | 3.09 | 152 | 0.73 | 1.41 | 36 | 0.32 | |
| Max | 0.0130 | 42 | 0.0057 | 2.20 | 10.86 | 225 | 1.28 | 3.37 | 55 | 0.50 | DAR, NTG, DVF, H, L |
| Min | 0.0024 | 24 | 0.0036 | 1.53 | 5.78 | 152 | 0.73 | 1.49 | 41 | 0.33 | |
| TRUE | 0.0128 | 31 | 0.0038 | 2.06 | 8.09 | 209 | 1.05 | 2.02 | 45 | 0.50 | |

Figure 19:
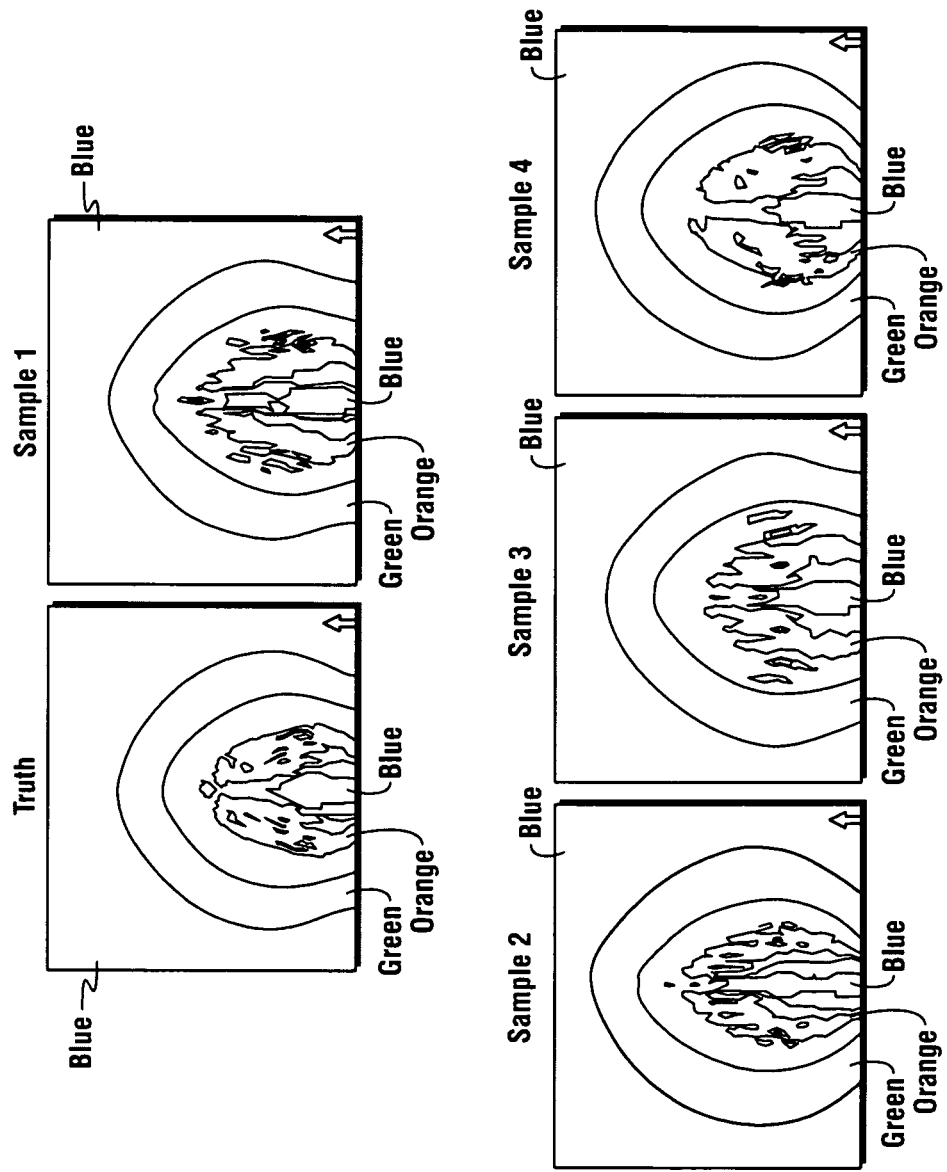
FIG. 19 is a comparison of deposit thickness maps that are built from simulations using reduced parameter spaces, according to one embodiment of the invention.

Four samples are randomly selected from the reduced ensemble to make a comparison between the four samples and the truth. Table 7 shows the input parameters for the four samples and the truth. Table 8 shows the comparison of the sample responses with the truth. FIG. 19 illustrates a graphical comparison of deposit thickness maps between the four samples and the truth. The deposit thickness maps of FIG. 19 are similar to the maps of FIG. 13 and are adapted to black and white from color. As in FIG. 13, the colors generally follow the contour lines. Both Table 8 and FIG. 19 show that the ensemble (intermediate solution space) reproduces the truth reasonably well. In the next section, it is shown that the uncertainty in the solution can be continuously reduced when the sedimentary process simulations are conditioned to well data.

TABLE 7

| Sample | S | $R_L$ | $C_D$ | $F_r$ | V | $\mu$ | $\sigma$ | $r_o$ | $\phi$ | $\alpha$ |
|---|---|---|---|---|---|---|---|---|---|---|
| 1 | 0.0061 | 32 | 0.0043 | 1.87 | 8.32 | 205 | 1.00 | 2.43 | 48 | 0.41 |
| 2 | 0.0081 | 28 | 0.0037 | 2.20 | 9.16 | 225 | 1.28 | 3.37 | 55 | 0.36 |

TABLE 7-continued

| Sample | S | $R_L$ | $C_D$ | $F_r$ | V | μ | σ | $r_o$ | φ | α |
|---|---|---|---|---|---|---|---|---|---|---|
| 3 | 0.0036 | 42 | 0.0050 | 2.09 | 5.78 | 168 | 0.87 | 1.76 | 41 | 0.33 |
| 4 | 0.0130 | 24 | 0.0036 | 1.93 | 6.50 | 177 | 0.73 | 1.49 | 43 | 0.39 |
| Truth | 0.0128 | 31 | 0.0038 | 2.06 | 8.09 | 209 | 1.05 | 2.02 | 45 | 0.50 |

TABLE 8

| Response | Sample 1 | Sample 2 | Sample 3 | Sample 4 | Truth |
|---|---|---|---|---|---|
| DAR | 0.81 | 0.87 | 0.80 | 0.86 | 0.81 |
| NTG | 0.96 | 0.93 | 0.95 | 0.98 | 0.96 |
| DVF | 0.54 | 0.52 | 0.54 | 0.57 | 0.56 |
| H (m) | 14.6 | 14.7 | 14.7 | 13.0 | 12.4 |
| L (m) | 67,745 | 70,007 | 72,811 | 61,172 | 69,368 |

B. Conditioning to Well Data

Figure 20:
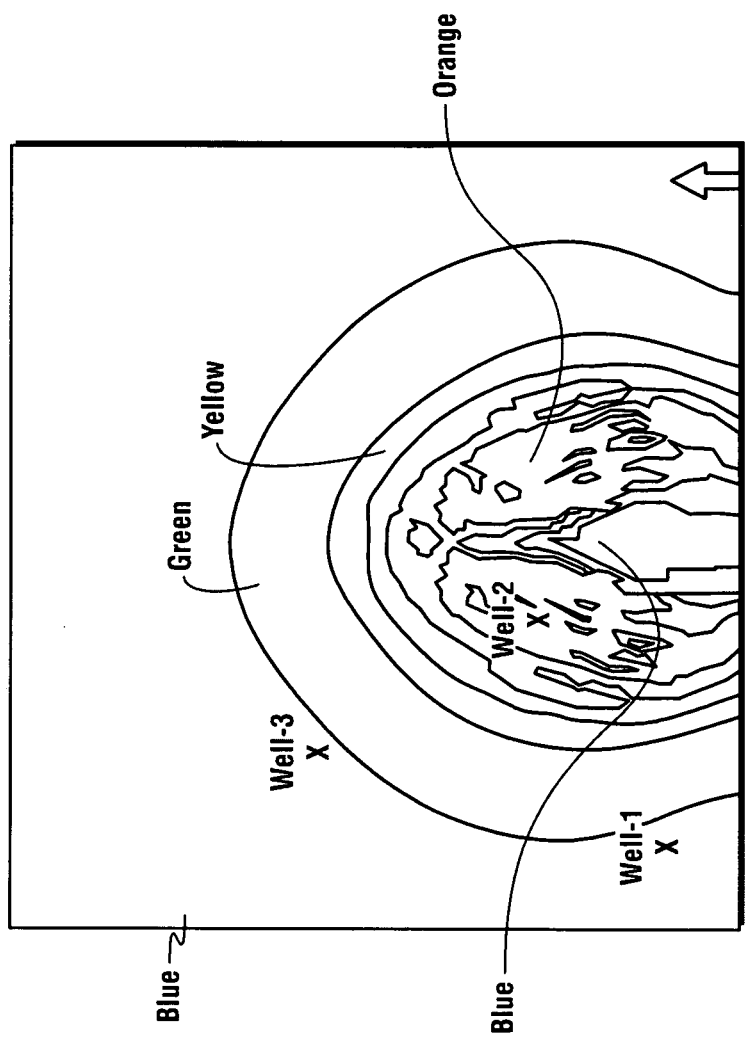
FIG. 20 is an illustration of well locations in a geological formation for the examples of FIGS. 21-26, according to one embodiment of the invention.

The same case used above is applied to well data conditioning. FIG. 20 shows the positions of three wells (relative to the truth) that are selected for the conditioning study. Well-1 is chosen in the distal area near the orifice (inlet), well-2 is located on the levee, and well-3 is selected in the distal area far away from the orifice (inlet). Responses at the three wells are deposit thickness (THK), net-to-gross (NTG), grain size (GS), sorting (ST), grain size gradient (GSG), and sorting gradient (STG). THK, NTG, GS, and ST are all defined for the entire interval of the intersection between a well and a deposit while GSG and STG are the gradients of local (layer-based) GS and ST in the entire interval, respectively.

The first response, THK, is the thickness of the deposit at a given well location. It is calculated as the difference between the top value (elevation) of the top layer of the deposit and the base value of the bottom layer of the deposit.

Calculation of NTG is relatively simple. NTG is calculated using sand volume ($V_D - V_s$) divided by $V_D$ (deposit volume). Deposit volume is calculated as the sum of the volumes of cells in the given well $$V_D = \sum_k V_k \quad (9)$$

where $V_k$ is the volume of a deposit cell at layer k. To calculate the sand volume, this example uses a continuous method that does not treat each cell as entirely shale or entirely sand, but instead calculates the fraction of sand in each cell and adds that fraction multiplied by the cell's volume to the deposit's sand volume. The fraction of sand in a cell is calculated as the sum of the concentrations of grains in the cell whose size are larger than the shale grain size threshold $$V_D - V_S = \sum_k f_k * V_k \quad (10)$$

$$f_k = \sum_{l=1}^{n_s} \begin{cases} C_{kl}, & \text{if } D_l > D_t \\ 0, & \text{if } D_l \le D_t \end{cases} \quad (11)$$

where $f_k$ is the fraction of sand for layer k; $C_{kl}$ is the concentration of grain l at layer k whose size $D_l$ is larger than a shale grain size threshold $D_t$; and $n_s$ is the number of grain sizes. The shale grain size threshold $D_t$ used is equal to 60 μm, or 0.06 mm.

Calculation of GS and ST is relatively simple. The grain size concentrations of the layers in a given well are combined according to their volumes into a single grain size distribution for the entire well. As a result, GS and ST are computed directly using the mean and standard deviation of the single grain size distribution function, respectively.

GSG describes a fining or coarsening direction in a well. If GSG is positive, the grain size distribution in the well is coarsening upward. Otherwise, the grain size distribution in the well is fining upward. To calculate the gradient, this example embodiment calculates the mean grain size for each layer in the well and assigns it to the center of the layer. Then, a table of layer-mean grain size and layer center elevation can be constructed. A linear regression method is used to calculate the slope of layer-mean grain size as a function of layer center elevation. The calculated slope is the expected GSG.

Calculation of STG is similar to the calculation of GSG, except that layer sorting is used as the dependent variable in regression, instead of using layer-mean grain size.

Table 9 summarizes the "measured/observed" values of the six responses in well-1, well-2, and well-3 from the "truth" model shown in FIGS. 13 and 20.

TABLE 9

| Response | Symbol | Unit | Value (Well-1) | Value (Well-2) | Value (Well-3) |
|---|---|---|---|---|---|
| Deposit thickness | THK | m | 2.24 | 18.17 | 2.6 |
| Net-to-gross | NTG | | 0.922 | 0.996 | 0.98 |
| Mean grain size | GS | mm | 0.112 | 0.393 | 0.143 |
| Sorting | ST | phi | 0.56 | 0.832 | 0.474 |
| Grain size gradient | GSG | mm/m | 0.1089 | −0.0091 | −0.1089 |
| Sorting gradient | STG | phi/m | 0.00399 | 0.00164 | −0.02254 |

The seismic-conditioned ensemble is used to create the ranges and distributions for the new input parameter space. One-hundred fifty LHS sample points are generated from the input parameter, one-hundred fifty simulation runs are carried out, and sensitivity analysis is conducted in the second step. Using the sensitivity results, MDS is performed and response maps are created. Next, the example embodiment includes conditioning the seismic-conditioned ensemble to the response data collected from wells 1, 2, and 3. After this conditioning, the seismic- and well-conditioned ensemble (final solution space) is created.

Figure 21:
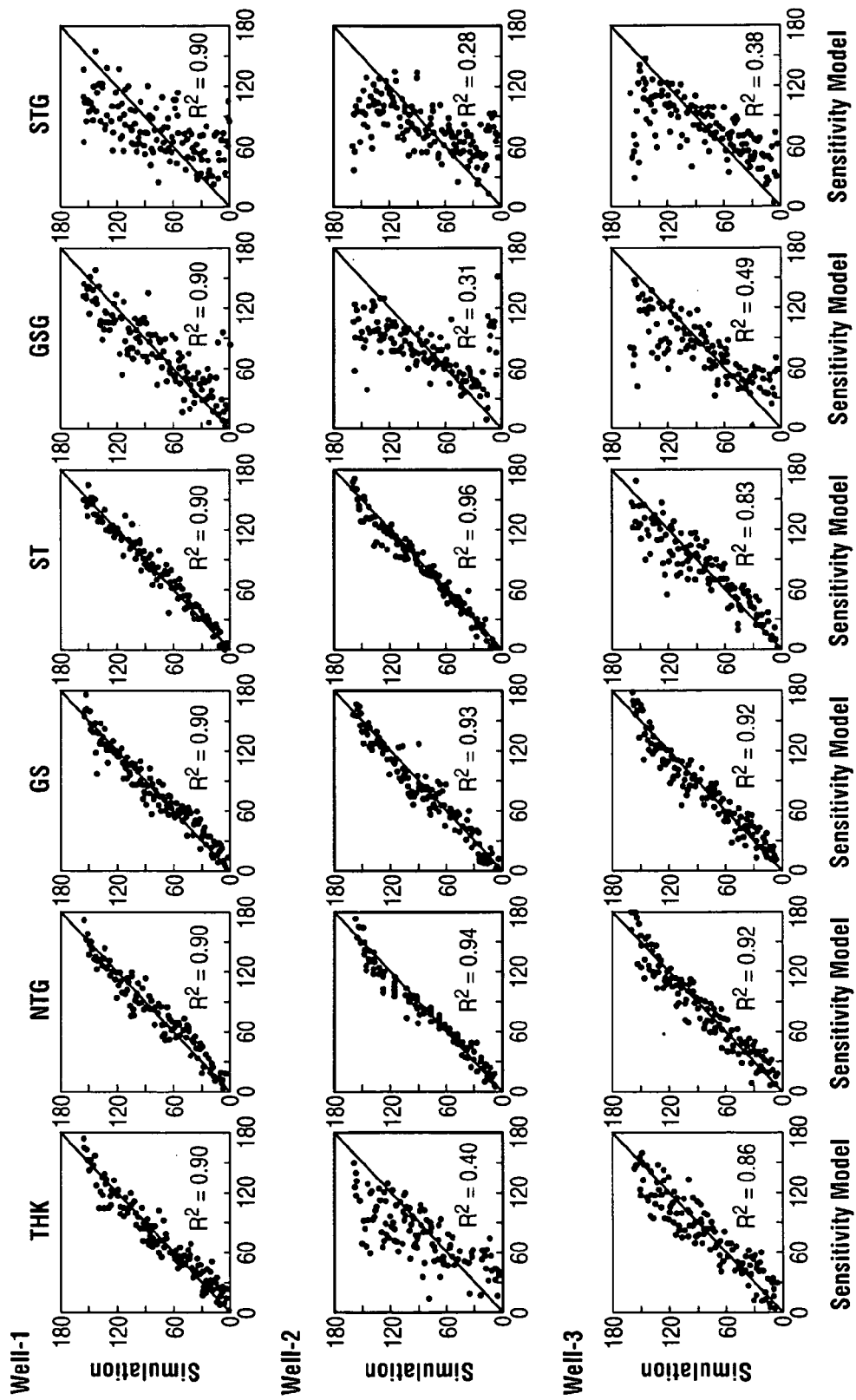
FIG. 21 is an illustration of comparison between simulation and sensitivity models for the example well locations, according to one embodiment of the invention.

As a part of the sensitivity analysis result for conditioning to well data, FIG. 21 shows cross plots between simulation (vertical axis) and sensitivity model (Equation 5, horizontal axis) for the responses at the three wells. A good correlation (large $R^2$) indicates a strong relationship between a response and the input parameters. For example, a $R^2$ equal to 0.9 means that 90% of the variability of the response can be explained by the variability of the input parameters using the sensitivity model. If $R^2$ is small, the unexplained portion of the variability of the response is large and thus the chance to estimate the true input parameters from the response is small. Therefore, studying the value of $R^2$ can help to eliminate the responses that have a very small $R^2$ (e.g., <0.5) from the candidates for conditioning. Based on this guideline, sorting gradient (STG) should be removed from conditioning because its $R^2$s for the three conditioning wells are all smaller than 0.5.

Deposit thickness (THK) at well-2 shows a poor relationship with the input parameters ($R^2$=0.4). This may be due to the well being too close to the scour (the center area extending vertically from the bottom of the thickness map shown in FIG. 20) where erosion and turbulent flow occur frequently. Similar to THK, grain size gradient (GSG) at well-2 has a poor relationship with the input parameters because GSG is related to THK. Correlations between response and input parameters for THK and GSG at well-3 are worse than those at well-1. One possible explanation is that well-3 is located directly in the path of the main flow direction where turbulence is more intensive while well-1 is located away from the main flow path where turbulence is less intensive. NTG, GS, and ST are correlated well with the input parameters at all wells. The best location to infer the input parameters is at well-1 where it shows the best overall correlations.

Figure 22A:
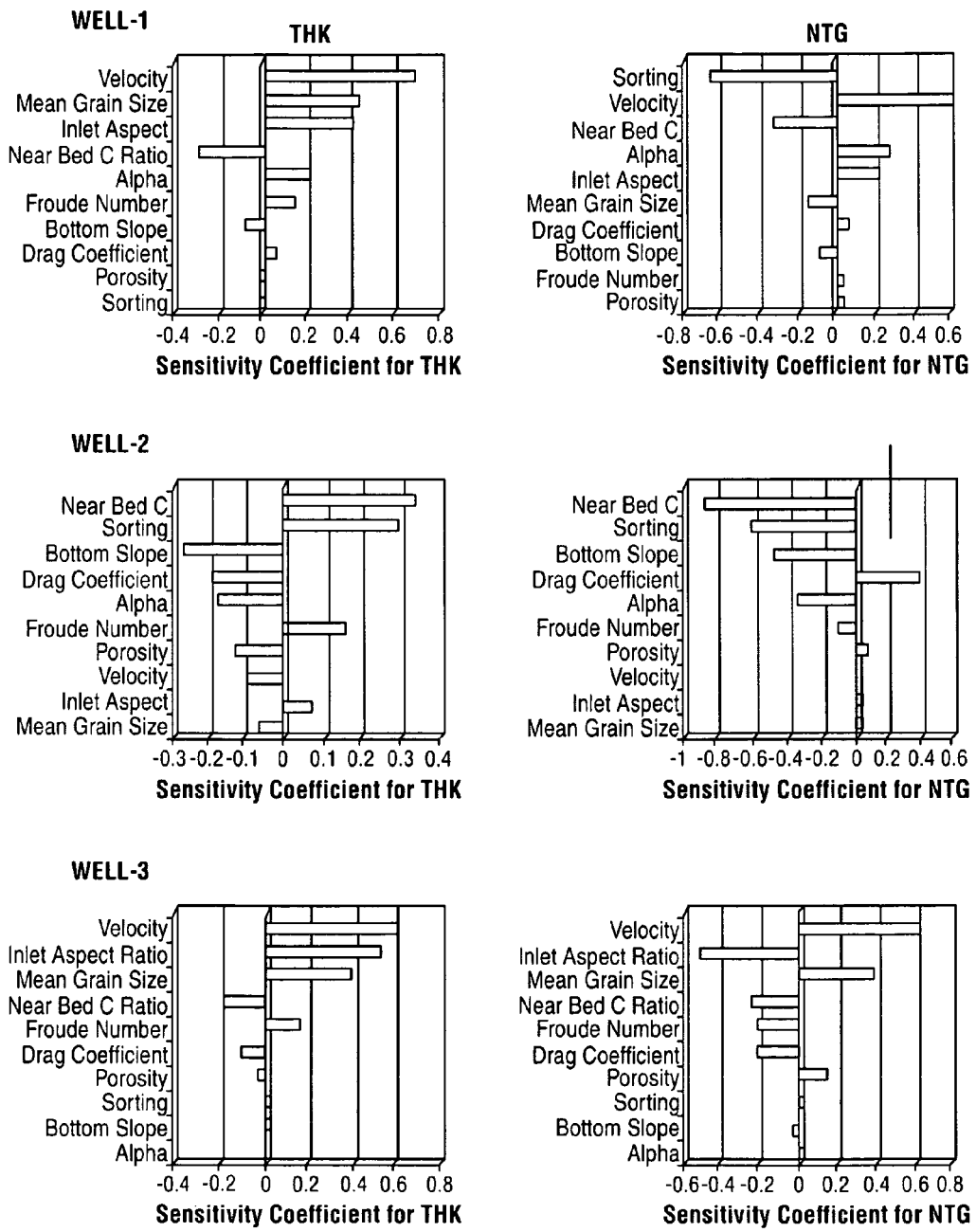
FIG. 22 includes a plurality of charts showing sensitivity of various input parameters with respect to various responses for exemplary wells, according to one embodiment of the invention.
Figure 22C:
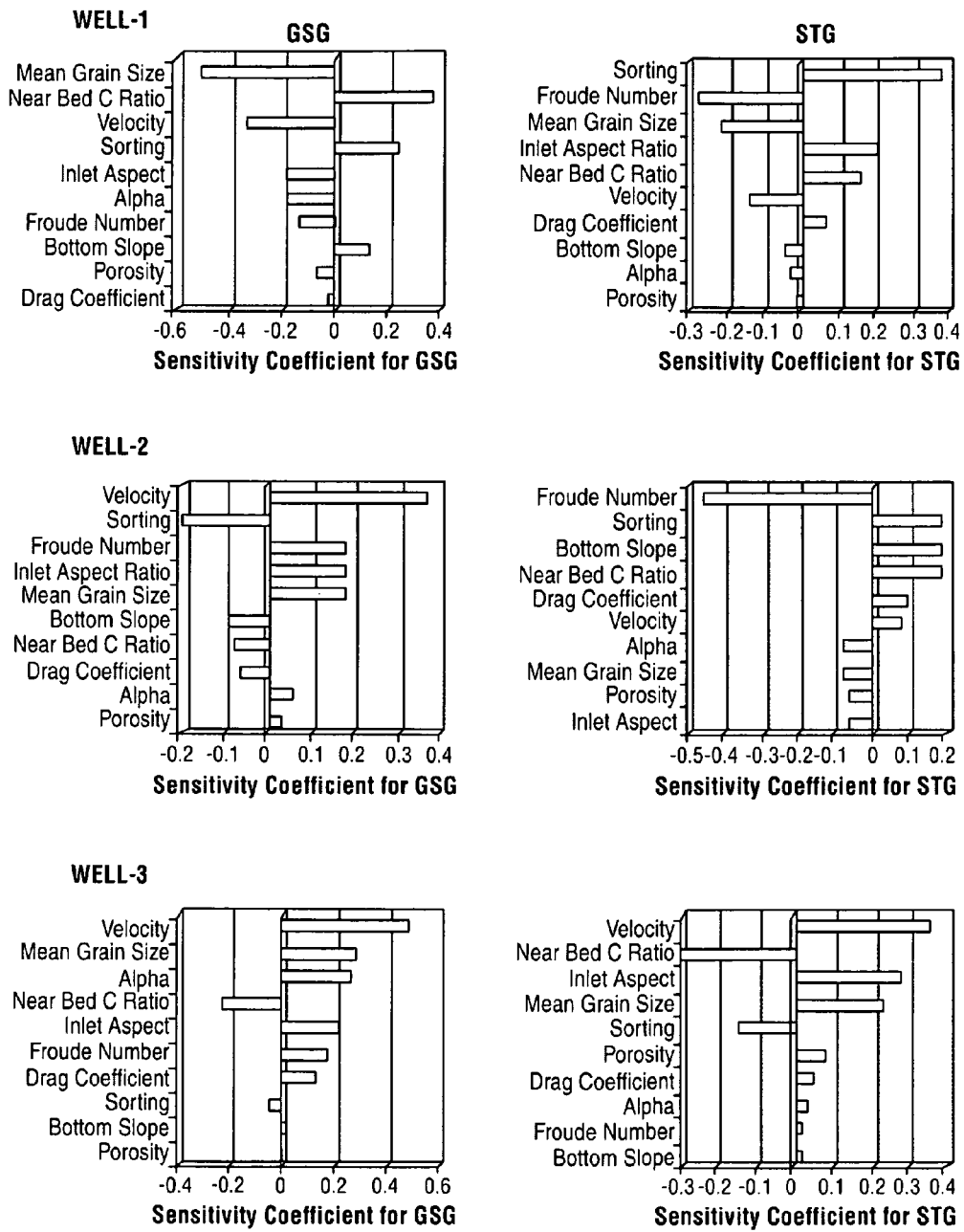

FIG. 22 shows tornado charts for responses at the three wells. The tornado charts of FIG. 22 illustrate the ranking of importance of the input parameters on each individual response and can be used to determine or eliminate insensitive parameters. The three most important input parameters (in this particular study) for all of the responses are sorting ($\sigma$), velocity (V), and mean grain size ($\mu$). In other words, conditioning to the three wells may reduce the uncertainty of the three input parameters (sorting, velocity, and mean grain size) because they have the largest impact on the responses. Further, the sorting in the deposit (ST) is mainly controlled by the sorting ($\sigma$) in the flow at the orifice (inlet). Therefore, the chance of success to estimate the sorting of grain sizes in the flow at the inlet by studying the sorting of grain sizes in the deposit at a well is large.

Figure 23:
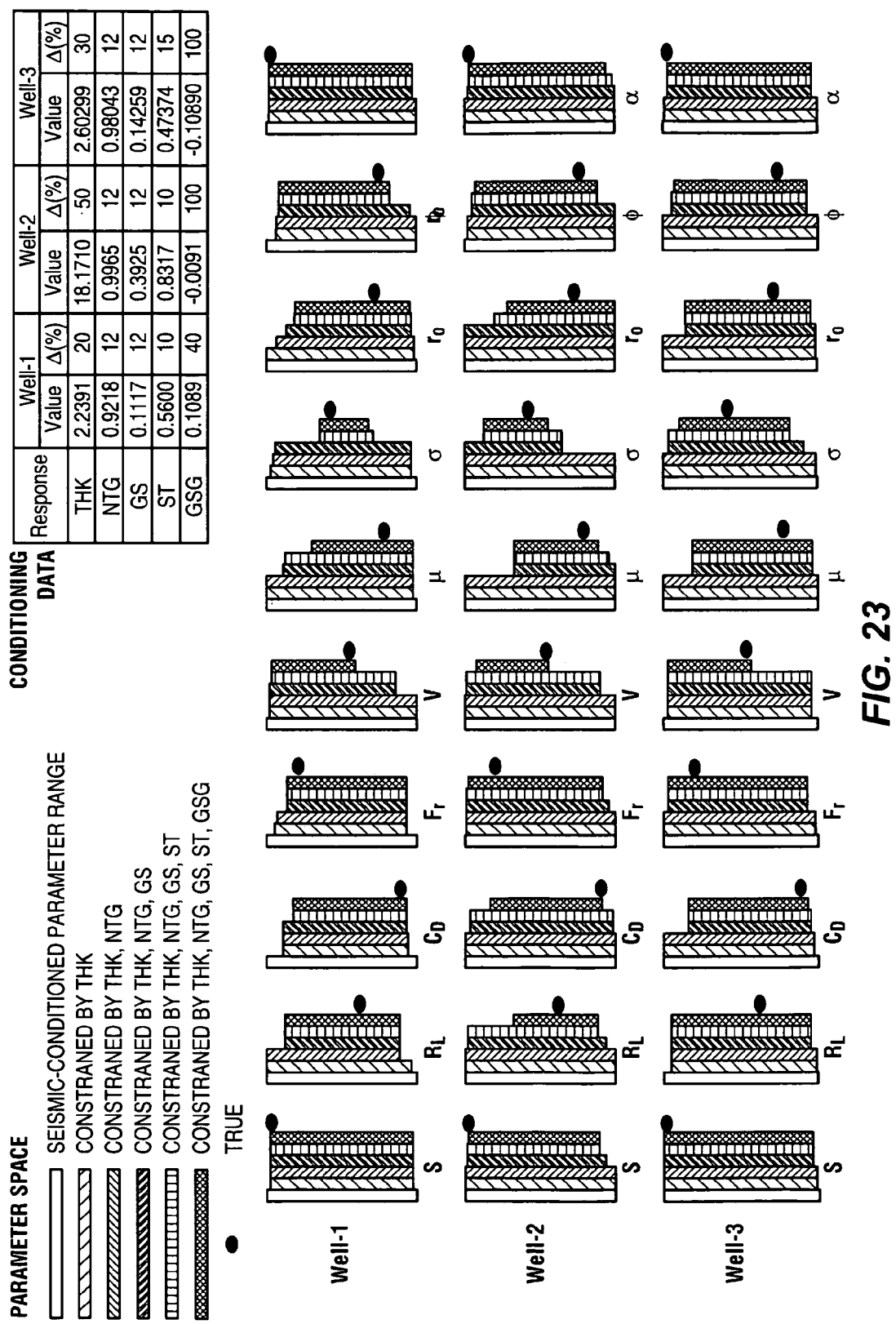
FIG. 23 includes a plurality of charts illustrating changes in ranges of input parameters for exemplary wells due to conditioning, according to one embodiment of the invention.

The table shown at the upper right corner of FIG. 23 gives the conditioning data for wells 1, 2, and 3. The values of uncertainty ($\Delta$ %) are given by considering the correlations between responses and the input parameters shown in FIG. 21. The seismic-conditioned ensemble is expected to continuously reduce when the numerical model is conditioned to well data. FIG. 23 shows the further reduced solution spaces for the three wells. From FIG. 23, it is apparent well 3 has the smallest overall contribution to reducing the size of the solution space, compared to the contributions of wells 1 and 2. Therefore, well 3 may be not an ideal location for conditioning. FIG. 23 further implies that as the distance of a well from the orifice (inlet) increases, the chance of success to identify the input parameters decreases. That is to say, the input information decays as the distance away from the orifice increases. FIG. 23 also shows that the input parameters that have the overall largest changes in their ranges are sorting ($\sigma$), velocity (V), and mean grain size ($\mu$), which is consistent with the sensitivity analysis results shown in FIG. 22. Therefore, the largest contribution of conditioning to well data is on refining the estimation of the sorting ($\sigma$), velocity (V), and mean grain size ($\mu$) in the flow at the orifice. The parameters with the overall smallest changes in their ranges are Slope (S) and Alpha ($\alpha$), which may indicate that the chance of success to identify the values of S and $\alpha$ from well data is small.

Figure 24:
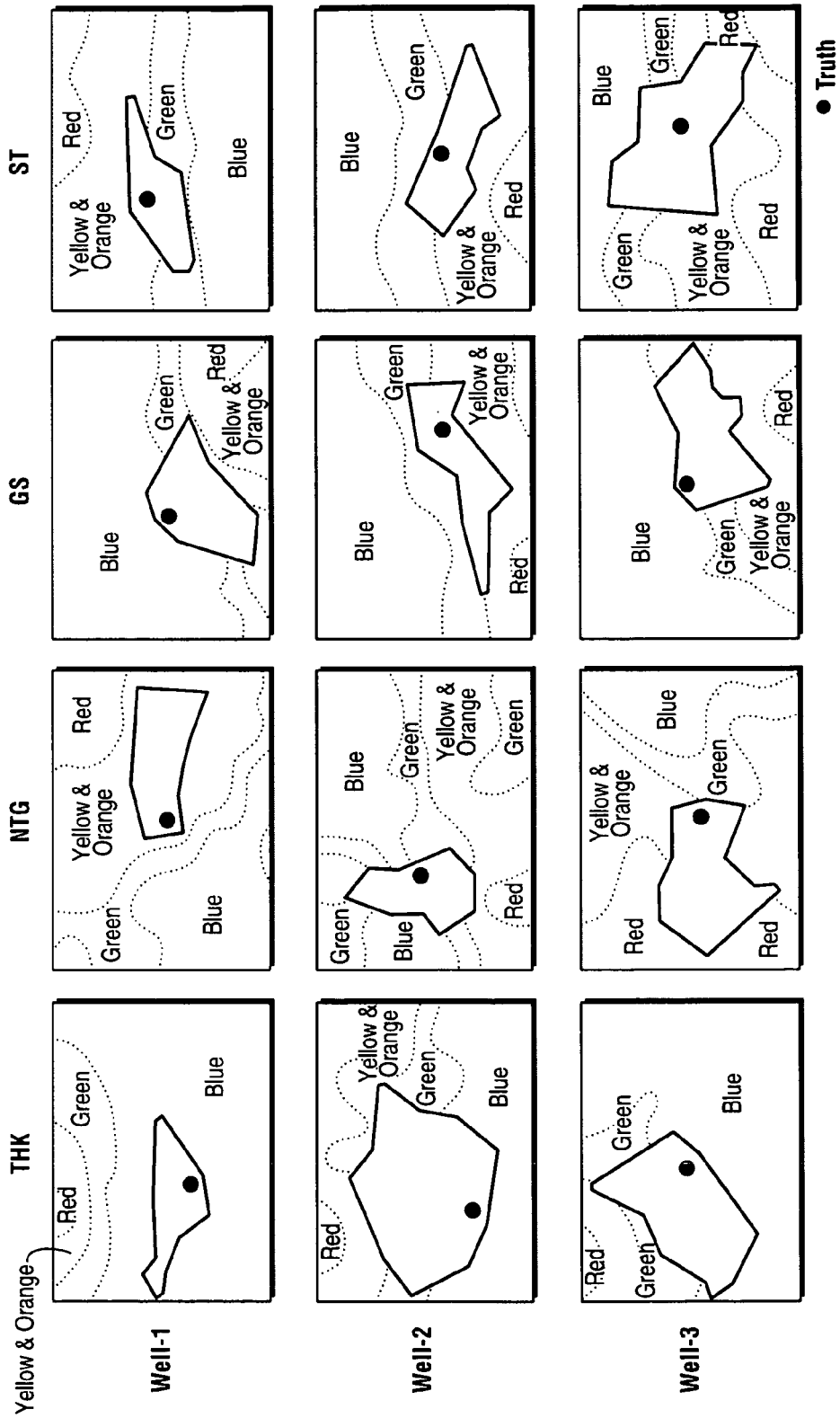
FIG. 24 includes projections of a final solution space, shown as respective polygons in two-dimensional maps, for exemplary wells, according to one embodiment of the invention.

Conditioning the seismic-conditioned parameter space to data from the three wells creates the seismic- and well-conditioned ensemble (final solution space) that is shown as polygons on the response maps in FIG. 24. The response maps of FIG. 24 represent the seismic-conditioned parameter space and the values of the responses increase as the color scale changes from blue to red. However, as with FIGS. 12a and 12b, FIG. 24 is adapted from a color illustration, and the color is not reproduced herein. FIG. 24 represents an intuitive way to illustrate conditioning and uncertainty to a user after a second round of response data is used for conditioning. However, rarely in real-world systems is the truth indicated because it is typically the case that some information is missing. The dots represent the truth in the seismic-conditioned parameter space for validation purposes in this example.

Figure 25:
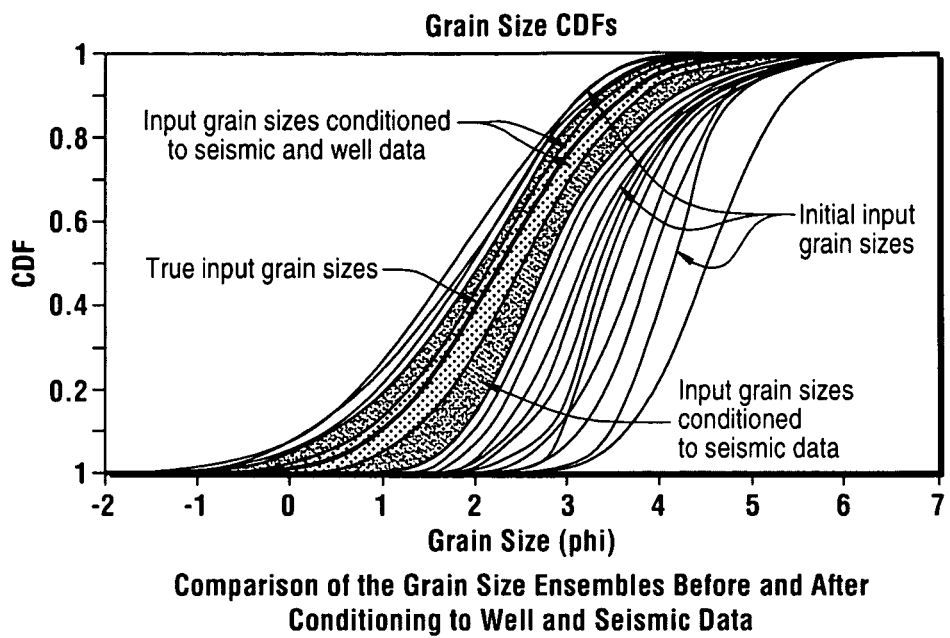
FIG. 25 is an illustration of conditioning of grain size ensembles for exemplary wells, according to one embodiment of the invention.

Table 10 shows the comparison of the ranges of the input parameters changing from the original unconditioned ensemble to the seismic-conditioned ensemble to the seismic- and well-conditioned ensemble. The ensembles continuously shrink and the estimation of the input parameters is getting more accurate as more conditioning data is added in. FIG. 25 shows the continuous improvement process using the input grain size distribution function as an example. FIG. 25 shows that the size of the unconditioned ensemble is very large. After the original ensemble is conditioned to seismic data, the size of the seismic-conditioned ensemble decreases and converges toward the truth. The size of the seismic- and well-conditioned ensemble further drops as it is conditioned to well data. FIG. 25 clearly shows a converging process toward the truth as new response data is added.

TABLE 10

| Limit | S (Degree) | $R_L$ | $C_D$ | $F_r$ | V (m/s) | $\mu$ ($\mu$m) | $\sigma$ (phi) | $r_o$ | $\phi$ | $\alpha$ | Condition |
|---|---|---|---|---|---|---|---|---|---|---|---|
| Max | 0.0480 | 473 | 0.0098 | 2.69 | 22.30 | 298 | 1.51 | 3.37 | 85 | 0.50 | Original |
| Min | −0.0457 | 3 | 0.0022 | 1.03 | 2.05 | 75 | 0.39 | 1.12 | 36 | 0.25 | |
| Max | 0.0130 | 42 | 0.0057 | 2.20 | 10.86 | 225 | 1.28 | 3.37 | 55 | 0.50 | Seismic |
| Min | 0.0024 | 24 | 0.0036 | 1.53 | 5.78 | 152 | 0.73 | 1.49 | 41 | 0.33 | |
| Max | 0.0128 | 40 | 0.0054 | 2.11 | 10.70 | 220 | 1.09 | 2.99 | 54 | 0.50 | Well and Seismic |
| Min | 0.0037 | 26 | 0.0037 | 1.59 | 7.97 | 176 | 0.93 | 1.58 | 44 | 0.34 | |
| | 0.0128 | 31 | 0.0038 | 2.06 | 8.09 | 209 | 1.05 | 2.02 | 45 | 0.50 | TRUE |

Figure 26:
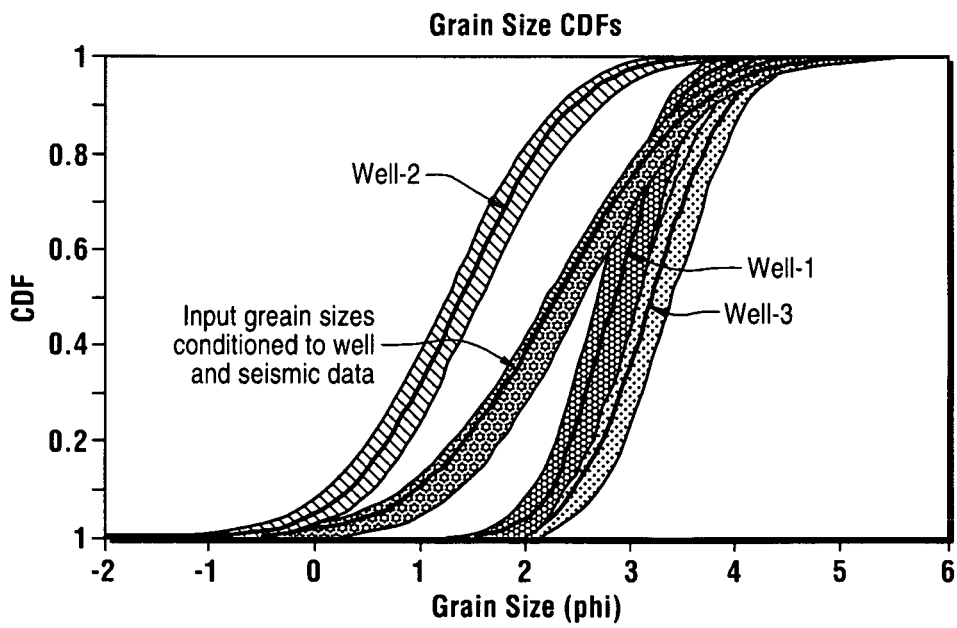
FIG. 26 is a comparison of grain size distributions in a deposit at example well locations, according to one embodiment of the invention.

FIG. 26 shows a comparison of the grain size distributions in the deposit at different well locations and the estimated input grain size distribution function at the inlet. The figure shows that the distribution functions are very different in different locations in the deposit. Well 2 shows the coarsest grains with the poorest sorting, well 3 illustrates the finest grains with the best sorting, and well 1 shows an intermediate sorting. The estimated input grain size distribution function in the flow is different from any of the distribution functions in the deposit at the three well locations. From a material balance point of view, the input grain size distribution is the sum of the distributions of the deposit at all locations. If there is an appreciable number of wells and data from those wells, the input grain size distribution for the numerical model can be calculated by summing up the grain size distribution functions measured at the various well locations.

Figure 27:
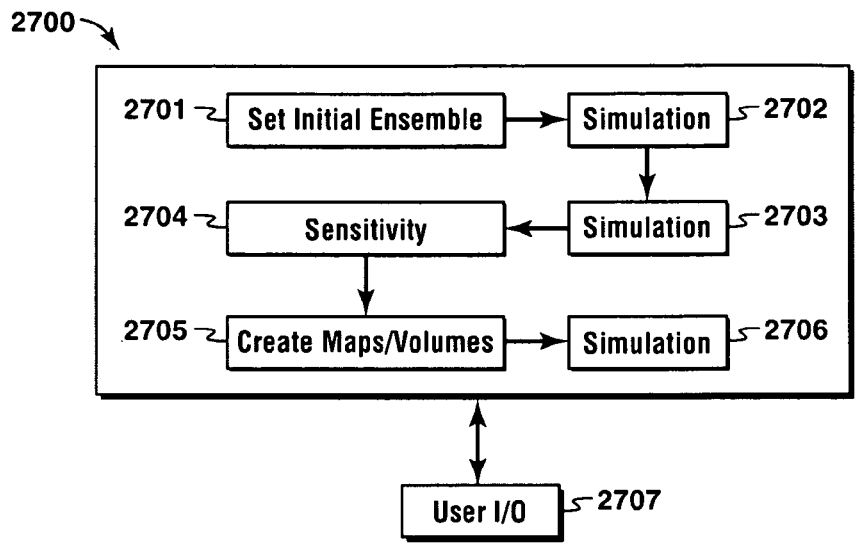
FIG. 27 is an illustration of an exemplary system adapted according to one embodiment of the invention.

FIG. 27 is an illustration of exemplary system 2700 adapted according to one embodiment of the invention. System 2700, in many embodiments, includes a computer or computers with associated hardware and software to perform the functions described above. Functional units 2701-2707 can include hardware, software, and any combination thereof. Further, embodiments of the invention are not limited to any particular architecture. For example, while functional units 2701-2707 are shown as separate units, various ones of functional units 2701-2707 may be combined with other ones of functional units 2701-2707. In fact, the functionality shown in FIG. 2 may be distributed amongst a plurality of computers.

System 2700 includes functional unit 2701, which creates the initial parameter space. Parameter spaces can be set automatically, by input from a user, or a combination of user input and automation.

Functional unit 2702 provides sampling, such as LHS or any other suitable sampling. Functional unit 2703 provides process simulations, such as sedimentary process simulations. Functional unit 2704 performs sensitivity analysis. Functional unit 2705 creates 2D maps and 3D volumes from the parameter spaces. While the examples herein focus on 2D and 3D visualizations, it is within the scope of embodiments to use higher-dimensional visualizations, as well. The number of dimensions for most conditioning problems is much larger than ten, such that a substantial reduction in the number of dimensions (even if the end visualization has more than three dimensions) can be quite useful to a human user.

Functional unit 2706 performs conditioning. In many embodiments, functional unit 2706 conditions the parameter space using more than one set of responses. In one example, functional unit 2706 performs conditioning with respect to a set of responses that are more suitable for a low-density parameter space. After conditioning the parameter space, functional unit 2706 sends the reduced parameter space back to one or more of functional units 2701-2705 to repeat sampling and sensitivity analysis in anticipation of conditioning with respect to a second set of responses. Then, conditioning is performed on the second set of responses that are more suitable for a high-density parameter space, thereby reducing the parameter space even further. In some embodiments, system 2700 is operable to condition the parameter space using more than two sets of responses.

Functional unit 2707 includes user input/output hardware and software. In various embodiments of the invention, the user receives output from each functional unit 2701-2706, thereby allowing the user to review the data in a very intuitive form. Additionally, in various embodiments, the user can control any of functional units 2701-2706 by inputting information (e.g., by redefining a parameter space, taking action based on results of sensitivity analysis, etc.).

While the examples above illustrate using an inversion technique for sedimentary modeling, it should be noted that not all embodiments are so limited. For example, embodiments of the invention may be adapted for use in any area of science and engineering where an inverse solution of a dynamic system is useful. Examples that relate to the earth sciences are, but not limited to, conditioning sedimentary process simulation, 4D seismic and hydrocarbon production history matching, seismic inversion, and hydrological model calibration, geophysical surveys, ecosystems, and atmospheric systems.

Further, various embodiments include one or more advantages over prior art solutions. For example, narrowing a group of parameter values to a range, rather than a single point, tends to give results to a human user that are intuitive in their illustration of uncertainty. Also, narrowing the parameter space to a range eliminates the possibility of becoming "stuck" at a local minimum, which addresses a drawback of prior art optimization approaches.

In fact, various embodiments of the invention address all three issues of the ill-posedness problem. For instance, a user is visually apprised when there is no solution within a parameter space because one or more polygons do not overlap during conditioning. Further, non-smoothness is illustrated to a user during sensitivity analysis, and smoothness issues can be dealt with by the use accordingly. Additionally, various embodiments of the invention provide an intuitive tool to study non-unique solutions as values within a final ensemble in the context of uncertainty.

Moreover, the MDS techniques of various embodiments provide a user with a way to visualize the parameter space, even high-dimensional parameter spaces. The user can then more easily understand the parameter space, and can also more easily understand narrowing of the parameter space due to conditioning.

When implemented via computer-executable instructions, various elements of embodiments of the present invention are in essence the software code defining the operations of such various elements. The executable instructions or software code may be obtained from a tangible readable medium (e.g., a hard drive media, optical media, EPROM, EEPROM, tape media, cartridge media, flash memory, ROM, memory stick, and/or the like). In fact, readable media can include any medium that can store information.

Figure 28:
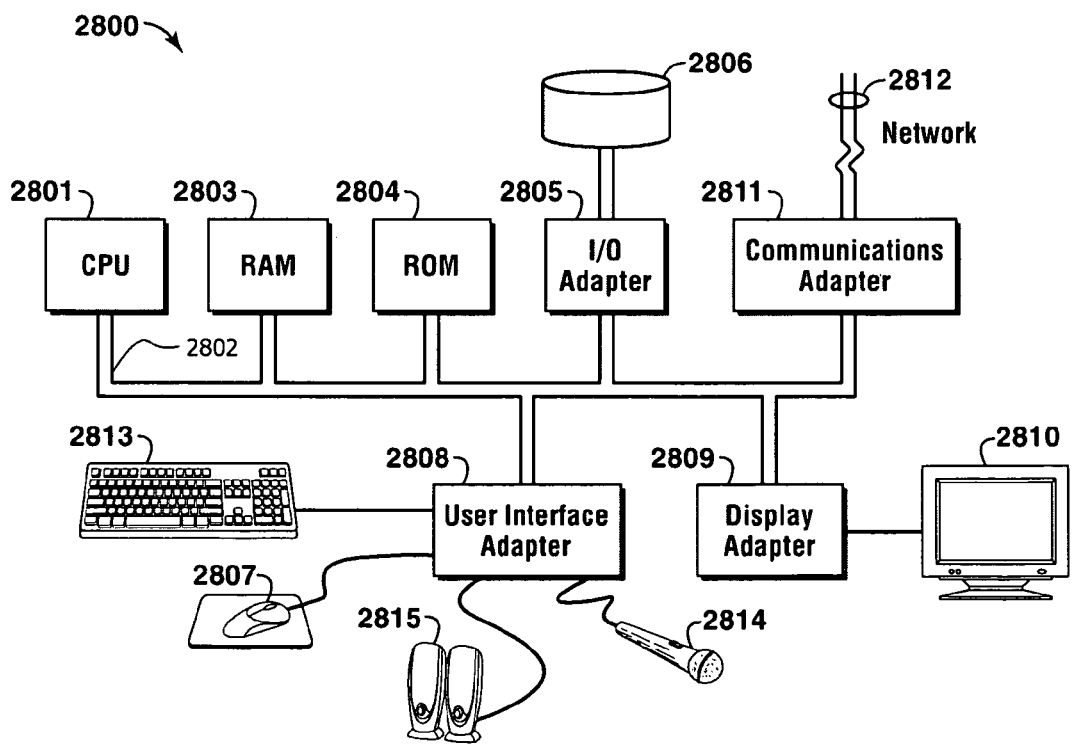
FIG. 28 is an illustration of an example computer system adapted according to one embodiment of the present invention.

FIG. 28 illustrates an example computer system 2800 adapted according to embodiments of the present invention. That is, computer system 2800 comprises an example system on which embodiments of the present invention may be implemented (such as a computer used to enter response data, enter parameter ranges and/or construct an input parameter space, to perform sensitivity analysis, perform MDS and construct response maps/volumes in two or three dimensions, perform conditioning, and the like). Central processing unit (CPU) 2801 is coupled to system bus 2802. CPU 2801 may be any general purpose CPU, and the present invention is not restricted by the architecture of CPU 2801 as long as CPU 2801 supports the inventive operations as described herein. CPU 2801 may execute the various logical instructions according to embodiments of the present invention. For example, CPU 2801 may execute machine-level instructions according to the exemplary operational flows described above in conjunction with FIG. 2.

Computer system 2800 also preferably includes random access memory (RAM) 2803, which may be SRAM, DRAM, SDRAM, or the like. Computer system 2800 preferably includes read-only memory (ROM) 2804 which may be PROM, EPROM, EEPROM, or the like. RAM 2803 and ROM 2804 hold user and system data and programs, as is well known in the art.

Computer system 2800 also preferably includes input/output (I/O) adapter 2805, communications adapter 2811, user interface adapter 2808, and display adapter 2809. I/O adapter 2805, user interface adapter 2808, and/or communications adapter 2811 may, in certain embodiments, enable a user to interact with computer system 2800 to input information, such as response data. A user may also interact with system 2800 to modify a parameter space, to modify maps/volumes, to create simulations or analysis data from models, and/or the like.

I/O adapter 2805 preferably connects to storage device(s) 2806, such as one or more of hard drive, compact disc (CD) drive, floppy disk drive, tape drive, etc. to computer system 2800. The storage devices may be utilized when RAM 2803 is insufficient for the memory requirements associated with storing data. Communications adapter 2811 is preferably adapted to couple computer system 2800 to network 2812 (e.g., a Local Area Network, a Wide Area Network, the Internet, and/or the like). User interface adapter 2808 couples user input devices, such as keyboard 2813, pointing device 2807, and microphone 2814 and/or output devices, such as speaker(s) 2815 to computer system 2800. Display adapter 2809 is driven by CPU 2801 to control the display on display device 2810 to, for example, display the user interface (which may show one or more displays such as the maps, tables, and graphs of FIGS. 3 and 7-26) of embodiments of the present invention.

It shall be appreciated that the present invention is not limited to the architecture of system 2800. For example, any suitable processor-based device may be utilized, including without limitation personal computers, laptop computers, handheld computing devices, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

REFERENCES (IN ALPHABETICAL ORDER BY AUTHOR)

The following references are hereby incorporated herein by reference.

Bitzer, K., and R. Pflug, 1989, DEPO3D: a three-dimensional model for simulating clastic sedimentation and isostatic compensation in sedimentary basins, in T. A. Cross, ed., Quantitative dynamic stratigraphy: Prentice-Hall, Inc, 335-348.

Borg, I and Groenen, P.: Modern Multidimensional Scaling Theory and Applications, Springer, New York, 1997.

Bornholdt, S., Nordlund, U., and Westphal, H.: "Inverse Stratigraphic Modeling Using Genetic Algorithms," Numerical Experiments in Stratigraphy: Recent Advances in Stratigraphic and Sedimentologic Computer Simulation, SEPM Special Publications No. 62, SEPM (Society for Sedimentary Geology), 1999.

Burton, R., Kendall, C. G. St. C, and Lerche, I.: "Out of Our Depth: on the Impossibility of Fathoming Eustasy from the Stratigraphic Record," Earth-Science Review (1987), Vol. 24, pp. 237-277.

Chavent, G.: "History Matching by Use of Optimal Control Theory," SPE Journal (February 1975), pp. 74-86.

Chen, W. H., Gavalas, G. R., Seinfeld, J. H., Wasserman, M. L.: "A New Algorithm for Automatic History Matching," SPE Journal (December 1974). pp. 593-608.

Conover, W. J., and Iman, R. L.: "Rank Transformations as a Bridge between Parametric and Non-parametric Statistics," American Statistician (1981), Vol. 35, No. 3, pp. 124-129.

Cross, T. A., and Lessenger, M. A.: "Construction and Application of A Stratigraphic Inverse Model," Numerical Experiments in Stratigraphy: Recent Advances in Stratigraphic and Sedimentologic Computer Simulation, SEPM Special Publications No. 62, SEPM (Society for Sedimentary Geology), 1999.

Cross, T. A., and Lessenger, M. A.: "Method for Predicting Stratigraphy," U.S. Pat. No. 6,246,963 B1, Jun. 12, 2001.

Cross, T. A., and Lessenger, M. A.: "Method of Predicting Three-Dimensional Stratigraphy Using Inverse Optimization Techniques," U.S. Pat. No. 6,754,588 B2, Jun. 22, 2004.

De Leeuw, J.: "Applications of convex analysis to multidimensional scaling," Recent developments in statistics, edited by J. R. Barra, F. Brodeau, G. Romier, and B. van Cutsem, Nort-Holland, Amsterdam, The Netherlands, 1977.

Evensen, G.: "The ensemble Kalman filter: Theoretical formulation and practical implementation," Ocean Dynamics (2003), Vol. 53, No. 4, pp. 343-367.

Floris, F. J. T., Bush, M. D., Cuypers, M, Roggero, F., and Syversveen, A-R.: "Methods for quantifying the uncertainty of production forecasts: a comparative study," Petroleum Geoscience (2001), Vol. 7, pp. S87-S96.

Gentry, R. W., Larsen, D., and Ivey, S.: "Efficiency of Genetic Algorithm to Investigate Small Scale Aquitard Leakage," Journal of Hydraulic Engineering (July 2003), Vol. 129, No. 7, pp. 527-535.

Golden, B. L., and Wasil, E. A.: 3.6 Metaheuristics, HANDBOOK OF APPLIED OPTIMIZATION, edited by Pardalos, P. M., and Resende, M. G. C., OXFORD University Press, 2002, pp. 123-130.

Gu, Y., and Oliver, D. S.: "History Matching of the PUNQ-S3 Reservoir Model Using the Ensemble Kalman Filter," SPE journal (June 2005), pp. 217-224.

Helton, J. C., and Davis, F. J.: "Latin hypercube sampling and the propagation of uncertainty in analysis of complex systems," Reliability Engineering & System Safety (2003), Vol. 81, pp. 23-69.

Houtekamer, P. L., and Mitchell, H. L.: "Data assimilation using an ensemble Kalman filter technique," Monthly Weather Review (1998), Vol. 126, No. 3, pp. 796-811.

Iman, R. L., and Conover, W. J.: "The Use of Rank Transform in Regression," Technometrics (1979), Vol. 21, No. 4, pp. 499-509.

Iman, R. L., and Conover, W. J.: "A Distribution-Free Approach to Inducing Rank Correlation Among Input Variables," Communications in Statistics: Simulation and Computation (1982), Vol. B11, No. 3, pp. 311-334.

Imhof, M. G. and Sharma. A. K.: "Quantitative seismostratigraphic inversion of a prograding delta from seismic data," MARINE AND PETROLEUM GEOLOGY 23 (7): 735-744 August 2006.

Imhof, M. G. and Sharma. A. K.: "Seismostratigraphic inversion: Appraisal, ambiguity, and uncertainty," GEOPHYSICS 72 (4): R51-66 July-August 2007.

Johnson, M. A.: "Turbidity Currents," Oceanogr. Mar. Biol. Ann. Rev. (1964), Vol. 2, pp. 31-43, Harold Barnes, Rd., Publ. George Allen and Unwin Ltd, London.

Kalnay, E.: Atmospheric Modeling, Data Assimilation and Predictability, Cambridge University Press, Cambridge, 2003.

Karssenberg, D., Törnqvist, T., and Bridge, J. S.: "Conditioning A Process-Based Model of Sedimentary Architecture to Well Data," Journal of Sedimentary Research (November, 2001), Vol. 71, No. 6, pp. 868-879.

Kruskal, J. B.: "Multidimensional Scaling by Optimizing Goodness of Fit to A Nonmetric Hypothesis," Psychometrika (March 1964), Vol. 29, No. 1, pp. 1-26.

Lambert, A. and Giovanoli, F.: "Records of riverborne turbidity currents and indications of slope failures in the Rhone delta of Lake Geneva," Limnol. Oceanogr. (1988), Vol. 33, No. 3, pp. 458-468.

Lazaar, S. and Guerillot, D.: "Method for Automatically Forming A Model Simulating The Stratigraphic Structure of An Underground Zone," U.S. Pat. No. 6,205,402 B1, Mar. 20, 2001.

Li, R., Reynolds, ARC., Oliver, D. S.: "History Matching of Three-Phase Flow Production Data," SPE Journal (December 2003), Vol. 8, No. 4, pp. 328-340.

Lorentzen, R. J., Nœvdal, G., Vales, B., Berg, A. M., and Ramstad, A.-A.: "Analysis of the Ensemble Kalman filter for Estimation of Permeability and Porosity in Reservoir Models," SPE 96375 paper presented at 2005 SPE Annual Technical Conference and Exhibition held in Dallas, Tex., U.S.A., 9-12 Oct. 2005

Marsily, Gh. de, Delhomme, J. P., Coudrain-Ribstein, and A., Lavenue, A. M.: "Four Decades of Inverse Problems in Hydrogeology," Special Paper 348: Theory, modeling, and field investigation in hydrogeology: a special volume in honor of Shlomo P. Neuman's 60th birthday, Vol. 348, No. 0, pp-1-17, Geological Society of America, Boudler, Colo., 2000.

Mathar, R.: "Algorithms in multidimensional scaling," Conceptual and numerical analysis of data, edited by O. Opitz, Springer, Berlin, 1989.

McKay, M. D., Beckman, R. J., and Conover, W. J.: "A Comparison of Three Methods for Selecting Values of Input Variables in the Analysis of Output from a Computer Code," Technometrics (May 1979), Vol. 21, No. 2, pp. 239-245.

Nicklow, J., Ozkurt, O, and Bringer, J. A. Jr.: "Control of Channel Bed Morphology in Large-Scale River Networks Using a Genetic Algorithm," Water Resources Management (2003), Vol. 17, pp. 113-132.

Nœvdal, G., Johnsen, L. M., Aanonsen, S. I., and Vefring, E. H.: "Reservoir Monitoring and Continuous Model Updating Using Ensemble Kalman Filter," SPE Journal (March 2005), pp. 66-74.

Nordlund, U., 1999, FUZZIM: Forward stratigraphic modeling made simple: Computers and Geoscience, 25, 449-456.

Nueman, S. P., and Carrera, J.: "Maximum-likelihood adjoint-state finite-element estimation of groundwater parameters under steady- and nonsteady-state conditions," Appl. Mathematics and Computation (1985), Vol. 17, pp. 405-432.

Piasecki, M., and Katopodes, N.: "Identification of Stream Dispersion Coefficients by Adjoint Sensitivity Method," Journal of Hydraulic Engineering (July 1999), pp. 714-724.

Saltelli, A., and Sobol, I. M.: "About the Use of Rank Transformation in Sensitivity Analysis of Model Output," Reliability Engineering and System Safety (1995), Vol. 50, No. 3, pp. 225-239.

Sambridge, M.: "Geophysical inversion with a neighbourhood algorithm—I," Geophysical Journal International (1999a), Vol. 138, pp. 479-494.

Sambridge, M.: "Geophysical inversion with a neighbourhood algorithm—II," Geophysical Journal International (1999b), Vol. 138, pp. 727-746.

Sambridge, M. S. and Drijkoningen, G.: "Genetic algorithms in seismic waveform inversion," Geophysical Journal International (1992), Vol. 109, pp. 323-342.

Sanders, B., and Katopodes, N. D.: "Adjoint Sensitivity Analysis for Shallow-Water Wave Control," Journal of Engineering Mechanics (September 2000), pp. 909-919.

Sarma, P., Aziz, K., and Durlofsky, L. J.: "Implementation of Adjoint Solution for Optimal Control of Smart Wells," SPE 92864 paper presented at the SPE Reservoir Simulation Symposium, 31 Jan.-2 Feb., 2005, The Woodlands, Tex.

Schlitzer, R.: "Applying the Adjoint Method fro Biogeochemical Modeling: Export of Particulate Organic Matter in the World Ocean," *Inverse Methods in Global Biogeochemical Cycles* edited by Kasibhatla, P., Heimann, M., Rayner, P., Mahowald, N., Prinn, and R. G., Hartley, D. E., American Geophysical Union, Washington, D.C., 2000.

Schulze-Riegert, R. W., Axmann, J. K., Haase, O., and Rian, D. T.: "Evolutionary Algorithms Applied to history Matching of Complex Reservoirs," SPE Reservoir Evaluation & Engineering (April 2002), pp. 163-173.

Schulze-Riegert, R. W., Haase, O., and Nekrassov, A.: "Combined Global and Local Optimization Techniques Applied to History Matching," SPE 79668 paper presented at the SPE Reservoir Simulation Symposium held in Houston, Tex., U.S.A., 3-5 Feb. 2003.

Steward, J. S., and I. Overeem, 2002, 3D-SEDFLUX: Coupling fluvial and stratigraphic simulation models: Presented at the Geological Society of America Annual Meeting.

Stoffa, P. L. and Sen, M. K.: "Nonlinear multiparameter optimization using genetic algorithms: inversion of plane-wave seismograms," Geophysics (1991), Vol. 56, pp. 1794-1810.

Strobel, J., R. Canon, C. G. S. C. Kendall, G. Biswas, and J. Bezdek, 1989, Interactive (SEDPAK) simulation of clastic and carbonate sediments in shelf to basin settings: Computers and Geoscience, 15, 1279-1290.

Sun, T., Li, D., Huh, C., Adair, N., Wu, X., and Van Wagoner, J.: "A Method for Evaluation Sedimentary Basin Properties by Numerical Modeling of Sedimentation Processes," United States Patent Application Publication No. US 20070219725 A1.

Syvitski, J. P. M., and E. W. H. Hutton, 2001, 2D SEDFLUX 1.0C, an advanced process-response numerical model for the fill of marine sedimentary basins: Computers and Geoscience, 27, 713-753.

Tavassoli, Z., Carter, J. N., and King, P. R.: "Errors in History Matching," SPE Journal (September 2004), pp. 352-361.

Tetzlaff, D. M., and J. W. Harbaugh, 1989, Simulating clastic sedimentation. Computer methods in the geosciences: Van Nostrand Reinhold, New York.

Vakili, A., Jansen, J. D., Esmaiel, T., and van Kruijsdijk, C. P. J. W.: "On The Adjoint of a Nonlinear Diffusion-Convection Equation to Describe Flow in Porous Media," SPE 93566 paper presented at the SPE Middle East Oil and Gas Show and Conference, Mar. 12-15, 2005, Kingdom of Bahrain.

Van Wagoner, J., Hoyal, D. C. J. D., Adair, N. L., Sun, T., Beaubouef, R. T., Deffenbaugh, M., Dunn, P. A., Huh, C., and Li, D., "Energy dissipation and the fundamental shape of siliciclastic sedimentary bodies", Search and Discovery Article #40081, 2003.

Vrugt, J. A., Diks, C. G. H., Gupta, H. V., Bouten, W., and Verstraten, J. M.: "Improved treatment of uncertainty in hydrologic modeling: combing the strengths of global optimization and data assimilation," Water Resources Research (2005), Vol. 41, Wo1017.

Wijns, C., Boschetti, F., Moresi, L.: "Inverse Modeling in Geology by Interactive Evolutionary Computation," Journal of Structural Geology (2003), Vol. 25, pp. 1615-1621.

Yeh, W. W.-G., and Sun, N.-Z.: "Variational sensitivity analysis, data requirements, and parameter identification in a leaky aquifer system," Water Resources Research (1990), Vol. 26, No. 9, pp. 1927-1938.

Zafari, M., and Reynolds, A. C.: "Assessing the Uncertainty in Reservoir Description and Performance Predictions with the Ensemble Kalman Filter," SPE 95750 paper presented at 2005 SPE Annual Technical Conference and Exhibition held in Dallas, Tex., U.S.A., 9-12 Oct. 2005.

Zhang, D., Lu, Z., and Chen, Y.: "Dynamic Reservoir data Assimilation with an Efficient, Dimension-Reduced Kalman Filter," SPE 95277 paper presented at 2005 SPE Annual Technical Conference and Exhibition held in Dallas, Tex., U.S.A., 9-12 Oct. 2005.

What is claimed is:

1. A method for modeling dynamic systems, said method comprising:
   constructing an input parameter space for a model of a geological system with a computer system, said input parameter space including more than three dimensions, and said model associated with response data, wherein the input parameter space comprises a plurality of input parameters that each has a range of values and said response data is generated from the model and one or more of the plurality of input parameters;
   representing said input parameter space visually, with said computer system, with fewer dimensions than a number of dimensions of said input parameter space by using a subset of said response data;
   conditioning said input parameter space to reduce a size of said input parameter space by using at least said subset of said response data and measured data associated with said geological system, said conditioning comprising:
      defining a constraint associated with said response data;
      creating one or more regions around said response data that satisfies said constraint;
      displaying said one or more regions in said visual representation of said input parameter space; and
      narrowing one or more ranges of said plurality of input parameters based on the one or more regions; and
   updating said representation of said input parameter space to visually represent said reduction of said input parameter space.

2. The method of claim 1 wherein representing said input parameter space comprises:
   representing said response data as a plurality of points in said input parameter space in a two-dimensional space while maintaining distances among points.

3. The method of claim 2 wherein said two-dimensional space includes color coding to represent changes in values of said response data.

4. The method of claim 2, wherein said creating one or more regions around said response data that satisfies said constraint comprises: rendering a polygon on said two-dimensional space, said polygon indicating ones of said points that fall within a range of error of at least a portion of said response data.

5. The method of claim 1 wherein representing said input parameter space comprises:
   representing said response data as a plurality of points in said input parameter space in a three-dimensional space while maintaining distances among points.

6. The method of claim 5 wherein said three-dimensional space includes color coding to represent changes in values of said response data.

7. The method of claim 1 wherein constructing the input parameter space comprises:
   sampling values of parameters to generate a discrete number of points, each of said points corresponding to a value of a parameter in said input parameter space.

8. The method of claim 7 wherein said sampling includes Latin Hypercube Sampling (LHS).

9. The method of claim 1 wherein said input parameter space comprises:
   a plurality of models of said geological system.

10. The method of claim 9 further comprising:
    performing a sensitivity analysis on at least one of said models; and
    not conditioning at least one of said models that show sensitivity lower than a first threshold.

11. The method of claim 10 wherein said sensitivity analysis measures a ratio of a change in an output of a given model to a change in an input of a given model, wherein a higher ratio indicates a higher sensitivity.

12. The method of claim 10 further comprising:
    adjusting at least one of said models in response to a sensitivity of said at least one model being higher than a second threshold.

13. The method of claim 10 wherein performing sensitivity analysis comprises:
    ranking input parameters of said input parameter space based on their respective sensitivities.

14. The method of claim 1, wherein conditioning said input parameter space with a constraint to reduce a size of said input parameter space by using at least said subset of said response data and measured data associated with said geological system, further comprises:
    defining a second constraint associated with a second response of said response data;
    creating one or more second regions around said second response data that satisfies said second constraint;
    creating one or more overlap regions where the one or more regions and one or more second regions intersect;
    displaying said one or more overlap regions in said visual representation of said input parameter space; and
    narrowing one or more ranges of said plurality of input parameters based on the one or more overlap regions.

15. The method of claim 14, wherein said constraint is associated with a first seismic response of said geological system; and said second constraint is associated with a second seismic response of said geological system.

16. A solution space method for inversion modeling of a dynamic system, said method comprising:
    constructing an input parameter space comprising: a plurality of samples of values of a plurality of parameters, each of said samples corresponding to one of a plurality of models of said dynamic system; and conditioning at least a portion of said input parameter space according to a first set of measurement data, thereby eliminating a first subset of said samples to produce a first ensemble of models using a solution space method, wherein conditioning comprises:
displaying a visual representation of said input parameter space with fewer dimensions than a number of dimensions of said input parameter space;
defining a constraint associated with said first set of measurement data;
creating one or more regions around said first set of measurement data that satisfies said constraint;
displaying said one or more regions in said visual representation of said input parameter space; and
determining the first ensemble of models from said visual representation.

17. The method of claim 16 further comprising:
conditioning said first ensemble according to a second set of measurement data, thereby eliminating a second subset of said samples to produce a second ensemble of models, wherein conditioning said second ensemble comprises:
defining a second constraint associated with said second set of measurement data;
creating one or more regions around said second set of measurement data that satisfies said second constraint;
displaying said one or more second regions in said visual representation of said input parameter space; and
determining the second ensemble of models from said visual representation.

18. The method of claim 17 wherein said first set of measurement data comprises seismic test data of a geological system, and wherein said second set of measurement data comprises well test data of said geological system.

19. The method of claim 18 further comprising:
using one or more models of said second ensemble for predictive modeling of said dynamic system.

20. The method of claim 19 wherein said predictive modeling comprises:
predictive hydrocarbon production modeling of a geological structure.

21. The method of claim 16 wherein said plurality of models simulate a sedimentary process.

22. The method of claim 16 further comprising:
performing sensitivity analysis on said input parameter space; and
not conditioning portions of said input parameter space showing sensitivity lower than a threshold.

23. The method of claim 16 wherein said input parameter space comprises more than three dimensions, said method further comprising:
creating said visual representation of said input parameter space in two dimensions, said visual representation including color coding to indicate at least a subset of values in said first set of measurement data; and
updating said visual representation after said conditioning to indicate ones of said samples not eliminated by said conditioning.

24. The method of claim 23 wherein updating said visual representation comprises:
rendering a border in said visual representation such that within said border lie said ones of said samples not eliminated.

25. The method of claim 23 wherein creating a visual representation of said input parameter space comprises:
preserving a scale dependence of said first set of measurement data.

26. The method of claim 16 wherein said input parameter space comprises more than three dimensions, said method further comprising:
creating a visual representation of said input parameter space in three dimensions, said visual representation including color coding to indicate at least a subset of values in said first set of measurement data; and
updating said visual representation after said conditioning to indicate ones of said samples not eliminated by said conditioning.

27. The method of claim 26 wherein creating a visual representation of said input parameter space comprises:
preserving a scale dependence of said first set of measurement data.

28. A method for simulating a dynamic system said method comprising:
constructing an input parameter space for said dynamic system, said input parameter space comprising value samples of a plurality of input parameters, each of said value samples corresponding to a model of said system;
performing sensitivity analysis on said input parameter space by identifying the effects of a change in at least one of said input parameters upon at least one response;
conditioning the input parameter space to a plurality of responses of said dynamic system using a solution space method, wherein conditioning comprises:
displaying a visual representation of said input parameter space with fewer dimensions than a number of dimensions of said input parameter space;
defining a constraint associated with said at least one of said plurality of responses;
creating one or more regions around said plurality of responses that satisfies said constraint;
displaying said one or more regions in said visual representation of said input parameter space; and
determining a reduced input parameter space based on said visual representation.

29. The method of claim 28, wherein said conditioning produces a reduced parameter space that is smaller than said input parameter space.

30. The method of claim 29 further comprising:
performing predictive analysis with models of said reduced parameter space.

31. The method of claim 28 wherein said dynamic system comprises a geological system.

32. The method of claim 28 wherein said dynamic system comprises a sedimentary deposit.

33. The method of claim 28, further comprising rendering a visual indication of the results of said sensitivity analysis, wherein said visual indication comprises a tornado chart showing sensitivity of said plurality of said input parameters upon said at least one response.

34. The method of claim 28 further comprising:
ranking each parameter of said plurality of parameters according to its respective sensitivity determined through said sensitivity analysis.

35. The method of claim 28 further comprising:
eliminating ones of said models that have a sensitivity lower than a first threshold; and
adjusting ones of said models that have a sensitivity higher than a second threshold.

36. A system for modeling a dynamic system, said geological structure associated with response data, said system comprising:
- a first functional unit constructing an input parameter space for said geological structure, wherein said input parameter space includes more than three dimensions and said input parameter space comprises a plurality of input parameters that each has a range of values;
- a second functional unit rendering a view of said input parameter space in fewer dimensions than a number of dimensions of said input parameter space;
- a third functional unit conditioning said input parameter space to at least a subset of said response data and measured data associated with said geological system, thereby reducing a size of said input parameter space to create a reduced parameter space, wherein the conditioning comprises:
  - obtaining a constraint associated with said at least a subset of said response data;
  - creating one or more regions around said at least a subset of said response data that satisfies said constraint;
  - displaying said one or more regions in an updated view of said input parameter space; and
- a fourth functional unit rendering a view of said reduced parameter space;
- wherein each of the first functional unit, the second functional unit, the third functional unit and fourth functional unit comprises a combination of hardware and software.

37. The system of claim 36 wherein said view of said reduced parameter space is included within said view of said input parameter space.

38. The system of claim 36 further comprising:
- a fifth functional unit performing predictive modeling using at least a subset of said reduced parameter space.

39. A system providing a solution space method for inversion modeling of a dynamic structure, said dynamic structure associated with measurement data, said system comprising:
- an input parameter unit constructing an input parameter space, said input parameter space comprising:
  - samples of values of a plurality of input parameters, each of said samples corresponding to one of a plurality of models of said dynamic system;
- a conditioning unit performing conditioning of said input parameter space using at least a subset of said measurement data, thereby reducing a number of said samples and producing a reduced parameter space using a solution space method, wherein conditioning comprises:
  - displaying a visual representation of said input parameter space with fewer dimensions than a number of dimensions of said input parameter space;
  - defining a constraint associated with said at least a subset of said measurement data;
  - creating one or more regions around said at least a subset of said measurement data that satisfies said constraint;
  - displaying said one or more regions in said visual representation of said input parameter space; and
  - determining said reduced parameter space from said visual representation; and
- wherein each of the input parameter unit and conditioning unit comprises one of hardware and a combination of hardware and software.

40. The system of claim 39 wherein said input parameter unit performs Latin Hypercube Sampling (LHS) upon a range of said parameters to generate said samples of said input parameter space.

41. The system of claim 39, wherein said dynamic structure is a geological structure containing hydrocarbon deposits, and wherein said conditioning unit performs conditioning with respect to a set of seismic data and with respect to a set of well data.

42. A non-transitory computer program product having a computer readable medium having computer program logic recorded thereon for simulating a natural structure, said natural structure associated with response data, said computer program product comprising:
  (a) code, when executed by a computer, constructing an input parameter space for said natural structure, said input parameter space comprising value samples of a plurality of input parameters;
  (b) code, when executed by a computer, performing sensitivity analysis on said input parameter space by identifying the effects of a change in at least one of said input parameters upon at least a first portion of said response data;
  (c) code, when executed by a computer, rendering a visual indication of results of said sensitivity analysis;
  (d) code, when executed by a computer, visually reducing a number of dimensions of said input parameter space and rendering a view of said input parameter space in three or fewer dimensions; and
  (e) code, when executed by a computer, conditioning said input parameter space using at least a second portion of said measurement data, thereby creating a reduced parameter space, wherein conditioning comprises:
    obtaining a constraint associated with said at least a second portion of said measurement data;
    creating one or more regions around said at least a second portion of said measurement data that satisfies said constraint;
    displaying said one or more regions in said view; and
    determining said reduced parameter space based on said view.

43. The computer program product of claim 42 further comprising:
  code, when executed by a computer, indicating said reduced parameter space on said view of said input parameter space.

* * * * *